(12) United States Patent
Su

(10) Patent No.: US 12,297,309 B2
(45) Date of Patent: May 13, 2025

(54) ADDITIVES FOR 3D PRINTING POLYMER RESINS

(71) Applicant: Align Technology, Inc., San Jose, CA (US)

(72) Inventor: Jessica Kalay Su, San Jose, CA (US)

(73) Assignee: Align Technology, Inc., San Jose, CA (US)

(*) Notice: Subject to any disclaimer, the term of this patent is extended or adjusted under 35 U.S.C. 154(b) by 0 days.

(21) Appl. No.: 18/590,453

(22) Filed: Feb. 28, 2024

(65) Prior Publication Data

US 2025/0011518 A1  Jan. 9, 2025

Related U.S. Application Data

(60) Provisional application No. 63/487,466, filed on Feb. 28, 2023.

(51) Int. Cl.
*A61C 7/08* (2006.01)
*A61C 7/00* (2006.01)
(Continued)

(52) U.S. Cl.
CPC .......... *C08F 297/026* (2013.01); *A61C 7/002* (2013.01); *A61C 7/08* (2013.01);
(Continued)

(58) Field of Classification Search
CPC .......... C08F 297/026; C08F 220/1806; C08F 220/301; C08F 220/18; C08F 293/005;
(Continued)

(56) References Cited

U.S. PATENT DOCUMENTS 6,210,162 B1  4/2001  Chishti et al.
6,309,215 B1  10/2001  Phan et al.
(Continued)

FOREIGN PATENT DOCUMENTS

JP    2006299236 A   11/2006
WO  WO-2015075094 A1  5/2015
(Continued)

OTHER PUBLICATIONS

Wan et al., "One-Step Synthesis of Lignin-based Triblock Copolymers as High-Temperature and UV-Blocking Thermoplastic Elastomers," *Angewandte Chemie Int. Ed.* 61:e202114946:1-8 (2022).
(Continued)

*Primary Examiner* — Yogesh P Patel
(74) *Attorney, Agent, or Firm* — Seed IP Law Group LLP

(57) ABSTRACT

The present disclosure provides micelles comprising a plurality of block co-polymers, the micelle comprising (i) a core comprising at least a portion of a poly(alkyl acrylate) block of one or more of the block co-polymers; and (ii) an outer layer comprising at least a portion of a poly(aryl acrylate) block or a poly(aryl methacrylate) block of one or more of the block co-polymers. The present disclosure also includes polymer compositions, polymer films, and devices (e.g., orthodontic equipment) including the same. Methods for making and using micelles, polymer compositions, polymer films, and devices (e.g., orthodontic equipment) are also disclosed. Further provided herein are methods of producing polymer compositions and using the same for the fabrication (e.g., via 3D printing) of medical devices, such as orthodontic appliances.

22 Claims, 12 Drawing Sheets

(51) Int. Cl.
*B33Y 70/00* (2020.01)
*B33Y 80/00* (2015.01)
*C08F 297/02* (2006.01)
*C09D 153/00* (2006.01)

(52) U.S. Cl.
CPC .............. *B33Y 70/00* (2014.12); *B33Y 80/00* (2014.12); *C09D 153/00* (2013.01)

(58) Field of Classification Search
CPC .. C08F 226/06; C08F 8/12; C08F 2/50; C08F 2810/30; C08F 2810/40; C08F 2438/03; C08F 2438/01; B33Y 70/00; B33Y 80/00; A61C 7/00–08; C09D 153/00
See application file for complete search history.

(56) References Cited

U.S. PATENT DOCUMENTS

| | | | |
|---|---|---|---|
| 6,450,807 | B1 | 9/2002 | Chishti et al. |
| 6,497,574 | B1 | 12/2002 | Miller |
| 6,749,414 | B1 | 6/2004 | Hanson et al. |
| 6,830,450 | B2 | 12/2004 | Knopp et al. |
| 6,957,118 | B2 | 10/2005 | Kopelman et al. |
| 6,976,627 | B1 | 12/2005 | Culp et al. |
| 7,092,784 | B1 | 8/2006 | Simkins |
| 7,192,273 | B2 | 3/2007 | McSurdy, Jr. |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,892,474 | B2 | 2/2011 | Shkolnik et al. |
| 7,922,490 | B2 | 4/2011 | Wen |
| 7,957,824 | B2 | 6/2011 | Boronvinskih et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,636,513 | B2 | 1/2014 | Wen |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,333,148 | B2 | 5/2016 | Suzuki |
| 9,403,238 | B2 | 8/2016 | Culp |
| 9,700,385 | B2 | 7/2017 | Webber |
| 9,844,424 | B2 | 12/2017 | Wu et al. |
| 9,943,386 | B2 | 4/2018 | Webber et al. |
| 9,943,991 | B2 | 4/2018 | Tanugula et al. |
| 10,336,102 | B2 | 7/2019 | Cole |
| 10,495,973 | B2 | 12/2019 | Cole |
| 10,783,629 | B2 | 9/2020 | Parpara et al. |
| 10,888,395 | B2 | 1/2021 | Kopelman |
| 10,912,629 | B2 | 2/2021 | Tanugula et al. |
| 10,993,783 | B2 | 5/2021 | Wu et al. |
| 11,045,283 | B2 | 6/2021 | Riley et al. |
| 11,103,330 | B2 | 8/2021 | Webber et al. |
| 11,189,021 | B2 | 11/2021 | Shah et al. |
| 11,273,011 | B2 | 3/2022 | Shanjani et al. |
| 11,295,444 | B2 | 4/2022 | Cherkas et al. |
| 11,318,667 | B2 | 5/2022 | Mojdeh et al. |
| 11,370,173 | B2 | 6/2022 | Kelly et al. |
| 11,420,362 | B2 | 8/2022 | Mojdeh et al. |
| 11,511,485 | B2 | 11/2022 | Mojdeh et al. |
| 11,534,277 | B2 | 12/2022 | Chavez et al. |
| 11,554,000 | B2 | 1/2023 | Webber |
| 11,564,777 | B2 | 1/2023 | Kopelman et al. |
| 11,596,502 | B2 | 3/2023 | Webber et al. |
| 11,602,413 | B2 | 3/2023 | Chen et al. |
| 11,666,415 | B2 | 6/2023 | Wang et al. |
| 11,793,606 | B2 | 10/2023 | Cam et al. |
| 11,931,222 | B2 | 3/2024 | Webber et al. |
| 11,937,991 | B2 | 3/2024 | Webber et al. |
| 12,049,528 | B2 * | 7/2024 | Choudhary ....... C08F 220/1806 |
| 2004/0243361 | A1 | 12/2004 | Steuben et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Zhenhuan et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2014/0061974 | A1 | 3/2014 | Tyler |
| 2014/0265034 | A1 | 9/2014 | Dudley |
| 2015/0097315 | A1 | 4/2015 | DeSimone et al. |
| 2017/0202641 | A1 * | 7/2017 | Li ........................... B32B 27/36 |
| 2018/0147028 | A1 * | 5/2018 | Warshawsky ............ A61C 7/36 |
| 2019/0046297 | A1 | 2/2019 | Kopelman et al. |
| 2019/0144590 | A1 | 5/2019 | Epps, III et al. |
| 2020/0290262 | A1 | 9/2020 | Aguilar Mendez et al. |
| 2021/0030516 | A1 | 2/2021 | O'Leary et al. |
| 2021/0146619 | A1 | 5/2021 | Shusteff et al. |
| 2021/0238335 | A1 * | 8/2021 | Wu ........................ B33Y 80/00 |
| 2021/0259809 | A1 | 8/2021 | O'Leary et al. |
| 2022/0227051 | A1 | 7/2022 | Regehly |
| 2022/0380502 | A1 | 12/2022 | Choudhary et al. |
| 2023/0212107 | A1 * | 7/2023 | Choudhary ............ B33Y 70/00 522/181 |

FOREIGN PATENT DOCUMENTS

| | | |
|---|---|---|
| WO | WO-2016078838 A1 | 5/2016 |
| WO | WO-2017115076 A1 | 7/2017 |
| WO | WO-2018032022 A1 | 2/2018 |
| WO | WO-2020070639 A1 | 4/2020 |
| WO | WO-2020245456 A1 | 12/2020 |
| WO | WO-2021087061 A2 | 5/2021 |
| WO | WO-2021130657 A1 | 7/2021 |
| WO | WO-2021130661 A1 | 7/2021 |
| WO | WO-2022011456 A1 | 1/2022 |

OTHER PUBLICATIONS

Tumbleston, et al., "Additive Manufacturing. Continuous Liquid Interface Production of 3D Objects," Science (New York, N.Y.), 2015, vol. 347(6228), pp. 1349-1352.

* cited by examiner

ADDITIVES FOR 3D PRINTING POLYMER RESINS

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE DISCLOSURE

Poly(syringyl methacrylate) and poly(syringyl acrylate) are rigid polymers with relatively high glass transition temperatures ($T_g$). Improvements in various properties (e.g., shear yielding, toughness) of these polymers are sought after as they would provide uses across a variety of different fields. Accordingly, there is a need for new additives that impart these properties and produce polymer compositions with these superior properties. The present disclosure fulfills these needs among others.

SUMMARY OF THE DISCLOSURE

The present disclosure provides micelles comprising block co-polymers that impart superior properties unto polymer compositions. The block co-polymers of the present disclosure form micelles with a core and an outer layer. Poly(aryl methacrylate) (e.g., poly(2,6-dimethoxyphenyl methacrylate)) and poly(aryl acrylate) (e.g., poly(2,6-dimethoxyphenyl acrylate)) polymers are rigid and have high glass transition temperatures ($T_g$ values); poly(alkyl acrylate) (e.g., poly(butyl acrylate)) polymers are rubbery with a low $T_g$ value. When these two polymer types are covalently bound together (e.g., as in a block copolymer), it is thought that a microphase separation occurs. When added to a polymer composition that is predominately a syringyl-rich resin, micelles may form with a rigid outer layer and rubbery core. These micelles are thought to create local disruptions in the polymer network enabling energy-absorbing processes such as shear yielding to take place. Accordingly, one embodiment provides a block co-polymer having at least a first block and a second block, wherein:
i) the first block is a poly(aryl acrylate) or a poly(aryl methacrylate) block having 10-300 repeat units or a poly(aryl methacrylate) block having 10-300 repeat units;
ii) the second block is a poly(alkyl acrylate) block having between 10-300 repeat units.

Another embodiment provides a block co-polymer having at least a first block and a second block, wherein:
i) the first block is a poly(aryl acrylate) block or a poly(aryl methacrylate) block comprising the following substructure:

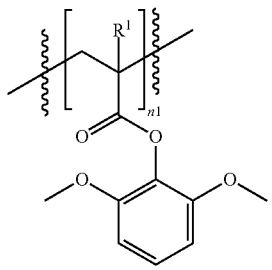

wherein:
each occurrence of $R^1$ is independently hydrogen or $CH_3$;
n1 is an integer ranging from 10-300; and
ii) the second block is a poly(alkyl acrylate) block comprising the following substructure:

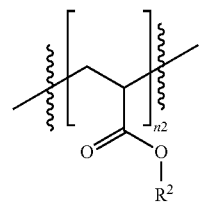

wherein:
each occurrence of $R^2$ is independently $C_1$-$C_6$ alkyl; and
n2 is an integer ranging from 10-300.

Another embodiment provides a micelle comprising a plurality of block co-polymers, the micelle comprising:
i) a core comprising at least a portion of a poly(alkyl acrylate) block of one or more of the block co-polymers; and
ii) an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers.

One additional embodiment provides a photocurable resin comprising:
i) aryl acrylate monomers, aryl methacrylate monomers, or combinations thereof; and
ii) a macroinitiator compound having the following structure:

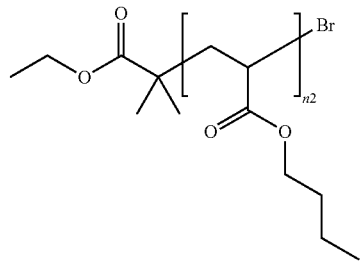

wherein:
n2 is an integer ranging from 10-500.

Additional embodiments provide a photocurable resin comprising: i) aryl acrylate monomers, aryl methacrylate monomers, or combinations thereof; ii) alkyl acrylate monomers; and iii) an initiator.

Another embodiment provides a polymer composition comprising the micelles of the disclosure dispersed and in physical contact with a photopolymer network. That is, some embodiments provide a polymer composition comprising a micelle comprising a plurality of block co-polymers, the micelle comprising:
i) a core comprising at least a portion of a poly(alkyl acrylate) block of one or more of the block co-polymers; and
ii) an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers wherein:

the micelle is dispersed and in physical contact with a photopolymer network.

Still another embodiment provides a polymer composition comprising the micelles of the disclosure dispersed and covalently bound to a photopolymer network. That is, some embodiments provide a polymer composition comprising a micelle comprising a plurality of block co-polymers, the micelle comprising:

i) a core comprising at least a portion of a poly(alkyl acrylate) block of one or more of the block co-polymers; and ii) an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers wherein:

the micelle is dispersed and covalently bound to a photopolymer network.

Another embodiment provides a polymeric film comprising a polymer composition comprising a micelle comprising a plurality of block co-polymers, the micelle comprising:

i) a core comprising at least a portion of a poly(alkyl acrylate) block of one or more of the block co-polymers; and ii) an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers wherein:

the micelle is dispersed and in physical contact with a photopolymer network.

One embodiment provides a polymeric film comprising a polymer composition comprising a micelle comprising a plurality of block co-polymers, the micelle comprising:

i) a core comprising at least a portion of a poly(alkyl acrylate) block of one or more of the block co-polymers; and ii) an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers wherein:

the micelle is dispersed and covalently bound to a photopolymer network.

Some embodiments provide a method of forming a polymer composition, the method comprising: providing a photocurable resin according to the embodiments disclosed herein; exposing the photocurable resin to a light source; and polymerizing the photocurable resin to form the polymer.

Some additional embodiments provide a method for preparing an article by an additive manufacturing process, comprising: providing a photocurable resin according to the embodiments disclosed herein; heating the photocurable resin to a processing temperature; exposing the photocurable resin to radiation; polymerizing the photocurable resin layer-by-layer based on a predefined design, thereby polymerizing monomers to form a polymer composition; and fabricating the article with the polymer composition.

One embodiment provides an orthodontic appliance comprising a polymer composition or a polymeric film as described herein. Another embodiment provides a method of repositioning a patient's teeth, comprising (1) generating a treatment plan for the patient, the plan comprising a plurality of intermediate tooth arrangements for moving teeth along a treatment path from an initial tooth arrangement toward a final tooth arrangement; (2) producing an orthodontic appliance as described according to the embodiments disclosed herein; and (3) moving on-track, with the orthodontic appliance, at least one of the patient's teeth toward an intermediate tooth arrangement or the final tooth arrangement.

In various aspects, provided herein is a polymer composition formed from a photopolymer network and a micelle according to the present disclosure. In some aspects, the polymeric composition has one or more of the following characteristics: (A) a flexural modulus of at least about 50 MPa, 75 MPa, 100 MPa, 150 MPa, or at least about 175 MPa; (B) an elastic modulus from at least about 500 MPa to about 1500 MPa, from at least about 550 MPa to about 1000 MPa, or from at least about 550 MPa to about 800 MPa; (C) an elongation at break greater than or equal to 2.5% before and after 24 hours in a wet environment at 37° C.; (D) a water uptake of less than 20 wt % when measured after 24 hours in a wet environment at 37° C.; (E) transmission of at least 20% of visible light through the polymer composition after 24 hours in a wet environment at 37° C.; and (F) comprises a polymeric phase having a $T_g$ of at least 60° C., 80° C., 90° C., 100° C., or at least 110° C. In some aspects, the polymer composition has at least two characteristics of (A), (B), (C), (D), (E) and (F). In some aspects, the polymer composition has at least three characteristics of (A), (B), (C), (D), (E) and (F). In some aspects, the polymer composition has at least four characteristics of (A), (B), (C), (D), (E) and (F). In some aspects, the polymer composition has at least five characteristics of (A), (B), (C), (D), (E) and (F). In some aspects, the polymer composition has all of the characteristics (A), (B), (C), (D), (E) and (F).

In some aspects, the polymer composition is characterized by a water uptake of less than 20 wt %, less than 15 wt %, less than 10 wt %, less than 5 wt %, less than 4 wt %, less than 3 wt %, less than 2 wt %, less than 1 wt %, less than 0.5 wt %, less than 0.25 wt %, or less than 0.1 wt % when measured after 24 hours in a wet environment at 37° C.

In some aspects, the polymer composition has an ultimate tensile strength from 10 MPa to 100 MPa, from 15 MPa to 80 MPa, from 20 MPa to 60 MPa, from 10 MPa to 50 MPa, from 10 MPa to 45 MPa, from 25 MPa to 40 MPa, from 30 MPa to 45 MPa, or from 30 MPa to 40 MPa after 24 hours in a wet environment at 37° C. In some aspects, the polymer composition is characterized by an elongation at break greater than 10%, an elongation at break greater than 20%, an elongation at break greater than 30%, an elongation at break of 5% to 250%, an elongation at break of 20% to 250%, or an elongation at break value between 40% and 250% before and after 24 hours in a wet environment at 37° C. In some aspects, the polymer composition is characterized by a storage modulus of 0.1 MPa to 4000 MPa, a storage modulus of 300 MPa to 3000 MPa, or a storage modulus of 750 MPa to 3000 MPa after 24 hours in a wet environment at 37° C. In some aspects, the polymer composition has a flexural stress remaining of 400 MPa or more, 300 MPa or more, 200 MPa or more, 180 MPa or more, 160 MPa or more, 120 MPa or more, 100 MPa or more, 80 MPa or more, 70 MPa or more, 60 MPa or more, after 24 hours in a wet environment at 37° C. In some aspects, at least 40%, 50%, 60%, or 70% of visible light passes through the polymer composition after 24 hours in a wet environment at 37° C. In some aspects, the polymer composition is biocompatible, bioinert, or a combination thereof. In some aspects, the polymer composition is capable of being 3D printed.

In some aspects, the polymer composition is a polymeric film having a thickness of at least 100 μm and not more than 3 mm. In various aspects, provided herein is a device comprising a polymer composition of the present disclosure, a polymeric film of this disclosure, or a combination thereof. In some aspects, the device is a medical device. In some aspects, the medical device is a dental appliance. In some aspects, the dental appliance is a dental aligner, a dental expander, or a dental spacer.

In various aspects, provided herein is a method of forming a polymer composition, the method comprising: providing a curable resin comprising alkyl acrylate monomers, 2,6-dimethoxyphenyl acrylate monomers, 2,6-dimethoxyphenyl methacrylate monomers, or combinations thereof; curing the curable resin to form the polymer network; and adding a micelle of the disclosure. In some embodiments the adding is prior to the curing. In some embodiments, the adding is after the curing. In some aspects, the curing comprises photo-curing. In some aspects, the method further comprises exposing the curable resin to a light source (e.g., infrared light, visible light, ultraviolet light, or combinations thereof).

In some aspects, the polymer composition has a melting point of at least 60° C., 80° C., 90° C., 100° C., or at least 110° C. In some aspects, the polymer composition is characterized by one or more of: (A) a flexural modulus of at least about 50 MPa, 75 MPa, 100 MPa, 150 MPa, or at least about 175 MPa; (B) an elastic modulus from at least about 500 MPa to about 1500 MPa, from at least about 550 MPa to about 1000 MPa, or from at least about 550 MPa to about 800 MPa; (C) an elongation at break greater than or equal to 2.5% before and after 24 hours in a wet environment at 37° C.; (D) a water uptake of less than 20 wt % when measured after 24 hours in a wet environment at 37° C.; (E) transmission of at least 20% of visible light through the polymer composition after 24 hours in a wet environment at 37° C.; and/or (F) comprises a polymeric phase having a $T_g$ of at least 60° C., 80° C., 90° C., 100° C., or at least 110° C. In some aspects, the method further comprises fabricating a medical device with the polymer composition. In some aspects, the medical device is a dental appliance. In some aspects, the dental appliance is a dental aligner, a dental expander or a dental spacer.

In various aspects, provided herein is a method of repositioning a patient's teeth, the method comprising: generating a treatment plan for the patient, the plan comprising a plurality of intermediate tooth arrangements for moving teeth along a treatment path from an initial tooth arrangement toward a final tooth arrangement; producing the dental appliance according to the present disclosure, or a dental appliance comprising a polymer composition of this disclosure; and moving on-track, with the dental appliance, at least one of the patient's teeth toward an intermediate tooth arrangement or the final tooth arrangement.

In some aspects, producing the dental appliance comprises 3D printing of the dental appliance. In some aspects, the method further comprises tracking progression of the patient's teeth along the treatment path after administration of the dental appliance to the patient, the tracking comprising comparing a current arrangement of the patient's teeth to a planned arrangement of the patient's teeth. In some aspects, greater than 60% of the patient's teeth are on track with the treatment plan after 2 weeks of treatment. In some aspects, the dental appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth.

DESCRIPTION OF THE FIGURES

The novel features of the disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

The present disclosure provides micelles comprising block co-polymer compounds and polymer compositions comprising the same as well as methods of using (e.g., incorporating into orthodontic articles, incorporating into polymer composition, etc.) and producing the same. The compounds described herein can address an unmet need to produce polymer materials with high $T_g$ values that are imparted with increased toughness useful for various device applications.

The current disclosure describes the synthesis and application of block co-polymers to enhance the toughness of (meth)acrylate-based photopolymer networks, in particular those compositions rich with syringyl compounds (e.g., poly(2,6-dimethoxyphenyl acrylate) or a poly(2,6-dimethoxyphenyl methacrylate)). In some embodiments, the block co-polymers are self-assembling (e.g., they spontaneously form micelles).

Figure 6:
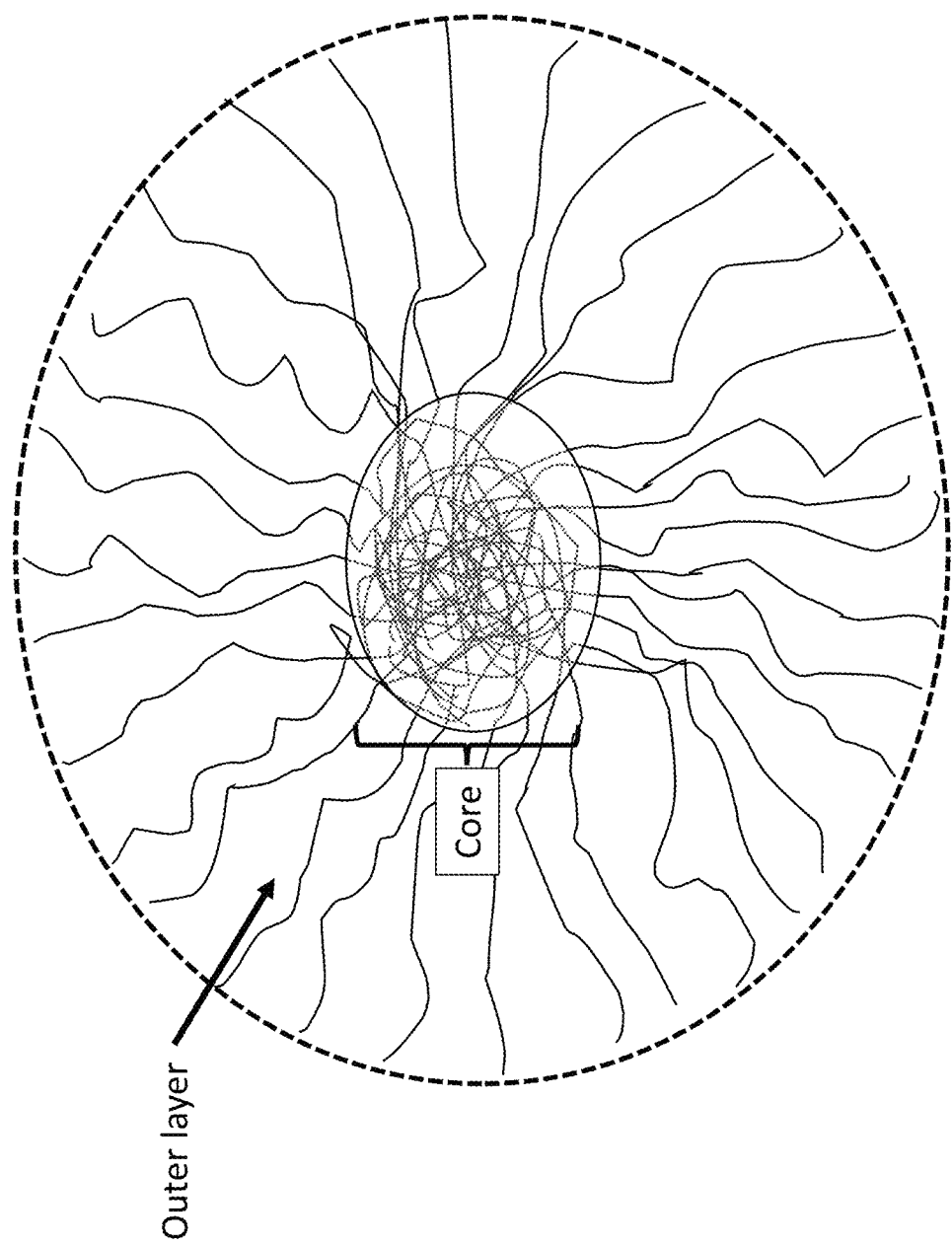
FIG. 6 is an illustration of a cutaway section of a micelle formed from the block co-polymers, the micelle having a core comprising at least a portion of a poly(alkyl acrylate) block of one or more of the block co-polymers and an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers.

Without wishing to be bound by theory, adding a relatively low wt % of the block co-polymers is thought to toughen a syringyl-rich polymer network via an interaction with the di- or tri-block co-polymers. The poly[syringyl (meth)acrylate] block forms an outer layer that is "resinophilic" and a poly(alkyl acrylate) block (e.g., poly(n-butyl acrylate)) forms a core that is "resinophobic." Overall a plurality of block co-polymers form micelles, wherein a poly(alkyl acrylate) block undergoes cavitation to form a rubbery core (see, e.g., FIG. 6); In some embodiments, the micelles form covalent bonds with the photopolymer network (e.g., when terminal groups of the block co-polymer are added that facilitate additional polymerization). When an additional polymerization step occurs, the micelles become fixed and provide dispersed sites within the network where the local properties are effectively disrupted, allowing energy-absorbing processes (e.g., shear yielding) to take place when the network undergoes stress.

As used herein, a "monomer component," "monomer," or a grammatic equivalent refers to a molecule having a reactive functional group capable of undergoing a radical initiated polymerization reaction (e.g., alkenes or functionally substituted alkenes). Such polymerization reaction can be a photo-induced polymerization, e.g., via radical generation. In some embodiments, a monomer component is ethene, chloroethene, fluoroethene, chlorotrifluoroethene, tetrafluoroethene, propene, 2-methylpropene, styrene, propenenitrile, methyl methacrylate, phenyl ethylene, alkyl acrylate (e.g., n-butyl acrylate), 1,6,heandiol diacrylate, 2,6-dimethoxyphenyl acrylate, 2,6-dimethoxyphenyl methacrylate, and the like.

Further provided herein are curable compositions comprising one or more of the micelles of the present disclosure. Such curable (e.g., photo-curable) compositions can further comprise monomers and/or other components such as reactive diluents, telechelic polymers, e.g., toughness modifiers, capable of entering into further polymerization.

Further provided herein are methods of using the micelles, and compositions comprising the same, to produce polymer composition that can be used in devices such as medical and orthodontic devices.

All terms, chemical names, expressions, and designations have their usual meanings which are well-known to those skilled in the art. As used herein, the terms "to comprise" and "comprising" are to be understood as non-limiting, i.e., other components than those explicitly named may be included. The term "consisting" or "consisting of" means that only components that are explicitly described are included. The term "consisting essentially of" limits the scope to specified materials, elements, steps, embodiments, aspects, and limitations except for those that do not materially affect basic and novel characteristics. For each embodiment of this disclosure, it is understood that any specified materials, elements, steps, embodiments, aspects, and limitations may be included with any of the aforementioned phrases.

Number ranges are to be understood as inclusive, i.e., including the indicated lower and upper limits (e.g., the phrase "an integer ranging from 1-3" includes the integers 1, 2, and 3). Furthermore, the term "about," as used herein, and unless clearly indicated otherwise, refers to and encompasses plus or minus 10% of the indicated numerical value(s). For example, "about 10%" may indicate a range of 9% to 11%, and "about 1" may include the range 0.9-1.1.

As used herein, the terms "polymer," "polymer composition," "photopolymer network," or an equivalents refer to a molecule composed of repeating structural units connected by covalent chemical bonds and characterized by a substantial number of repeating units (e.g., equal to or greater than 10 repeating units; in some embodiments, repeating units are equal to or greater than 100, 200, 250, 300, 350, 400, 450, or 500 repeating units) and a molecular weight greater than or equal to 5,000 Daltons (Da) or 5 kDa; for example, in some embodiments, a polymer composition has a molecular weight greater than or equal to 10 kDa, 15 kDa, 20 kDa, 30 kDa, 40 kDa, 50 kDa, or 100 kDa. In some embodiments, micelles, polymer networks, and/or polymer compositions of the present disclosure are the polymerization product of a photoinitiator of this disclosure and (optionally) one or more monomer components. The term polymer includes homopolymers, i.e., polymers consisting essentially of a single repeating monomer species. The term polymer also includes copolymers which are formed when two or more different types (or species) of monomers are linked in the same polymer. Copolymers may comprise two or more different monomer species, and include random, block, alternating, segmented, grafted, tapered and other copolymers.

As used herein, the term "oligomer" generally refers to a molecule composed of repeating structural units connected by covalent chemical bonds and characterized by a number of repeating units less than that of a polymer (e.g., equal to or less than 20 or less than 10 repeating units) and a lower molecular weight than polymers, e.g., less than 5,000 Da or less than 2,000 Da, and in various cases from about 0.5 kDa to about 5 kDa. In some case, oligomers may be the polymerization product of one or more monomer precursors.

As used herein, the term "reactive diluent" generally refers to a substance which reduces the viscosity of another substance, such as a monomer or curable resin. A reactive diluent may become part of another substance, such as a polymer obtained by a polymerization process. In some examples, a reactive diluent is a curable monomer which, when mixed with a curable resin, reduces the viscosity of the resultant formulation, and is incorporated into the polymer that results from polymerization of the formulation.

Oligomer and polymer composition are characterized and differentiated from other mixtures of oligomers and polymers by measurements of molecular weight and molecular weight distributions.

The average molecular weight (M) is the average number of repeating units n times the molecular weight or molar mass ($M_i$) of the repeating unit. The number-average molecular weight ($M_n$) is the arithmetic mean, representing the total weight of the molecules present divided by the total number of molecules.

The term "biocompatible," as used herein, refers to a material that does not elicit an immunological rejection or detrimental effect, referred herein as an adverse immune response, when it is disposed within an in vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert" refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments, the disclosure provides bioinert devices.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and sub-combinations possible of the group are intended to be individually included in the disclosure. When a compound is described herein such that a particular isomer, enantiomer, or diastereomer of the compound is not specified, for example, in a formula or in a chemical name, that description is intended to include each isomer and enantiomer of the compound described individually or in any combination. Additionally, unless otherwise specified, all isotopic variants of compounds disclosed herein are intended to be encompassed by the disclosure. Specific names of compounds are intended to be exemplary, as it is known that one of ordinary skill in the art can name the same compounds differently.

It is noted that as used herein and in the appended claims, the singular forms "a", "an", and "the" include plural reference unless the context clearly dictates otherwise. Thus, for example, reference to "a monomer" includes a plurality of such monomers and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

As used herein, the term "group" or "moiety" may refer to a reactive functional group of a chemical compound. Groups of the present compounds refer to an atom or a collection of atoms that are a part of the compound. Groups of the present disclosure may be attached to other atoms of the compound via one or more covalent bonds. Groups may also be characterized with respect to their valence state. The present disclosure includes groups characterized as monovalent, divalent, trivalent, etc. valence states.

As used herein, the term "substituted" refers to a compound (e.g., an alkyl chain) wherein a hydrogen is replaced by another reactive functional group or atom, as described herein.

As used herein, a  symbol in, e.g.,

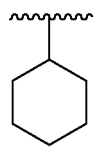 [SMILES: *C1CCCCC1]

indicates that the given moiety, the cyclohexyl moiety in this example, is attached to a molecule via the bond that is "capped" with the wavy line.

"Alkyl" refers to a saturated, straight or branched hydrocarbon chain radical consisting solely of carbon and hydrogen atoms, having from one to twelve carbon atoms ($C_1$-$C_{12}$ alkyl), one to eight carbon atoms ($C_1$-$C_8$ alkyl) or one to six carbon atoms ($C_1$-$C_6$ alkyl), or any value within these ranges, such as $C_4$-$C_6$ alkyl and the like, and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl and the like. The number of carbons referred to relates to the carbon backbone and carbon branching but does not include carbon atoms belonging to any substituents. Unless stated otherwise specifically in the specification, an alkyl group is optionally substituted.

"Alkenyl" refers to an unsaturated, straight or branched hydrocarbon chain radical consisting solely of carbon and hydrogen atoms, which contains one or more carbon-carbon double bonds, having from two to twelve carbon atoms ($C_2$-$C_{12}$ alkenyl), two to eight carbon atoms ($C_2$-$C_8$ alkenyl) or two to six carbon atoms ($C_2$-$C_6$ alkenyl), or any value within these ranges, and which is attached to the rest of the molecule by a single bond, e.g., ethenyl, prop-1-enyl, but-1-enyl, pent-1-enyl, penta-1,4-dienyl, and the like. The number of carbons referred to relates to the carbon backbone and carbon branching but does not include carbon atoms belonging to any substituents. Unless stated otherwise specifically in the specification, an alkenyl group is optionally substituted.

The term "alkynyl" refers to unsaturated straight or branched hydrocarbon radical, having 2 to 12 carbon atoms ($C_2$-$C_{12}$ alkynyl), two to nine carbon atoms ($C_2$-$C_9$ alkynyl), or two to six carbon atoms ($C_2$-$C_6$ alkynyl), or any value within these ranges, and having at least one carbon-carbon triple bond. Examples of alkynyl groups may be selected from the group consisting of ethynyl, propargyl, but-1-ynyl, but-2-ynyl and the like. The number of carbons referred to relates to the carbon backbone and carbon branching but does not include carbon atoms belonging to any substituents. Unless stated otherwise specifically in the specification, an alkynyl group is optionally substituted.

"Alkoxy" refers to a radical of the formula —$OR_a$ where $R_a$ is an alkyl radical as defined above containing one to twelve carbon atoms ($C_1$-$C_{12}$ alkoxy), one to eight carbon atoms ($C_1$-$C_8$ alkoxy) or one to six carbon atoms ($C_1$-$C_6$ alkoxy), or any value within these ranges. Unless stated otherwise specifically in the specification, an alkoxy group is optionally substituted.

"Cycloalkyl" refers to a non-aromatic monocyclic or polycyclic carbocyclic radical consisting solely of carbon and hydrogen atoms, which may include fused or bridged ring systems, having from three to fifteen ring carbon atoms ($C_3$-$C_{15}$ cycloalkyl), from three to ten ring carbon atoms ($C_3$-$C_{10}$ cycloalkyl), or from three to eight ring carbon atoms ($C_3$-$C_8$ cycloalkyl), or any value within these ranges such as three to four carbon atoms ($C_3$-$C_4$ cycloalkyl), and which is saturated or partially unsaturated and attached to the rest of the molecule by a single bond. Monocyclic radicals include, for example, cyclopropyl, cyclobutyl, cyclopentyl, cyclohexyl, cycloheptyl, and cyclooctyl. Polycyclic radicals include, for example, adamantyl, norbornyl, decalinyl, 7,7-dimethyl-bicyclo[2.2.1]heptanyl, and the like. Unless otherwise stated specifically in the specification, a cycloalkyl group is optionally substituted.

Aryl groups include groups having one or more 5-, 6-, 7- or 8-membered aromatic rings, including heterocyclic aromatic rings. The term heteroaryl specifically refers to aryl groups having at least one 5-, 6-, 7- or 8-member heterocyclic aromatic ring. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocyclic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the disclosure at any suitable point of attachment. In some embodiments, aryl groups contain between 5 and 30 carbon atoms. In some embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents, and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents, and the aryl groups are optionally substituted. Specific alkylaryl groups are alkyl-substituted phenyl groups such as methylphenyl. Substituted arylalkyl groups include fully halogenated or semi-halogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group "—$CH_2$—" derived from an alkyl group as defined herein. The disclosure includes compounds having one or more alkylene groups. Alkylene groups in some compounds function as attaching and/or spacer groups. Compounds of the disclosure may have substituted and/or unsubstituted $C_1$-$C_{20}$ alkylene, $C_1$-$C_{10}$ alkylene and $C_1$-$C_6$ alkylene groups.

As used herein, the terms "cycloalkylene" and "cycloalkylene group" are used synonymously and refer to a divalent group derived from a cycloalkyl group as defined herein. The disclosure includes compounds having one or more cycloalkylene groups. Cycloalkyl groups in some compounds function as attaching and/or spacer groups. Compounds of the disclosure may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The disclosure includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the disclosure include substituted and/or unsubstituted $C_3$-$C_{30}$ arylene, $C_3$-$C_{20}$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The disclosure includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the disclosure include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the disclosure include substituted and/or unsubstituted $C_2$-$C_{20}$ alkenylene, $C_2$-$C_{10}$ alkenylene and $C_2$-$C_5$ alkenylene groups.

As used herein, the terms "cycloalkenylene" and "cycloalkenylene group" are used synonymously and refer to a divalent group derived from a cycloalkenyl group as defined herein. The disclosure includes compounds having one or more cycloalkenylene groups. Cycloalkenylene groups in some compounds function as attaching and/or spacer groups. Compounds of the disclosure include substituted and/or unsubstituted $C_3$-$C_{20}$ cycloalkenylene, $C_3$-$C_{10}$ cycloalkenylene and $C_3$-$C_5$ cycloalkenylene groups.

As used herein, the terms "alkynylene" and "alkynylene group" are used synonymously and refer to a divalent group derived from an alkynyl group as defined herein. The disclosure includes compounds having one or more alkynylene groups. Alkynylene groups in some compounds function as attaching and/or spacer groups. Compounds of the disclosure include substituted and/or unsubstituted $C_2$-$C_{20}$ alkynylene, $C_2$-$C_{10}$ alkynylene and $C_2$-$C_5$ alkynylene groups.

As used herein, the terms "halo" and "halogen" can be used interchangeably and refer to a halogen group such as a fluoro (—F), chloro (—Cl), bromo (—Br) or iodo (—I)

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and reactive functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)n-alkoxy wherein n is an integer from 1 to 10, e.g., 1 to 4, and in some embodiments 1 to 3.

The term "heteroalkyl," as used herein, generally refers to an alkyl, alkenyl, or alkynyl group as defined herein, wherein at least one carbon atom of the alkyl group is replaced with a heteroatom. In some instances, heteroalkyl groups may contain from 1 to 18 non-hydrogen atoms (carbon and heteroatoms) in the chain, or from 1 to 12 non-hydrogen atoms, or from 1 to 6 non-hydrogen atoms, or from 1 to 4 non-hydrogen atoms. Heteroalkyl groups may be straight or branched, and saturated or unsaturated. Unsaturated heteroalkyl groups have one or more double bonds and/or one or more triple bonds. Heteroalkyl groups may be unsubstituted or substituted. Exemplary heteroalkyl groups include, but are not limited to, alkoxyalkyl (e.g., methoxymethyl), and aminoalkyl (e.g., alkylaminoalkyl and dialkylaminoalkyl). Heteroalkyl groups may be optionally substituted with one or more substituents.

The term "carbonyl" or "oxo," as used herein, for example in the context of $C_{1-6}$ carbonyl substituents, generally refers to a carbon chain of given length (e.g, $C_{1-6}$), wherein each of the carbon atom of a given carbon chain can form the carbonyl bond, as long as it chemically feasible in terms of the valence state of that carbon atom. Thus, in some instance, the "$C_{1-6}$ carbonyl" substituent refers to a carbon chain of between 1 and 6 carbon atoms, and either the terminal carbon contains the carbonyl functionality, or an inner carbon contains the carbonyl functionality, in which case the substituent could be described as a ketone. The term "carboxy", as used herein, for example in the context of $C_{1-6}$ carboxyl substituents, generally refers to a carbon chain of given length (e.g., $C_{1-6}$), wherein a terminal carbon contains the carboxy functionality, unless otherwise defined herein.

"Poly(alkyl acrylate)" as used herein refers to a polymer or polymeric block having the following structure:

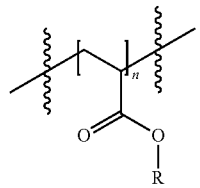

wherein:
R is an alkyl as defined herein; and
n is an integer greater than 2.

In some embodiments, the alkyl is saturated and unsubstituted. In some embodiments, the alkyl is a $C_1$-$C_6$ alkyl. In some embodiments, the alkyl is a $C_1$-$C_4$ alkyl. In some embodiments, the alkyl is an n-alkyl.

As used herein, "poly(aryl acrylate)" refers to a polymer of polymeric block having the following structure:

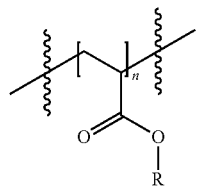

wherein:
R is an aryl as defined herein; and
n is an integer greater than 2.

In certain embodiments, the aryl is a substituted aryl. In some embodiments, the aryl is a di-substituted aryl. In some embodiments, the aryl is a di-substituted aryl that is substituted with alkoxy substituents. In some embodiments, the aryl is a 2,6-dimethoxyphenyl.

As used herein, "poly(aryl acrylate)" refers to a polymer of polymeric block having the following structure:

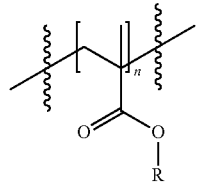

wherein:
R is an aryl as defined herein; and
n is an integer greater than 2.

In certain embodiments, the aryl is a substituted aryl. In some embodiments, the aryl is a di-substituted aryl. In some embodiments, the aryl is a di-substituted aryl that is substituted with alkoxy substituents. In some embodiments, the aryl is a 2,6-dimethoxyphenyl.

As to any of the groups described herein that contain one or more substituents, it is understood that such groups do not contain any substitution or substitution patterns which are sterically impractical and/or synthetically non-feasible. In addition, the compounds of this disclosure include all stereochemical isomers arising from the substitution of these compounds.

Unless otherwise defined herein, optional substituents for any alkyl, alkenyl, and aryl group includes substitution with one or more of the following substituents, among others: halogen, including fluorine, chlorine, bromine or iodine;
  pseudohalides, including —CN, —OCN (cyanate), —NCO (isocyanate), —SCN (thiocyanate) and —NCS (isothiocyanate);
  —COOR, where R is a hydrogen or an alkyl group or an aryl group and more specifically where R is a methyl, ethyl, propyl, butyl, or phenyl group all of which groups are optionally substituted;
  —COR, where R is a hydrogen or an alkyl group or an aryl group and more specifically where R is a methyl, ethyl, propyl, butyl, or phenyl group all of which groups are optionally substituted;
  —CON(R)$_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
  —OCON(R)$_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
  —N(R)$_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;
  —SR, where R is hydrogen or an alkyl group or an aryl group and more specifically where R is hydrogen, methyl, ethyl, propyl, butyl, or a phenyl group, which are optionally substituted;
  —SO$_2$R, or —SOR, where R is an alkyl group or an aryl group and more specifically where R is a methyl, ethyl, propyl, butyl, or phenyl group, all of which are optionally substituted;
  —OCOOR, where R is an alkyl group or an aryl group;
  —SO$_2$N(R)$_2$, where each R, independently of each other R, is a hydrogen, or an alkyl group, or an aryl group all of which are optionally substituted and wherein R and R can form a ring that can contain one or more double bonds and can contain one or more additional carbon atoms; and
  —OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups that contain one or more substituents, it is understood that such groups do not contain any substitution or substitution patterns which are sterically impractical and/or synthetically non-feasible. In addition, as further described herein, the compounds of this disclosure can include all stereochemical isomers (and racemic mixtures) arising from the substitution of these compounds.

One embodiment provides a block co-polymer having at least a first block and a second block, wherein:
  i) the first block is a poly(aryl acrylate) or a poly(aryl methacrylate) block having 10-300 repeat units or a poly(aryl methacrylate) block having 10-300 repeat units;
  ii) the second block is a poly(alkyl acrylate) block having between 10-300 repeat units.

Another embodiment provides a block co-polymer comprising:
  i) a rigid block comprising a poly(aryl acrylate) having a glass transition temperature ranging from 100° C. to 150° C.; and
  ii) a soft block comprising a poly(alkyl acrylate) polymer having a glass transition temperature ranging from −75° C. to −25° C.

One embodiment provides a micelle comprising a plurality of a block co-polymers comprising:
  i) an outer shell core comprising at least a portion of a rigid block comprising a poly(aryl acrylate) having a glass transition temperature ranging from 100° C. to 150° C.; and
  ii) a core comprising at least a portion of a soft block comprising a poly(alkyl acrylate) polymer having a glass transition temperature ranging from −75° C. to −25° C.

One embodiment provides a block co-polymer having at least a first block and a second block, wherein:
  i) the first block is a poly(aryl acrylate) block or a poly(aryl methacrylate) block comprising the following substructure:

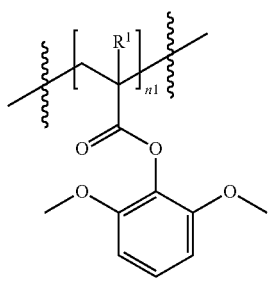

wherein:

each occurrence of $R^1$ is independently hydrogen or $CH_3$;

n1 is an integer ranging from 10-300; and ii) the second block is a poly(alkyl acrylate) block comprising the following substructure:

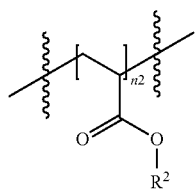

wherein:

each occurrence of $R^2$ is independently $C_1$-$C_6$ alkyl; and n2 is an integer ranging from 10-300.

In some embodiments, the block co-polymer is a di-block co-polymer comprising the following substructure:

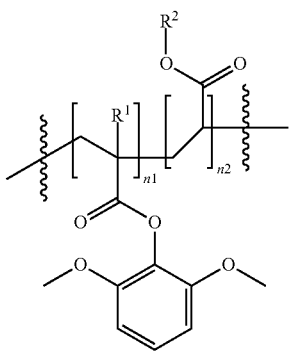

wherein:

each occurrence of $R^1$ is independently hydrogen or $CH_3$;

each occurrence of $R^2$ is independently $C_1$-$C_6$ alkyl; and n1 and n2 are each independently an integer ranging from 10-300.

In some embodiments, the block co-polymer is tri-block co-polymer comprising the following substructure:

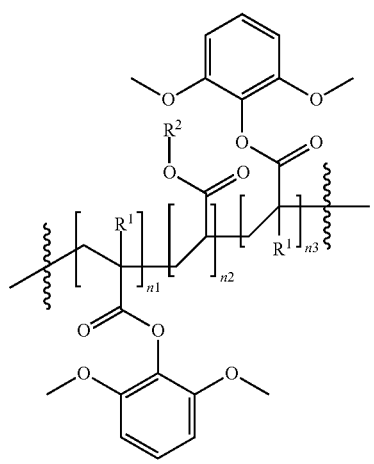

wherein:

each occurrence of $R^1$ is independently hydrogen or $CH_3$;

each occurrence of $R^2$ is independently $C_1$-$C_6$ alkyl; and n1, n2, and n3 are each independently an integer ranging from 10-300.

In certain embodiments, n3 is an integer ranging from 10-100. In some embodiments, the block co-polymer has the following structure:

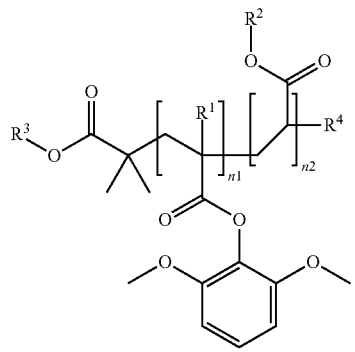

wherein:

each occurrence of $R^1$ is independently hydrogen or $CH_3$;

each occurrence of $R^2$ is independently $C_1$-$C_6$ alkyl;

$R^3$ is $C_1$-$C_6$ alkyl, $C_1$-$C_6$ hydroxyalkyl, or $R^3$ has the following structure:

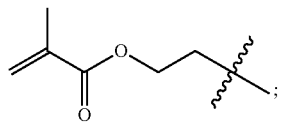 [SMILES: *CCOC(=O)C(=C)C]

$R^4$ is halo;

n1 and n2 are each an integer ranging from 10-300.

In some embodiments, n1 ranges from 10-200, from 10-150, from 10-100, from 10-50, from 10-25, from 20-200, from 30-200, from 50-200, from 100-200, or from 150-200.

In certain embodiments, n2 ranges from 10-300, from 10-250, from 10-200, from 10-150, from 10-100, from 10-50, from 10-25, from 20-300, from 30-300, from 50-300, from 100-300, from 150-300, from 200-300, or from 250-300.

In certain embodiments, n3 ranges from 10-300, from 10-250, from 10-200, from 10-150, from 10-100, from 10-50, from 10-25, from 20-300, from 30-300, from 50-300, from 100-300, from 150-300, from 200-300, or from 250-300.

In certain embodiments, $R^3$ is ethyl or —$CH_2CH_2OH$. In some embodiments, $R^3$ has the following structure:

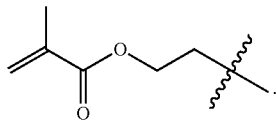

In some embodiments, $R^4$ is bromo. In certain embodiments, the block co-polymer has the following structure:

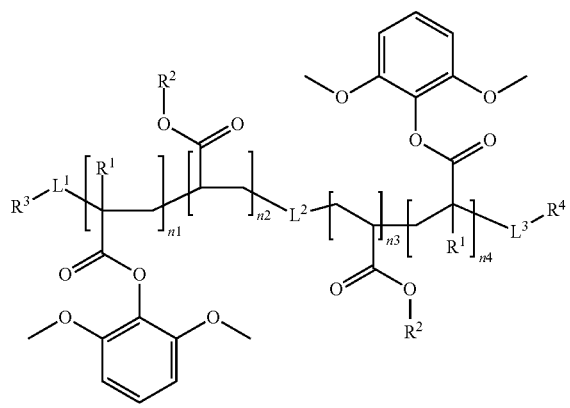

wherein:
each occurrence of $R^1$ is independently hydrogen or $CH_3$;
each occurrence of $R^2$ is independently $C_1$-$C_6$ alkyl;
$R^3$ and $R^4$ are each independently halo;
$L^1$ and $L^3$ each independently have the following structure:

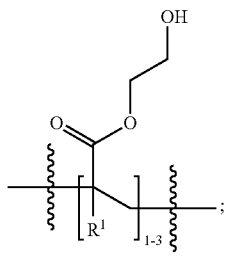

$L^2$ has the following structure:

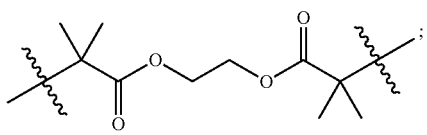 [SMILES: *C(C)(C)C(=O)OCCOC(=O)C(*)(C)C]

and
n1, n2, n3, and n4 are each independently an integer ranging from 10-300.

In certain embodiments, each occurrence of $R^1$ is hydrogen. In some embodiments, each occurrence of $R^1$ is methyl.

In certain embodiments, each occurrence of $R^2$ is independently methyl, ethyl, propyl, iso-propyl, 2-methyl propyl, n-butyl, sec-butyl, or tert-butyl. In some embodiments, each occurrence of $R^2$ is n-butyl.

In certain embodiments, n1 is an integer ranging from 10-100. In some embodiments, n2 is an integer ranging from 10-100.

In some embodiments, $R^3$ and $R^4$ are both bromo.

One embodiment provides a micelle comprising a plurality of block co-polymers, the micelle comprising:
  i) a core comprising at least a portion of a poly(alkyl acrylate) block of one or more of the block co-polymers; and
  ii) an outer layer comprising at least a portion of a poly(aryl acrylate) (e.g., poly(2,6-dimethoxyphenyl acrylate)) block or a poly(aryl methacrylate) (e.g., poly(2,6-dimethoxyphenyl methacrylate)) block of one or more of the block co-polymers.

In some embodiments, the poly(aryl acrylate) (e.g., poly(2,6-dimethoxyphenyl acrylate)) block or the poly(aryl methacrylate) (e.g., poly(2,6-dimethoxyphenyl methacrylate)) block comprises the following substructure:

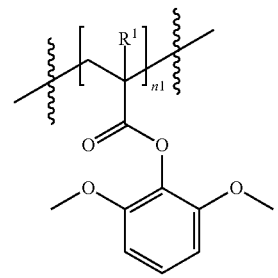

wherein:
each occurrence of $R^1$ is independently hydrogen or $CH_3$; and
n1 is an integer ranging from 10-300.

In some embodiments, n1 is an integer ranging from 10-100, from 20-200, from 30-200, from 100-200, or from 150-200.

In some embodiments, the poly(alkyl acrylate) block comprises the following substructure:

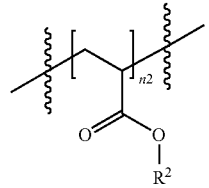

wherein:
each occurrence of $R^2$ is independently $C_1$-$C_6$ alkyl; and
n2 is an integer ranging from 10-300.

In some embodiments, each occurrence of $R^2$ is independently methyl, ethyl, propyl, iso-propyl, 2-methyl propyl, n-butyl, sec-butyl, or tert-butyl. In some embodiments, each occurrence of $R^2$ is n-butyl.

In some embodiments, n2 is an integer ranging from 10-100, from 20-300, from 30-300, from 100-300, or from 250-300.

In some embodiments, one or more of the block co-polymers are di-block co-polymers comprising the following substructure:

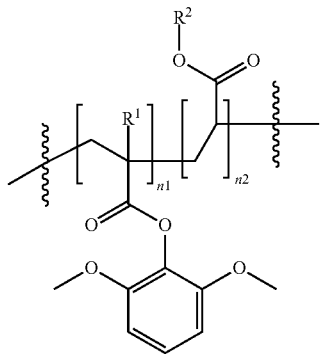

wherein:
each occurrence of $R^1$ is independently hydrogen or $CH_3$;
each occurrence of $R^2$ is independently $C_1$-$C_6$ alkyl; and
n1 and n2 are each independently an integer ranging from 10-300.

In some embodiments, each of the block co-polymers are di-block co-polymers comprising the following substructure:

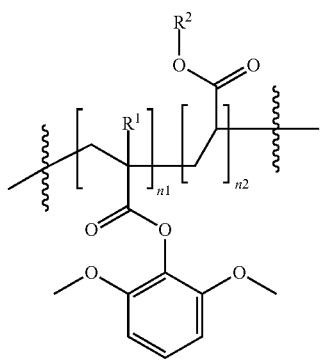

wherein:
each occurrence of $R^1$ is independently hydrogen or $CH_3$;
each occurrence of $R^2$ is independently $C_1$-$C_6$ alkyl; and
n1 and n2 are each independently an integer ranging from 10-300.

In some embodiments, each occurrence of $R^2$ is independently methyl, ethyl, propyl, iso-propyl, 2-methyl propyl, n-butyl, sec-butyl, or tert-butyl. In certain embodiments, each occurrence of $R^2$ is n-butyl. In some embodiments, n1 is an integer ranging from 10-100, from 20-500, from 30-500, from 100-500, or from 250-500. In certain embodiments, n2 is an integer ranging from 10-100, from 20-500, from 30-500, from 100-500, or from 250-500.

In some embodiments, at least one of the block co-polymers are tri-block co-polymers comprising the following substructure:

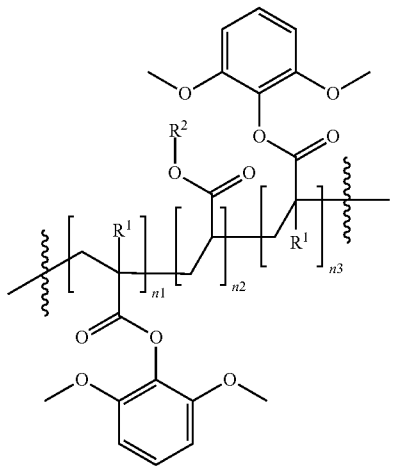

wherein:
each occurrence of $R^1$ is independently hydrogen or $CH_3$;
each occurrence of $R^2$ is independently $C_1$-$C_6$ alkyl; and
n1, n2, and n3 are each independently an integer ranging from 10-300.

In some embodiments, each of the block co-polymers are tri-block co-polymers comprising the following substructure:

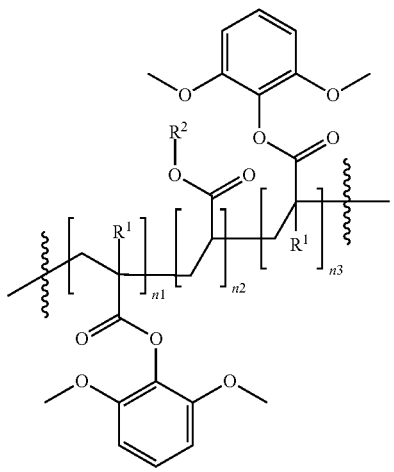

wherein:
each occurrence of $R^1$ is independently hydrogen or $CH_3$;
each occurrence of $R^2$ is independently $C_1$-$C_6$ alkyl; and
n1, n2, and n3 are each independently an integer ranging from 10-300.

In some embodiments, each occurrence of $R^2$ is independently methyl, ethyl, propyl, iso-propyl, 2-methyl propyl, n-butyl, sec-butyl, or tert-butyl. In certain embodiments, each occurrence of $R^2$ is n-butyl. In some embodiments, n1 is an integer ranging from 10-100, from 20-500, from 30-500, from 100-500, or from 250-500. In certain embodiments, n2 is an integer ranging from 10-100, from 20-500, from 30-500, from 100-500, or from 250-500. In certain embodiments, n3 is an integer ranging from 10-100, from 20-500, from 30-500, from 100-500, or from 250-500.

In certain embodiments, at least one of the block co-polymers has the following structure:

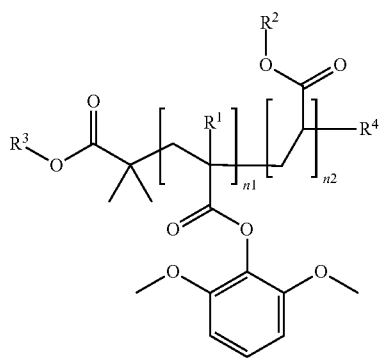

wherein:
  each occurrence of $R^1$ is independently hydrogen or $CH_3$;
  each occurrence of $R^2$ is independently $C_1$-$C_6$ alkyl;
  $R^3$ is $C_1$-$C_6$ alkyl, $C_1$-$C_6$ hydroxyalkyl, or $R^3$ has the following structure:

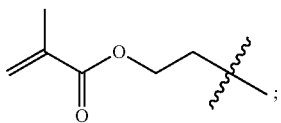 [SMILES: *CCOC(=O)C(=C)C]

$R^4$ is halo; and
  n1 and n2 are each an integer ranging from 10-300.

In certain embodiments, each of the block co-polymers has the following structure:

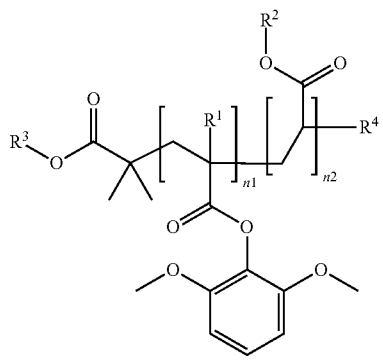

wherein:
  each occurrence of $R^1$ is independently hydrogen or $CH_3$;
  each occurrence of $R^2$ is independently $C_1$-$C_6$ alkyl;
  $R^3$ is $C_1$-$C_6$ alkyl, $C_1$-$C_6$ hydroxyalkyl, or $R^3$ has the following structure:

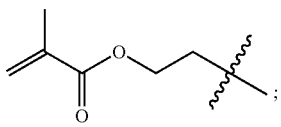 [SMILES: *CCOC(=O)C(=C)C]

$R^4$ is halo; and
  n1 and n2 are each an integer ranging from 10-300.

In some embodiments, each occurrence of $R^2$ is independently methyl, ethyl, propyl, iso-propyl, 2-methyl propyl, n-butyl, sec-butyl, or tert-butyl. In certain embodiments, each occurrence of $R^2$ is n-butyl.

In some embodiments, $R^3$ is ethyl or —$CH_2CH_2OH$. In certain embodiments, $R^3$ has the following structure:

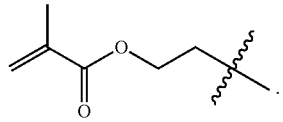 [SMILES: *CCOC(=O)C(=C)C]

In some embodiments, n1 is an integer ranging from 10-100, from 20-500, from 30-500, from 100-500, or from 250-500. In certain embodiments, n2 is an integer ranging from 10-100, from 20-500, from 30-500, from 100-500, or from 250-500.

In some embodiments, $R^4$ is bromo.

In certain embodiments, at least one of the block co-polymers has the following structure:

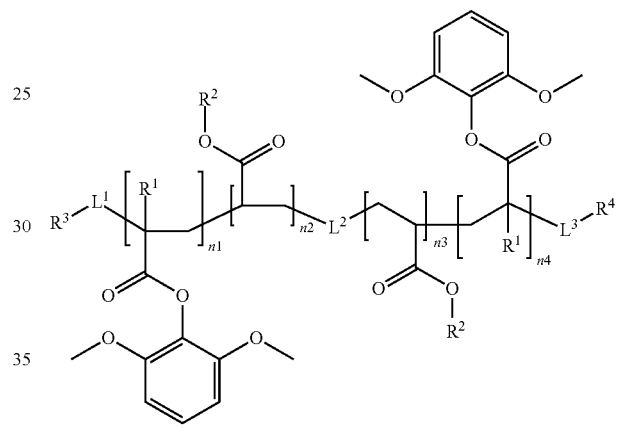

wherein:
  each occurrence of $R^1$ is independently hydrogen or $CH_3$;
  each occurrence of $R^2$ is independently $C_1$-$C_6$ alkyl;
  $R^3$ and $R^4$ are each independently halo;
  $L^1$ and $L^3$ each independently have the following structure:

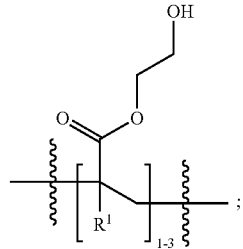

$L^2$ has the following structure:

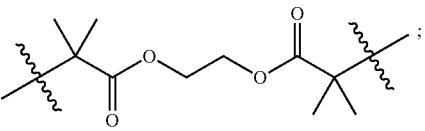 [SMILES: *C(C)(C)C(=O)OCCOC(=O)C(*)(C)C]

and n1, n2, n3, and n4 are each independently an integer ranging from 10-300.

In some embodiments, n1, n2, n3, and n4 are each independently an integer ranging from 10-200.

In some embodiments, each of the block co-polymers has the following structure:

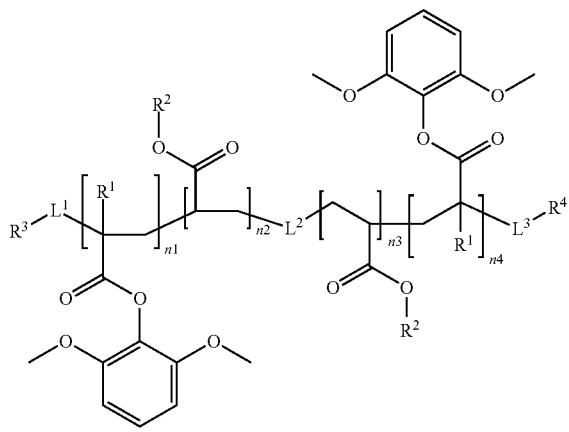

wherein:

each occurrence of $R^1$ is independently hydrogen or $CH_3$;

each occurrence of $R^2$ is independently $C_1$-$C_6$ alkyl;

$R^3$ and $R^4$ are each independently halo;

$L^1$ and $L^3$ each independently have the following structure:

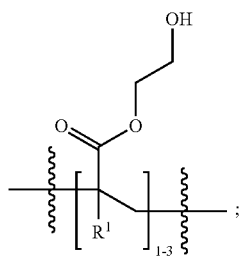

$L^2$ has the following structure:

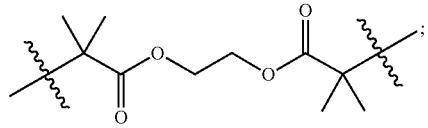 [SMILES: *C(C)(C)C(=O)OCCOC(=O)C(*)(C)C]

and n1, n2, n3, and n4 are each independently an integer ranging from 10-300.

In certain embodiments, n1, n2, n3, and n4 are each independently an integer ranging from 10-200.

In some embodiments, each occurrence of $R^2$ is independently methyl, ethyl, propyl, iso-propyl, 2-methyl propyl, n-butyl, sec-butyl, or tert-butyl. In certain embodiments, each occurrence of $R^2$ is n-butyl.

In certain embodiments, n1 is an integer ranging from 10-100, from 20-500, from 30-500, from 100-500, or from 250-500. In some embodiments, n2 is an integer ranging from 10-100, from 20-500, from 30-500, from 100-500, or from 250-500.

In some embodiments, the block co-polymers include a polymerizable moiety (e.g., a terminal acrylate, a terminal methacrylate, etc.). In some embodiments, the block co-polymers are non-reactive to further polymerization conditions (e.g., photopolymerization). Some embodiments provide a photocurable resin comprising the block co-polymers of the present disclosure. In some embodiments, the photocurable mixture is then subjected to a curing step (e.g., irradiation with light). In some embodiments, the photocurable resin comprises an initiator (e.g., a photoinitiator, a thermal initiator, etc.).

In some embodiments, the micelle is covalently bound to the photopolymer network. In some embodiments, a plurality of covalent bonds between the micelle and the polymer network are established during a curing step. In some embodiments, the micelle is dispersed and in physical contact with the polymer network (e.g., not covalently bound). In some embodiments, the micelles are added to the polymer network after a curing step. In some embodiments, the micelles are added during a curing step. In some embodiments, the micelles are added before a curing step (e.g., to a photocurable resin).

In some embodiments, the photocurable resin includes monomer components and no polymer components. In some embodiments, the photocurable resin includes monomer components and some polymer components (e.g., polymer blocks that are extended to form block co-polymers). In some embodiments, the photocurable resin comprises (i) micelles according to this disclosure; and (ii) monomer components, polymer components, or combinations thereof.

The present disclosure provides photocurable resin s that can comprise a plurality (e.g., >1) of polymerizable components.

Some embodiments, provide a photocurable resin comprising:

i) aryl acrylate monomers, aryl methacrylate monomers, or combinations thereof; and ii) a macroinitiator compound having the following structure:

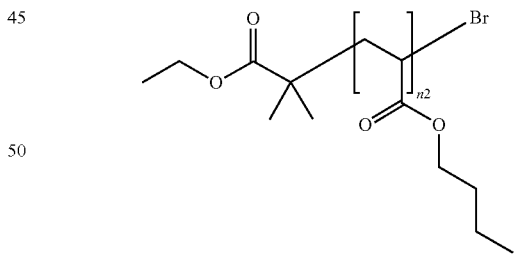

wherein:

n2 is an integer ranging from 10-500.

One embodiment provides a photocurable resin comprising: i) aryl acrylate monomers, aryl methacrylate monomers, or combinations thereof; ii) alkyl acrylate monomers; and iii) an initiator.

A photocurable resin of the present disclosure can comprise one or more species of polymerizable monomers. Such polymerizable monomers can be used as reactive diluents. In various cases, a polymerizable monomer can comprise an acrylate or methacrylate moiety for incorporation into an oligomeric or polymeric backbone, coupled to a linear or cyclic (e.g., mono-, bi-, or tricyclic) side-chain moiety. Generally, any aliphatic, cycloaliphatic or aromatic molecule with a mono-functional polymerizable reactive functional group can be used (also includes liquid crystalline monomers). In some instances, the polymerizable reactive functional groups is an acrylate or methacrylate group. In some instances, a polymerizable monomer is a syringol, guaiacol, or vanillin derivative, e.g., homosalic methacrylate (HSMA), syringyl methacrylate (SMA), isobornyl methacrylate (IBOMA), isobornyl acrylate (IBOA), etc. A reactive diluent used herein can have a low vapor pressure as further described below. In some embodiments, however, no or only low amounts (e.g., 5% w/w or less) of a reactive diluent may be used.

In some embodiments, the polymerizable monomers include one of the following structures:

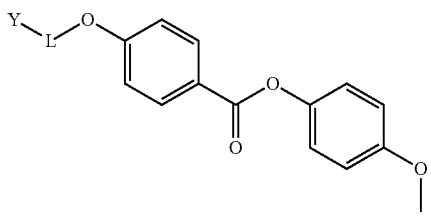

wherein:
Y is a polymerizable functional group (e.g., methacrylate, acrylate, etc.); and
L is an alkylene linker, a cycloalkylene linker, or an arylene linker.

In some embodiments, the polymerizable monomers include one of the following structures:

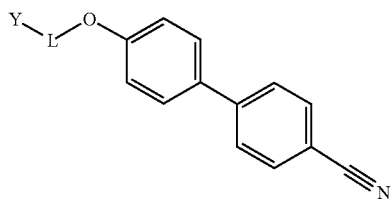

wherein:
Y is a polymerizable functional group (e.g., methacrylate, acrylate, etc.); and
L is an alkylene linker, a cycloalkylene linker, or an arylene linker.

In some embodiments, the polymerizable monomers include one of the following structures:

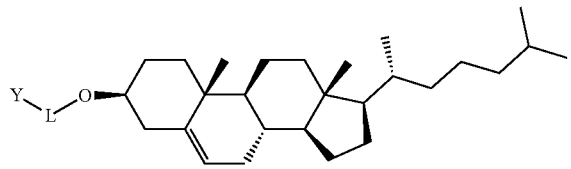

wherein:
Y is a polymerizable functional group (e.g., methacrylate, acrylate, etc.); and
L is an alkylene linker, a cycloalkylene linker, or an arylene linker.

In some embodiments, a polymerizable monomer of the present disclosure can have a low vapor pressure at an elevated temperature and a high boiling point. Such low vapor pressure can be particularly advantageous for use of such monomer in curable (e.g., photocurable) compositions and additive manufacturing where elevated temperatures (e.g., 60° C., 80° C., 90° C., or higher) may be used. In various instances, a polymerizable monomer can have a vapor pressure of at most about 12 Pa at 60° C. In various instances, a polymerizable monomer can have a vapor pressure of at most about 2 Pa to 10 Pa at 60° C. In various instances, a polymerizable monomer can have a vapor pressure of at most about 2 Pa to 5 Pa at 60° C. Thus, in some embodiments, a polymerizable monomer of the present disclosure can have a low mass loss at an elevated temperature. As used herein, a mass loss of a compound at a certain temperature (e.g., 90° C.) for a certain time (e.g., 2 hours) can be used as a measure for volatility of such compounds. Herein, "substantially no volatility" can refer to a mass loss <1 wt % at the respective temperature, e.g., at 90° C. for 2 hours. In various instances, a polymerizable monomer of the present disclosure can have a mass loss <1 wt % at the respective temperature at 90° C. after heating at that temperature for 2 hours. In some embodiments, a polymerizable monomer can have a mass loss of less than about 0.5% after heating at 90° C. for 2 h. In some embodiments, a polymerizable monomer can have a mass loss of about 0.1% to about 0.45% after heating at 90° C. for 2 h. In some embodiments, a polymerizable monomer can have a mass loss of about 0.05% to about 0.25% after heating at 90° C. for 2 h.

In some embodiments, a polymerizable monomer of the present disclosure can have a molecular weight of at least about 150 Da, 200 Da, 250 Da, 300 Da, 350 Da, 400 Da, or at least about 450 Da. In some instances, a polymerizable monomer has a molecular weight of less than about 740 Da.

In some embodiments, a polymerizable monomer can have a melting point of at least about 20° C., 30° C., 40° C., 50° C., or higher. In some embodiments, the polymerizable monomers have a melting point which is lower than the processing temperatures employed in current high temperature lithography-based photo-polymerization processes, which are typically in the range of 50-120° C., such as 90-120° C. Therefore, polymerizable monomers provided herein that can be used as reactive diluents can have a melting point <120° C., <90° C., <70° C., or even <50° C. or <30° C., which provides for low viscosities of the melts and, consequently, for more pronounced viscosity-lowering effects when they are used as reactive diluents for resins to be cured by means of high temperature lithography-based polymerization. In some cases, they are liquid at room temperature, which, in addition to the above advantages, facilitates their handling.

In various embodiments, any of the polymerizable monomers described herein can be a photo-polymerizable monomer. In various cases, a photo-polymerizable monomer of the present disclosure can be a component of a polymerizable composition (e.g., a photocurable resin). In some embodiments, the polymerizable composition can comprise one or more species of polymerizable compounds in an amount from about 5% by weight (w/w) to about 20% w/w, or more. In such cases, a polymerizable compound (e.g., a monomer) can be present in an amount from about 5% w/w to about 7% w/w, from about 7% w/w to about 10% w/w, from about 9% w/w to about 15% w/w, or from about 12% w/w to about 18% w/w. In some cases, a polymerizable compound can be present in an amount of about 5%, 6%, 7%, 8%, 9%, 10%, 11%, 12%, 13%, 14%, 15%, 16%, 17%, 18%, 19%, 20% w/w, or more.

A photocurable resin disclosed herein, can comprise one or more species of polymerizable monomers in an amount from about 25% w/w to about 45% w/w, from about 30% w/w to about 40% w/w, or from about 40% w/w to about 65% w/w. In some cases, a resin provided herein can comprise less than about 65%, 45%, 40%, 35%, 30%, 25%, or less than about 20% w/w of the polymerizable monomer.

A photocurable resin disclosed herein, can comprise one or more species of telechelic polymers, telechelic oligomers, or a combination thereof, in an amount from about 15% w/w to about 60% w/w, from about 35% w/w to about 55% w/w, from about 40% w/w to about 55% w/w, or from about 40% w/w to about 50% w/w.

Such photocurable resin described herein can further comprise one or more photoinitiators. Such photoinitiator, when activated with light of an appropriate wavelength (e.g., UV/VIS) can initiate a polymerization reaction (e.g., during photo-curing) between the telechelic polymers, monomers, and other potentially polymerizable components that may be present in the photocurable resin, to form a micelle or polymer composition as further described herein. Generally, photoinitiators described in the present disclosure can include those that can be activated with light and initiate polymerization of the polymerizable components of the formulation. A "photoinitiator," as used herein, may generally refer to a compound that can produce radical species and/or promote radical reactions upon exposure to radiation (e.g., UV or visible light).

In some embodiments, a photocurable resin herein further comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoinitiator. In some embodiments, the photoinitiator is a free radical photoinitiator. In certain embodiments, the free radical photoinitiator comprises an alpha hydroxy ketone moiety (e.g., 2-hydroxy-2-methylpropiophenone or 1-hydroxycyclohexyl phenyl ketone), an alpha-amino ketone (e.g., 2-benzyl-2-(dimethylamino)-4'-morpholinobutyrophenone or 2-methyl-1-[4-(methylthio)phenyl]-2-morpholinopropan-1-one), 4-methyl benzophenone, an azo compound (e.g., 4,4'-Azobis(4-cyanovaleric acid), 1,1'-Azobis(cyclohexanecarbonitrile, Azobisisobutyronitrile, 2,2'-Azobis(2-methylpropionitrile), or 2,2'-Azobis(2-methylpropionitrile)), an inorganic peroxide, an organic peroxide, or any combination thereof. In some embodiments, the composition comprises a photoinitiator comprising SpeedCure TPO-L (ethyl(2,4,6-trimethylbenzoyl)phenyl phosphinate). In some embodiments, a photo-curable composition comprises a photoinitiator selected from a benzophenone, a mixture of benzophenone and a tertiary amine containing a carbonyl group which is directly bonded to at least one aromatic ring, and an Irgacure (e.g., Irgacure 907 (2-methyl-1-[4-(methylthio)-phenyl]-2-morpholino-propanone-1) or Irgacure 651 (2,2-dimethoxy-1,2-diphenylethan-1-one). In some embodiments, the photoinitiator comprises an acetophenone photoinitiator (e.g., 4'-hydroxyacetophenone, 4'Ophenoxyacetophenone, 4'-ethoxyaceto-phenone), a benzoin, a benzoin derivative, a benzil, a benzil derivative, a benzophenone (e.g., 4-benzoylbiphenyl, 3,4-(dimethylamino)benzophenone, 2-methylbenzophenone), a cationic photoinitiator (e.g., diphenyliodonium nitrate, (4-iodophenyl)diphenylsulfonium triflate, triphenylsulfonium triflate), an anthraquinone, a quinone (e.g., camphorquinone), a phosphine oxide, a phosphinate, 9,10-phenanthrenequinone, a thioxanthone, any combination thereof, or any derivative thereof.

In some embodiments, the photoinitiator can have a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some embodiments, the photoinitiator has a maximum wavelength absorbance between 300 to 500 nm.

In some embodiments, a photocurable resin of the present disclosure can further comprise a crosslinking modifier (e.g., in addition to a polymerizable compound disclosed herein that can act as a cross-linker, or in instances where the polymerizable compound does not act as a cross-linker), a light blocker, a solvent, a glass transition temperature modifier, or a combination thereof. In some aspects, the photocurable resin comprises 0-25 wt % of the crosslinking modifier, the crosslinking modifier having a number-average molecular weight equal to or less than 1,500 Da. In some aspects, the photocurable resin comprises from 0 to 10 wt %, from 0 to 9 wt %, from 0 to 8 wt %, from 0 to 7 wt %, from 0 to 6 wt %, from 0 to 5 wt %, from 0 to 4 wt %, from 0 to 3 wt %, from 0 to 2 wt %, from 0 to 1 wt %, or from 0 to 0.5 wt % of the light blocker. In some embodiments, the photocurable resin comprises a solvent. In some embodiments, the solvent comprises a nonpolar solvent. In certain embodiments, the nonpolar solvent comprises pentane, cyclopentane, hexane, cyclohexane, benzene, toluene, 1,4-dioxane, chloroform, diethyl ether, dichloromethane, a derivative thereof, or a combination thereof. In some embodiments, the solvent comprises a polar aprotic solvent. In certain embodiments, the polar aprotic solvent comprises tetrahydrofuran, ethyl acetate, acetone, dimethylformamide, acetonitrile, DMSO, propylene carbonate, a derivative thereof, or a combination thereof. In some embodiments, the solvent comprises a polar protic solvent. In certain embodiments, the polar protic solvent comprises formic acid, n-butanol, isopropyl alcohol, n-propanol, t-butanol, ethanol, methanol, acetic acid, water, a derivative thereof, or a combination thereof. In some embodiments, the photocurable resin comprises less than 90% of the solvent by weight.

In some embodiments, the added resin component (e.g., a crosslinking modifier, a polymerization catalyst, a polymerization inhibitor, a glass transition temperature modifier, a light blocker, a plasticizer, a solvent, a surface energy modifier, a pigment, a dye, a filler, or a biologically significant chemical) is functionalized so that it can be incorporated into the polymer is material so that it cannot readily be extracted from the final cured material. In certain embodiments, the polymerization catalyst, polymerization inhibitor, light blocker, plasticizer, surface energy modifier, pigment, dye, and/or filler, are functionalized to facilitate their incorporation into the cured polymer composition.

In some embodiments, a resin herein comprises a component in addition to a polymerizable compound described herein that can alter the glass transition temperature of the cured polymer composition. In such instances, a glass transition temperature modifier (also referred to herein as a $T_g$ modifier or a glass transition modifier) can be present in a photo-curable composition from about 0 to 50 wt %, based on the total weight of the composition. The $T_g$ modifier can have a high glass transition temperature, which leads to a high heat deflection temperature, which can be necessary to use a material at elevated temperatures. In some embodiments, the curable composition comprises 0 to 80 wt %, 0 to 75 wt %, 0 to 70 wt %, 0 to 65 wt %, 0 to 60 wt %, 0 to 55 wt %, 0 to 50 wt %, 1 to 50 wt %, 2 to 50 wt %, 3 to 50 wt %, 4 to 50 wt %, 5 to 50 wt %, 10 to 50 wt %, 15 to 50 wt %, 20 to 50 wt %, 25 to 50 wt %, 30 to 50 wt %, 35 to 50 wt %, 0 to 40 wt %, 1 to 40 wt %, 2 to 40 wt %, 3 to 40 wt %, 4 to 40 wt %, 5 to 40 wt %, 10 to 40 wt %, 15 to 40 wt %, or 20 to 40 wt % of a $T_g$ modifier. In certain embodiments, the curable composition comprises 0-50 wt % of a glass transition modifier. In some instances, the number average molecular weight of the $T_g$ modifier is 0.4 to 5 kDa. In some embodiments, the number average molecular weight of the $T_g$ modifier is from 0.1 to 5 kDa, from 0.2 to 5 kDa, from 0.3 to 5 kDa, from 0.4 to 5 kDa, from 0.5 to 5 kDa, from 0.6 to 5 kDa, from 0.7 to 5 kDa, from 0.8 to 5 kDa, from 0.9 to 5 kDa, from 1.0 to 5 kDa, from 0.1 to 4 kDa, from 0.2 to 4 kDa, from 0.3 to 4 kDa, from 0.4 to 4 kDa, from 0.5 to 4 kDa, from 0.6 to 4 kDa, from 0.7 to 4 kDa, from 0.8 to 4 kDa, from 0.9 to 4 kDa, from 1 to 4 kDa, from 0.1 to 3 kDa, from 0.2 to 3 kDa, from 0.3 to 3 kDa, from 0.4 to 3 kDa, from 0.5 to 3 kDa, from 0.6 to 3 kDa, from 0.7 to 3 kDa, from 0.8 to 3 kDa, from 0.9 to 3 kDa, or from 1 to 3 kDa. A polymerizable compound of the present disclosure (which can, in some cases, act by itself as a $T_g$ modifier) and a separate $T_g$ modifier compound can be miscible and compatible in the methods described herein. When used in the subject compositions, the $T_g$ modifier may provide for high $T_g$ and strength values, sometimes at the expense of elongation at break. In some cases, a toughness modifier may provide for high elongation at break and toughness via strengthening effects, and a polymerizable monomer described herein may improve the processability of the formulations, e.g., by acting as a reactive diluent, particularly of those compositions comprising high amounts of toughness modifiers, while maintaining high values for strength and $T_g$.

A curable (e.g., photo-curable) resin herein can be characterized by having one or more properties. In some embodiments, a monomer can be used as a reactive diluent in curable resins disclosed herein. Hence, in some instances, a photo-polymerizable monomer can reduce a viscosity of the curable resin (e.g., a photocurable resin). In such cases, a photo-polymerizable monomer can reduce the viscosity of the curable resin by at least about 5% compared to a resin that does not comprise the polymerizable monomer. In some instances, a photo-polymerizable monomer can reduce the viscosity of a photocurable resin by at least about 5%, 10%, 20%, 30%, 40%, or 50%. In some instances, a photocurable resin of this disclosure can have a viscosity from about 30 cP to about 50,000 cP at a printing temperature. In some embodiments, the photocurable resin has a viscosity less than or equal to 30,000 cP, less than or equal to 25,000 cP, less than or equal to 20,000 cP, less than or equal to 19,000 cP, less than or equal to 18,000 cP, less than or equal to 17,000 cP, less than or equal to 16,000 cP, less than or equal to 15,000 cP, less than or equal to 14,000 cP, less than or equal to 13,000 cP, less than or equal to 12,000 cP, less than or equal to 11,000 cP, less than or equal to 10,000 cP, less than or equal to 9,000 cP, less than or equal to 8,000 cP, less than or equal to 7,000 cP, less than or equal to 6,000 cP, or less than or equal to 5,000 cP at 25° C. In some embodiments, the resin has a viscosity less than 15,000 cP at 25° C. In some embodiments, the photocurable resin has a viscosity less than or equal to 100,000 cP, less than or equal to 90,000 cP, less than or equal to 80,000 cP, less than or equal to 70,000 cP, less than or equal to 60,000 cP, less than or equal to 50,000 cP, less than or equal to 40,000 cP, less than or equal to 35,000 cP, less than or equal to 30,000 cP, less than or equal to 25,000 cP, less than or equal to 20,000 cP, less than or equal to 15,000 cP, less than or equal to 10,000 cP, less than or equal to 5,000 cP, less than or equal to 4,000 cP, less than or equal to 3,000 cP, less than or equal to 2,000 cP, less than or equal to 1,000 cP, less than or equal to 750 cP, less than or equal to 500 cP, less than or equal to 250 cP, less than or equal to 100 cP, less than or equal to 90 cP, less than or equal to 80 cP, less than or equal to 70 cP, less than or equal to 60 cP, less than or equal to 50 cP, less than or equal to 40 cP, less than or equal to 30 cP, less than or equal to 20 cP, or less than or equal to 10 cP at a printing temperature. In some embodiments, the photocurable resin has a viscosity from 50,000 cP to 30 cP, from 40,000 cP to 30 cP, from 30,000 cP to 30 cP, from 20,000 cP to 30 cP, from 10,000 cP to 30 cP, or from 5,000 cP to 30 cP at a printing temperature. In some embodiments, the printing temperature is from 0° C. to 25° C., from 25° C. to 40° C., from 40° C. to 100° C., or from 20° C. to 150° C. In some embodiments, the photocurable resin has a viscosity from 30 cP to 50,000 cP at a printing temperature, wherein the printing temperature is from 20° C. to 150° C. In yet other embodiments, the photocurable resin has a viscosity less than 20,000 cP at a print temperature. In some embodiments, the print temperature is from 10° C. to 200° C., from 15° C. to 175° C., from 20° C. to 150° C., from 25° C. to 125° C., or from 30° C. to 100° C. In preferred embodiments, the print temperature is from 20° C. to 150° C.

A photocurable resin of the present disclosure can be capable of being 3D printed at a temperature greater than 25° C. In some cases, the printing temperature is at least about 30° C., 40° C., 50° C., 60° C., 80° C., or 100° C. As described herein, a photo-polymerizable monomer of this disclosure that can part of the photocurable resin, can have a low vapor pressure and/or mass loss at the printing temperature, thereby providing improved printing conditions compared to conventional resins used in additive manufacturing.

In some embodiments, a photocurable resin herein has a melting temperature greater than room temperature. In some embodiments, the photocurable resin has a melting temperature greater than 20° C., greater than 25° C., greater than 30° C., greater than 35° C., greater than 40° C., greater than 45° C. greater than 50° C., greater than 55° C., greater than 60° C., greater than 65° C., greater than 70° C., greater than 75° C., or greater than 80° C. In some embodiments, the photocurable resin has a melting temperature from 20° C. to 250° C., from 30° C. to 180° C., from 40° C. to 160° C., or from 50° C. to 140° C. In some embodiments, the photocurable resin has a melting temperature greater than 60° C. In other embodiments, the photocurable resin has a melting temperature from 80° C. to 110° C. In some instances, a photocurable resin can have a melting temperature of about 80° C. before polymerization, and after polymerization, the resulting polymer composition can have a melting temperature of about 100° C.

In certain instances, it may be advantageous that a photocurable resin is in a liquid phase at an elevated temperature. As an example, a conventional photocurable resin can comprise polymerizable components that may be viscous at a process temperature, and thus can be difficult to use in the fabrication of objects (e.g., using 3D printing). As a solution for that technical problem, the present disclosure provides photocurable resins comprising photo-polymerizable components such as monomers described herein that can melt at an elevated temperature, e.g., at a temperature of fabrication (e.g., during 3D printing), and can have a decreased viscosity at the elevated temperature, which can make such resin more applicable and usable for uses such as 3D printing. Hence, in some embodiments, provided herein are photocurable resins that are a liquid at an elevated temperature. In some embodiments, the elevated temperature is at or above the melting temperature (Tm) of the photocurable resin. In certain embodiments, the elevated temperature is a temperature in the range from about 40° C. to about 100° C., from about 60° C. to about 100° C., from about 80° C. to about 100° C., from about 40° C. to about 150° C., or from about 150° C. to about 350° C. In some embodiments, the elevated temperature is a temperature above about 40° C., above about 60° C., above about 80° C., or above about 100° C. In some embodiments, a photocurable resin herein is a liquid at an elevated temperature with a viscosity less than about 50 PaS, less than 2 about 0 PaS, less than about 10 PaS, less than about 5 PaS, or less than about 1 PaS. In some embodiments, a photocurable resin herein is a liquid at an elevated temperature of above about 40° C. with a viscosity less than about 20 PaS. In yet other embodiments, a photocurable resin herein is a liquid at an elevated temperature of above about 40° C. with a viscosity less than about 1 PaS.

In some embodiments, at least a portion of a photocurable resin herein has a melting temperature below about 100° C., below about 90° C., below about 80° C., below about 70° C., or below about 60° C. In some embodiments, at least a portion of a photocurable resin herein melts at an elevated temperature between about 100° C. and about 20° C., between about 90° C. and about 20° C., between about 80° C. and about 20° C., between about 70° C. and about 20° C., between about 60° C. and about 20° C., between about 60° C. and about 10° C., or between about 60° C. and about 0° C.

In various embodiments, a photocurable resin herein as well as its photo-polymerizable components can be biocompatible, bioinert, or a combination thereof. In various instances, the photo-polymerizable compounds of a resin herein can have biocompatible and/or bioinert metabolic (e.g., hydrolysis) products.

A photocurable resin of the present disclosure can comprise less than about 20 wt % or less than about 10 wt % hydrogen bonding units. In some aspects, a photocurable resin herein comprises less than about 15 wt %, less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, or less than about 1 wt % hydrogen bonding units.

Polymers and Polymer Compositions

The present disclosure provides polymers and polymer compositions. Such polymer compositions can be generated by curing a curable composition or resin described herein. A polymer composition provided herein can be biocompatible, bioinert, or a combination thereof. In various instances, a polymer composition herein is generated by photo-curing a photo-curable composition described herein.

Advantages of embodiments of the present disclosure include (i) yielding syringyl-based block co-polymers that self-assemble into micellar/core-shell nanoparticles that enhance the toughness of syringyl-rich photopolymer networks; (ii) flexible synthetic conditions using ATRP initiators yield non-reactive or reactive di- and tri-block co-polymers; and (iii) reactive and non-reactive polymers can be covalently or non-covalently tethered to the rest of the photopolymer network.

Accordingly, one embodiment provides a polymer composition comprising the micelle of any one of the embodiments disclosed herein dispersed and in physical contact with a photopolymer network. Another embodiment provides a polymer composition comprising the micelle of the embodiments disclosed herein dispersed and covalently bound to a photopolymer network.

In some embodiments, the photopolymer network comprises a poly(acrylate) polymer, a poly(methacrylate) polymer, a block co-polymer comprising at least one poly(acrylate) block and at least one poly(methacrylate) block, or combinations thereof.

In certain embodiments, the photopolymer network comprises greater than 50 wt % of a poly(acrylate) polymer based on the total weight of the polymer composition. In some embodiments, the photopolymer network comprises greater than 90 wt % of a poly(acrylate) polymer based on the total weight of the polymer composition. In certain embodiments, the poly(acrylate) polymer comprises poly(2,6-dimethoxyphenyl acrylate).

In some embodiments, the poly(acrylate) polymer is greater than 20 wt % poly(2,6-dimethoxyphenyl acrylate) based on the total weight of the poly(acrylate) polymer. In certain embodiments, the poly(acrylate) polymer is greater than 40 wt % poly(2,6-dimethoxyphenyl acrylate) based on the total weight of the poly(acrylate) polymer.

In some embodiments, the poly(acrylate) polymer is less than 45 wt % poly(2,6-dimethoxyphenyl acrylate) based on the total weight of the poly(acrylate) polymer. In certain embodiments, the poly(acrylate) polymer is less than 45 wt % poly(2,6-dimethoxyphenyl acrylate) based on the total weight of the poly(acrylate) polymer.

In some embodiments, the photopolymer network comprises greater than 50 wt % of a poly(methacrylate) polymer based on the total weight of the polymer composition. In some embodiments, the photopolymer network comprises greater than 90 wt % of a poly(methacrylate) polymer based on the total weight of the polymer composition. In certain embodiments, the poly(methacrylate) polymer comprises poly(2,6-dimethoxyphenyl methacrylate).

In some embodiments, the poly(methacrylate) polymer is greater than 20 wt % poly(2,6-dimethoxyphenyl methacrylate) based on the total weight of the poly(methacrylate) polymer. In certain embodiments, the poly(methacrylate) polymer is greater than 40 wt % poly(2,6-dimethoxyphenyl methacrylate) based on the total weight of the poly(methacrylate) polymer. In some embodiments, the concentration of the micelle is less than 10 wt % relative to the total weight of the polymer composition.

In some embodiments, the polymer composition or photopolymer network has one or more of the following characteristics:

(A) a storage modulus greater than or equal to 200 MPa;
(B) a flexural stress and/or flexural modulus of greater than or equal to 1.5 MPa remaining after 24 hours in a wet environment at 37° C.;
(C) an elongation at break greater than or equal to 5% before and after 24 hours in a wet environment at 37° C.;
(D) a water uptake of less than 25 wt % when measured after 24 hours in a wet environment at 37° C.;
(E) transmission of at least 30% of visible light through the polymer composition after 24 hours in a wet environment at 37° C.; and (F) comprises a plurality of polymeric phases, wherein at least one polymeric phase of the one or more polymeric phases has a $T_g$ of at least 60° C., 80° C., 90° C., 100° C., or at least 110° C.

In some embodiments, the polymer composition is characterized by a water uptake of less than 20 wt %, less than 15 wt %, less than 10 wt %, less than 5 wt %, less than 4 wt %, less than 3 wt %, less than 2 wt %, less than 1 wt %, less than 0.5 wt %, less than 0.25 wt %, or less than 0.1 wt % when measured after 24 hours in a wet environment at 37° C.

In some embodiments, the polymer composition has greater than 60% conversion of double bonds to single bonds compared to the photocurable resin, as measured by FTIR.

In certain embodiments, the polymer composition has an ultimate tensile strength from 10 MPa to 100 MPa, from 15 MPa to 80 MPa, from 20 MPa to 60 MPa, from 10 MPa to 50 MPa, from 10 MPa to 45 MPa, from 25 MPa to 40 MPa, from 30 MPa to 45 MPa, or from 30 MPa to 40 MPa after 24 hours in a wet environment at 37° C.

In some embodiments, the polymer composition is characterized by an elongation at break greater than 10%, an elongation at break greater than 20%, an elongation at break greater than 30%, an elongation at break of 5% to 250%, an elongation at break of 20% to 250%, or an elongation at break value between 40% and 250% before and after 24 hours in a wet environment at 37° C.

In certain embodiments, the polymer composition is characterized by a storage modulus of 0.1 MPa to 4000 MPa, a storage modulus of 300 MPa to 3000 MPa, or a storage modulus of 750 MPa to 3000 MPa after 24 hours in a wet environment at 37° C.

In some embodiments, the polymer composition has a flexural stress, a flexural modulus, or a flexural stress and flexural modulus of 400 MPa or more, 300 MPa or more, 200 MPa or more, 180 MPa or more, 160 MPa or more, 120 MPa or more, 100 MPa or more, 80 MPa or more, 70 MPa or more, 60 MPa or more, after 24 hours in a wet environment at 37° C.

In certain embodiments, at least 40%, 50%, 60%, or 70% of visible light passes through the polymer composition after 24 hours in a wet environment at 37° C.

In some embodiments, the polymer composition is biocompatible, bioinert, or a combination thereof.

One embodiment provides a polymeric film comprising a polymer composition of any one of the embodiments disclosed herein. In some more specific embodiments, the polymeric film has a thickness of at least 100 μm and not more than 3 mm.

Some embodiments provide an orthodontic appliance comprising the polymer composition of any one of the embodiments disclosed herein or the polymeric film of any one of the embodiments disclosed herein. In some embodiments, the orthodontic appliance is a dental appliance. In some more specific embodiments, the orthodontic appliance is a dental aligner, a dental expander, or a dental spacer.

One embodiment provides a method of forming a polymer composition of any one of the embodiments disclosed herein, the method comprising:
  providing a photocurable resin of any one of the embodiments disclosed herein;
  exposing the photocurable resin to a light source; and
  polymerizing the photocurable resin to form the polymer.

In some embodiments, the light source is an ultraviolet (UV) or visible light source. In certain embodiments, the method further comprises fabricating an orthodontic appliance with the polymer.

One embodiment provides a method of forming a polymer composition of any one of the embodiments disclosed herein, the method comprising:
  providing a photocurable resin (e.g., comprising a macroinitiator that is a poly(alkyl alkylate)) of any one of the embodiments disclosed herein;
  exposing the photocurable resin to a light source; and
  polymerizing the photocurable resin to form the polymer.

In some embodiments, the light source is an ultraviolet (UV) or visible light source. In certain embodiments, the method further comprises fabricating an orthodontic appliance with the polymer.

One embodiment provides a method for preparing an article by an additive manufacturing process, comprising:
  providing a photocurable resin of any one of the embodiments disclosed herein;
  heating the photocurable resin to a processing temperature;
  exposing the photocurable resin to radiation;
  polymerizing the photocurable resin layer-by-layer based on a predefined design, thereby polymerizing a plurality of monomers and a photoinitiator to form a polymer; and
  fabricating the article with the polymer.

In some embodiments, the processing temperature is from about 50° C. to about 120° C. In some embodiments, the processing temperature is from about 90° C. to about 110° C., from about 100° C. to about 120° C., from about 105° C. to about 115° C., or from about 108° C. to about 110° C.

In certain embodiments, the additive manufacturing process is a 3D printing process. In some embodiments, the article is a medical device. In certain embodiments, the medical device is an orthodontic appliance.

One embodiment provides a method of repositioning a patient's teeth, comprising:
  generating a treatment plan for the patient, the plan comprising a plurality of intermediate tooth arrangements for moving teeth along a treatment path from an initial tooth arrangement toward a final tooth arrangement;
  producing an orthodontic appliance according to the embodiments disclosed herein, or an orthodontic appliance comprising the polymer composition of any one of the embodiments disclosed herein; and
  moving on-track, with the orthodontic appliance, at least one of the patient's teeth toward an intermediate tooth arrangement or the final tooth arrangement.

In some embodiments, producing the orthodontic appliance comprises 3D printing of the orthodontic appliance. In certain embodiments, the method further comprises tracking progression of the patient's teeth along the treatment path after administration of the orthodontic appliance to the patient, the tracking comprising comparing a current arrangement of the patient's teeth to a planned arrangement of the patient's teeth.

In some embodiments of the method, greater than 60% of the patient's teeth are on track with the treatment plan after 2 weeks of treatment.

In some embodiments, the orthodontic appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth.

In some aspects herein, a photo-curable composition or resin herein can be cured by exposing such composition or resin to electromagnetic radiation of appropriate wavelength.

In some embodiments, the polymer composition can comprise poly-(ethylene) glycol (PEG), poly(ethylene) glycol diacrylate, PEG-THF, polytetrahydrofuran, poly-(tert-butyl acrylate), poly(ethylene-co-maleic anhydride), any derivative thereof, or any combination thereof.

In some embodiments, the monomer components used to obtain photopolymer networks, micelles, or polymer compositions comprises an acrylate, an acrylamide, a methacrylamide, an acrylonitrile, a bisphenol acrylate, a carbohydrate, a fluorinated acrylate, a maleimide, an acrylate, 4-acetoxyphenethyl acrylate, acryloyl chloride, 4-acryloylmorpholine, 2-(acryloyloxy)ethyl]-trimethylammonium chloride, 2-(4-benzoyl-3-hydroxyphenoxy)ethyl acrylate, benzyl 2-propylacrylate, butyl acrylate, tert-butyl acrylate, 2[(butylamino)carbonyl]-oxy]ethyl acrylate, tert-butyl 2-bromoacrylate, 2-carboxyethyl acrylate, 2-chloroethyl acrylate, 2-(diethylamino)-ethyl acrylate, di(ethylene glycol) ethyl ether acrylate, 2-(dimethylamino)ethyl acrylate, 3-(dimethylamino)propyl acrylate, dipentaerythriol penta-/hexa-acrylate, ethyl acrylate, 2-ethylacryloyl chloride, ethyl 2-(bromomethyl)acrylate, ethyl cis-(beta-cyano)acrylate, ethylene glycol dicyclopentenyl ether acrylate, ethylene glycol methyl ether acrylate, ethylene glycol phenyl ether acrylate, ethyl 2-ethylacrylate, 2-ethylexyl acrylate, ethyl 2-propylacrylate, ethyl 2-(trimethylsilylmethyl)acrylate, hexyl acrylate, 4-hydroxybutyl acrylate, 2-hydroxyethyl acrylate, 2-hydroxy-3-phenoxypropyl acrylate, hydroxypropyl acrylate, isobornyl acrylate, isobutyl acrylate, isodecyl acrylate, isooctyl acrylate, lauryl acrylate, methyl 2-acetamidoacrylate, methyl acrylate, a methylene malonate (e.g., dibutyl methylene malonate, dihexyl methylene malonate, or dicyclohexyl methylene malonate), a methylene malonate macromerer (e.g, a polyester of 2-methylenemalonate such as Forza B3000 XP), methyl α-bromoacrylate, methyl 2-(bromo-methyl)acrylate, methyl 2-(chloromethyl)acrylate, methyl 3-hydroxy-2-methylenebutyrate, methyl 2-(trifluoromethyl)acrylate, octadecyl acrylate, pentabromobenzyl acrylate, penta-bromophenyl acrylate, pentafluorophenyl acrylate, poly(ethylene glycol) diacrylate, poly-(ethylene glycol) methyl ether acrylate, poly(propylene glycol) acrylate, epoxidized soybean oil acrylate, 3-sulfopropyl acrylate, tetrahydrofuryl acrylate, 2-tetrahydropyranyl acrylate, 3-(trimethoxysilyl)propyl acrylate, 3,5,5-trimethylhexyl acrylate, 10-undecenyl acrylate, urethane acrylate, urethane acrylate methacrylate, tricylcodecane diacrylate, isobornyl acrylate, a methacrylate,allyl methacrylate, benzyl methacrylate, (2-boc-amino)ethyl methacrylate, tert-butyl methacrylate, 9H-carbazole-9-ethylmethacrylate, 3-chloro-2-hydroxypropyl methacrylate, cyclohexyl methacrylate, 1,10-decamethylene glycol dimethacrylate, ethylene glycol dicyclopentenyl ether methacrylate, ethylene glycol methyl ether methacrylate, 2-ethylhexyl methacrylate, furfuryl methacrylate, glycidyl methacrylate, glycosyloxyethyl methacrylate, hexyl methacrylate, hydroxybutyl methacrylate, 2-hydroxy-5-N-methacrylamidobenzoic acid, isobutyl methacrylate, methacryloyl chloride, methyl methacrylate, mono-2-methacryloyloxy)ethyl succinate, 2-N-morpholinoethyl methacrylate, 1-naphthyl methacrylate, pentabromophenyl methacrylate, phenyl methacrylate, pentabromophenyl methacrylate, TEMPO methacrylate, 3-sulfopropyl methacrylate, triethylene glycol methyl ether methacrylate, 2-[(1',1',1'-trifluoro-2'-(trifluoromethyl)-2'0hdroxy)propyl]-3-norbornyl methacrylate, 3,3,5-trimethylcyclohexyl methacrylate, (trimethylsilyl)methacrylate, vinyl methacrylate, isobornyl methacrylate, bisphenol A dimethacrylate, an Omnilane OC, ter-butyl acrylate, isodecyl acrylate, tricylcodecane diacrylate, a polyfunctional acrylate, N,N'-methylenebisacrylamide, 3-(acryloyloxy)-2-hydroxypropyl) methacrylate, bis[2-(methacryloyloxy)ethyl] phosphate, 1,3-butanediol diacrylate, 1,4-butanediol diacrylate, diurethane dimethacrylate, N,N'-ethylenebis(acrylamide), glycerol 1,3-diglycerolate diacrylate, 1,6-hexanediol diacrylate, hydroxypivalyl hydroxypivalate bis[6-(acryloyloxy)hexanoate], neopentyl glycol diacrylate, pentaerythritol diacrylate, 1,3,6-triacryloyl hexahydro-1,3,5-triazine, trimethlolpropane ethoxylate, tris[2-(acryloyloxy)ethyl]isocyanurate, any derivative thereof, or a combination thereof.

A micelles or photopolymer networks herein can comprise one or more reactive functional groups that can allow for further modification of the micelles and/or photopolymer networks, such as additional polymerization (e.g., post-curing).

Non-limiting examples of reactive functional groups include free radically polymerizable functionalities, photo-active groups, groups facilitating step growth polymerization, thermally reactive groups, and/or groups that facilitate bond formation (e.g., covalent bond formation). In some embodiments, the reactive functional groups comprise an acrylate, a methacrylate, an acrylamide, a vinyl group, a vinyl ether, a thiol, an allyl ether, a norbornene, a vinyl acetate, a maleate, a fumarate, a maleimide, an epoxide, a ring-strained cyclic ether, a ring-strained thioether, a cyclic ester, a cyclic carbonate, a cyclic silane, a cyclic siloxane, a hydroxyl, an amine, an isocyanate, a blocked isocyanate, an acid chloride, an activated ester, a Diels-Alder reactive group, a furan, a cyclopentadiene, an anhydride, a group favorable toward photodimerization (e.g., an anthracene, an acenaphthalene, or a coumarin), a group that photodegrades into a reactive species (e.g., Norrish Type 1 and 2 materials), an azide, a derivative thereof, or a combination thereof.

In some embodiments, a polymer composition can have a melting temperature equal to or greater than about 20° C., 30° C., 40° C., 50° C., 60° C., 70° C., 80° C., 90° C., 100° C., 120° C., or equal to or greater than about 150° C. In some embodiments, the curing of a resin can occur at an elevated temperature (e.g., at about 90° C.).

In some embodiments, a cured photopolymer networks or polymer compositions can be characterized by a tensile stress-strain curve that displays a yield point after which the test specimen continues to elongate, but there is no (detectable) or only a very low increase in stress. Such yield point behavior typically occurs "near" the glass transition temperature, where the material is between the glassy and rubbery regimes and may be characterized as having viscoelastic behavior. In some embodiments, viscoelastic behavior is observed in the temperature range from about 20° C. to about 40° C. The yield stress is determined at the yield point. In some embodiments, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by $\ln(l/l_0)$, which may be approximated by $(l-l_0)/l_0$ at small strains (e.g. less than approximately 10%) and the elongation is $l/l_0$, where l is the gauge length after some deformation has occurred and $l_0$ is the initial gauge length. The mechanical properties can depend on the temperature at which they are measured. The test temperature may be below the expected use temperature for a dental appliance such as 35° C. to 40° C. In embodiments, the test temperature is 23±2° C.

Properties of Polymer Compositions

Polymer compositions and/or photopolymer networks of this disclosure formed from the polymerization of a curable resin disclosed herein can provide advantageous characteristics compared to conventional polymer compositions. In some instances, polymer compositions and/or photopolymer networks can also have low amounts of water uptake and can be solvent resistant. In some cases, polymer compositions and/or photopolymer networks can be characterized by one or more of the properties selected from the group consisting of elongation at break, storage modulus, tensile modulus, stress remaining, glass transition temperature, water uptake, hardness, color, transparency, hydrophobicity, lubricity, surface texture, percent crystallinity, phase composition ratio, phase domain size, and phase domain size and morphology. Further, as described herein, the polymer compositions and/or photopolymer networks provided herein can be used for a multitude of applications, including 3D printing, to form materials having favorable properties of both elasticity and stiffness. Specifically, polymer compositions and/or photopolymer networks of this disclosure can provide excellent flexural modulus, elastic modulus, alongation at break, or a combination thereof.

In various embodiments, polymer compositions and/or photopolymer networks herein can comprise or consist of a high toughness, e.g., through a tough polymer matrix, and the difference (or delta) between the elastic modulus measured at different strain rates (e.g., at 1.7 mm/min and 510 mm/min) can be low, e.g., lower than 80%, 70%, 60%, 50%, 40%, or lower than 30%.

In some embodiments, a polymer compositions and/or photopolymer networks of the present disclosure can have one or more of the following characteristics: (A) a flexural modulus greater than or equal to 50 Mpa, 100 Mpa, or 200 Mpa; (B) an elastic modulus of greater than or equal to 150 Mpa, 250 Mpa, 350 Mpa, 450 Mpa, 550 Mpa, or between about 500 and 1500 Mpa, from about 550 to about 1000 Mpa, or from about 550 Mpa to about 1500 Mpa) an elongation at break greater than or equal to 5% before and after 24 hours in a wet environment at 37° C.; (D) a water uptake of less than 25 wt % when measured after 24 hours in a wet environment at 37° C.; (E) transmission of at least 30% of visible light through the polymer composition after 24 hours in a wet environment at 37° C.; and (F) comprises a plurality of polymeric phases, wherein at least one polymeric phase of the one or more polymeric phases has a $T_g$ of at least 60° C., 80° C., 90° C., 100° C., or at least 110° C. In some instances, polymer compositions and/or photopolymer networks herein has at least two, three, four, five, or all characteristics of (A), (B), (C), (D), (E), and (F).

In some instances, the polymer compositions and/or photopolymer networks can be characterized by a storage modulus of 0.1 Mpa to 4000 Mpa, a storage modulus of 300 Mpa to 3000 Mpa, or a storage modulus of 750 Mpa to 3000 Mpa after 24 hours in a wet environment at 37° C.

In some instances, the polymer compositions and/or photopolymer networks herein can have a flexural stress remaining of 400 Mpa or more, 300 Mpa or more, 200 Mpa or more, 180 Mpa or more, 160 Mpa or more, 120 Mpa or more, 100 Mpa or more, 80 Mpa or more, 70 Mpa or more, 60 Mpa or more, after 24 hours in a wet environment at 37° C.

In some instances, the polymer compositions and/or photopolymer networks can be characterized by an elongation at break greater than 10%, an elongation at break greater than 20%, an elongation at break greater than 30%, an elongation at break of 5% to 250%, an elongation at break of 20% to 250%, or an elongation at break value between 40% and 250% before and after 24 hours in a wet environment at 37° C.

In some embodiments, a polymer compositions and/or photopolymer networks can be characterized by a water uptake of less than 20 wt %, less than 15 wt %, less than 10 wt %, less than 5 wt %, less than 4 wt %, less than 3 wt %, less than 2 wt %, less than 1 wt %, less than 0.5 wt %, less than 0.25 wt %, or less than 0.1 wt % when measured after 24 hours in a wet environment at 37° C. In some cases, polymer compositions and/or photopolymer networks can have greater than 50%, 60%, or 70% conversion of double bonds to single bonds compared to the photocurable resin, as measured by FTIR.

In some instances, polymer compositions and/or photopolymer networks can have an ultimate tensile strength from 10 Mpa to 100 Mpa, from 15 Mpa to 80 Mpa, from 20 Mpa to 60 Mpa, from 10 Mpa to 50 Mpa, from 10 Mpa to 45 Mpa, from 25 Mpa to 40 Mpa, from 30 Mpa to 45 Mpa, or from 30 Mpa to 40 Mpa after 24 hours in a wet environment at 37° C.

In some instances, a polymer composition can have a low amount of hydrogen bonding which can facilitate a decreased uptake of water in comparison with conventional polymer compositions having greater amounts of hydrogen bonding. Thus, in some instances, a polymer composition herein can comprise less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, less than about 1 wt %, or less than about 0.5 wt % water when fully saturated at use temperature (e.g., about 20° C., 25° C., 30° C., or 35° C.). In some instances, the use temperature can include the temperature of a human mouth (e.g., approximately 35-40° C.). The use temperature can be a temperature selected from −100-250° C., 0-90° C., 0-80° C., 0-70° C., 0-60° C., 0-50° C., 0-40° C., 0-30° C., 0-20° C., 0-10° C., 20-90° C., 20-80° C., 20-70° C., 20-60° C., 20-50° C., 20-40° C., 20-30° C., or below 0° C.

In various instances, the polymer composition can have a glass transition temperature of at least about 30° C., 40° C., 50° C., 60° C., 70° C., 80° C., 90° C., 100° C., or at least about 110° C.

Further provided herein are polymeric films comprising a polymer composition of the present disclosure. In some cases, such polymeric film can have a thickness of at least about 50 μm, 100 μm, 250 μm, 500 μm, 1 mm, 2 mm and not more than 3 mm.

The present disclosure provides devices that comprise polymer compositions and/or photopolymer networks of the present disclosure. In various cases, the device can be a medical device. The medical device can be an orthodontic appliance. The orthodontic appliance can be a dental aligner, a dental expander, or a dental spacer.

Methods of Use

The present disclosure provides methods for synthesizing the polymer compositions and/or photopolymer networks of the present disclosure, methods of using compositions (e.g., resins and polymer compositions) comprising such compounds, as well as methods for using the compositions in devices such as medical devices. In cases in which photopolymerization is used to cure a resin, a polymerizable compound (e.g., monomer or macroinitiator) of the present disclosure can be used as components in materials applicable many different industries such as transportation (e.g., planes, trains, boats, automobiles, etc.), hobbyist, prototyping, medical, art, microfluidics, molds, among others. Such medical devices include, in various embodiments herein, orthodontic appliances.

Methods of Forming Polymer Compositions

Further provided herein is a method of polymerizing (e.g., photo-curing) a photocurable resin that optionally comprises one or more additional components selected from the group consisting of macroinitiators, polymerizable polymers, polymerizable oligomers, polymerizable monomers (e.g., reactive diluents), solvents, fillers, antioxidants, pigments, colorants, surface modifiers, and mixtures thereof, to obtain a polymer composition. In some embodiments, the method comprising a step of mixing a curable composition. In some embodiments, the method comprises heating the curable composition. In some embodiments, the method comprises inducing polymerization by heating and/or irradiating the composition.

The present disclosure provides methods for producing polymer compositions and/or photopolymer networks using curable resins described herein. In various embodiments, provided herein are methods for photo-curing photocurable resins. Hence, in various instances, provided herein is a method of forming polymer compositions and/or photopolymer networks, the method comprising: (i) providing a photocurable resin of the present disclosure; (ii) exposing the photocurable resin to a light source; and curing the photocurable resin to form polymer compositions and/or photopolymer networks.

In some embodiments, the photo-curing comprises a single curing step. In some embodiments, the photo-curing comprises a plurality of curing steps. In yet other embodiments, the photo-curing comprises at least one curing step which exposes the curable resin to light. Exposing the curable resin to light can initiate and/or facilitate photopolymerization. In some instances, a photoinitiator can be used as part of the resin to accelerate and/or initiate photopolymerization. In some embodiments, the resin is exposed to UV (ultraviolet) light, visible light, IR (infrared) light, or any combination thereof. In some embodiments, the cured polymer composition is formed from the photocurable resin using at least one step comprising exposure to a light source, wherein the light source comprises UV light, visible light, and/or IR light. In some embodiments, the light source comprises a wavelength from 10 nm to 200 nm, from 200 nm to 350 nm, from 350 nm to 450 nm, from 450 nm to 550 nm, from 550 nm to 650 nm, from 650 nm to 750 nm, from 750 nm to 850 nm, from 850 nm to 1000 nm, or from 1000 nm to 1500 nm.

As described herein, polymer compositions and/or photopolymer networks produced by the methods provided herein can be characterized by one or more of: (i) a storage modulus greater than or equal to 200 Mpa; (ii) a flexural stress of greater than or equal to 1.5 Mpa remaining after 24 hours in a wet environment at 37° C.; (iii) an elongation at break greater than or equal to 5% before and after 24 hours in a wet environment at 37° C.; (iv) a water uptake of less than 25 wt % when measured after 24 hours in a wet environment at 37° C.; and (v) transmission of at least 30% of visible light through the polymer composition after 24 hours in a wet environment at 37° C. In various cases, such polymer composition can be characterized by at least 2, 3, 4, or all of these properties.

Provided herein are methods for using the polymerizable compounds, curable resins and compositions comprising such compounds, as well as polymer compositions and/or photopolymer networks produced from such resins and composition for the fabrication of a medical device, such as an orthodontic appliance (e.g., a dental aligner, a dental expander or a dental spacer).

Thus, in some embodiments, a method herein further comprises the step of fabricating a device or an object using an additive manufacturing device, wherein the additive manufacturing device facilitates the curing. In some embodiments, the curing of a polymerizable resin produces the cured polymer compositions and/or photopolymer networks. In certain embodiments, a polymerizable resin is cured using an additive manufacturing device to produce the cured polymer compositions and/or photopolymer networks. In some embodiments, the method further comprises the step of cleaning the cured polymer compositions and/or photopolymer networks. In certain embodiments, the cleaning of the cured polymer compositions and/or photopolymer networks includes washing and/or rinsing the cured polymer composition with a solvent, which can remove uncured resin and undesired impurities from the cured polymer composition.

In some embodiments, a polymerizable resin herein can be curable and have melting points <100° C. in order to be liquid and, thus, processable at the temperatures usually employed in currently available additive manufacturing techniques. As described herein, the polymerizable monomers of the present disclosure that are used as components in the curable resins can have a low vapor pressure at an elevated temperature compared to conventional reactive diluents or other polymerizable components used in curable resins. Such low vapor pressure of the monomers described herein can be particularly advantageous for use of such monomer in the curable (e.g., photocurable) compositions and additive manufacturing where elevated temperatures (e.g., 60° C., 80° C., 90° C., or higher) may be used. In various instances, a polymerizable monomer can have a vapor pressure of at most about 12 Pa at 60° C., or lower, as further described herein.

In some embodiments, the methods disclosed herein for forming polymer compositions and/or photopolymer networks are part of a high temperature lithography-based photo-polymerization process, wherein a photocurable resin that can comprise at least one photoinitiator is heated to an elevated process temperature (e.g., from about 50° C. to about 120° C., such as from about 90° C. to about 120° C.). Thus, a method for forming a polymer compositions and/or photopolymer networks according to the present disclosure can offer the possibility of quickly and easily producing devices, such as orthodontic appliances, by additive manufacturing such as 3D printing using curable resins as disclosed herein.

Photo-polymerization can occur when a photocurable resin herein is exposed to radiation (e.g., UV or visible light) of a wavelength sufficient to initiate polymerization. The wavelengths of radiation useful to initiate polymerization may depend on the photoinitiator used. "Light" as used herein includes any wavelength and power capable of initiating polymerization. Some wavelengths of light include ultraviolet (UV) or visible. UV light sources include UVA (wavelength about 400 nanometers (nm) to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous or pulsed light during the process. Both the length of time the system is exposed to UV light and the intensity of the UV light can be varied to determine the ideal reaction conditions.

In some embodiments, the methods disclosed herein include the use of additive manufacturing to produce a device comprising the cured polymer composition. Such device can be an orthodontic appliance. The orthodontic appliance can be a dental aligner, a dental expander, or a dental spacer. In certain embodiments, the methods disclosed herein use additive manufacturing to produce a device comprising, consisting essentially of, or consisting of the cured polymer compositions and/or photopolymer networks. Additive manufacturing includes a variety of technologies which fabricate three-dimensional objects directly from digital models through an additive process. In some aspects, successive layers of material are deposited and "cured in place." A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate an orthodontic appliance herein. In many embodiments, 3D printing involves jetting or extruding one or more materials onto a build surface in order to form successive layers of the object geometry. In some embodiments, a photocurable resin described herein can be used in inkjet or coating applications. Cured polymer compositions and/or photopolymer networks may also be fabricated by "vat" processes in which light is used to selectively cure a vat or reservoir of the curable resin. Each layer of curable resin may be selectively exposed to light in a single exposure or by scanning a beam of light across the layer. Specific techniques that can be used herein can include stereolithography (SLA), Digital Light Processing (DLP) and two photon-induced photo-polymerization (TPIP).

In some embodiments, the thin filament of thermoplastic polymer is included as an additive at a concentration of at least 10 wt %, at least 15 wt %, at least 20 wt %, at least 25 wt %, at least 30 wt %, at least 35 wt %, at least 40 wt %, at least 45 wt %, at least 50 wt %, at least 55 wt %. In certain embodiments, the thin filament of thermoplastic polymer is included as an additive at a concentration of less than 60 wt %, less than 55 wt %, less than 50 wt %, less than 45 wt %, less than 40 wt %, less than 35 wt %, less than 30 wt %, less than 25 wt %, less than 20 wt %, less than 15 wt %, less than 10 wt %, less than 5 wt %, or less than 1 wt %.

In some embodiments, the methods disclosed herein use continuous direct fabrication to produce a device comprising the cured polymer compositions and/or photopolymer networks. Such device can be an orthodontic appliance as described herein. In certain embodiments, the methods disclosed herein can comprise the use of continuous direct fabrication to produce a device (e.g., an orthodontic appliance) comprising, consisting essentially of, or consisting of the cured polymer compositions. A non-limiting exemplary direct fabrication process can achieve continuous build-up of an object geometry by continuous movement of a build platform (e.g., along the vertical or Z-direction) during an irradiation phase, such that the hardening depth of the irradiated photo-polymer (e.g., an irradiated photocurable resin, hardening during the formation of a cured polymer composition) is controlled by the movement speed. Accordingly, continuous polymerization of material (e.g., polymerization of a photocurable resin into a cured polymer composition) on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which a liquid resin (e.g., a photocurable resin) is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), 1349-1352), which reference is hereby incorporated by reference in its entirety for description of the process. Another example of continuous direct fabrication method can involve extruding a material composed of a curable liquid material or resin surrounding a solid strand. The material can be extruded along a continuous three-dimensional path in order to form the object. Such methods are described in U.S. Patent Publication No. 2014/0061974, the disclosure of which is incorporated herein by reference in its entirety.

In some embodiments, the methods disclosed herein can comprise the use of high temperature lithography to produce a device comprising the cured polymer compositions. Such device can be an orthodontic appliance as described herein. In certain embodiments, the methods disclosed herein use high temperature lithography to produce a device comprising, consisting essentially of, or consisting of the cured polymer composition. "High temperature lithography," as used herein, may refer to any lithography-based photopolymerization processes that involve heating photo-polymerizable material(s) (e.g., a photocurable resin disclosed herein). The heating may lower the viscosity of the photocurable resin before and/or during curing. Non-limiting examples of high-temperature lithography processes include those processes described in PCT Publication Nos. WO 2015/075094, WO 2016/078838 and WO 2018/032022. In some implementations, high-temperature lithography may involve applying heat to material to temperatures from about 50° C. to about 120° C., such as from about 90° C. to about 120° C., from about 100° C. to about 120° C., from about 105° C. to about 115° C., from about 108° C. to about 110° C., etc. The material may be heated to temperatures greater than about 120° C. It is noted other temperature ranges may be used without departing from the scope and substance of the inventive concepts described herein.

Since, in some cases, the polymerizable compounds of the present disclosure can, as part of a photocurable resin, become co-polymerized in the polymerization process of a method according to the present disclosure, the result can be an optionally cross-linked polymer comprising moieties of one or more species of polymerizable compound(s) as repeating units. In some cases, such polymer is a cross-linked polymer which, typically, can be suitable and useful for applications in orthodontic appliances. The polymerizable compounds of this disclosure comprising a plurality of reactive functional groups can provide uniform and continuous polymeric networks with clear phase separation.

In further embodiments, a method herein can comprise polymerizing a curable composition which comprises at least one polymerizable compound, which, upon polymerization, can furnish a cross-linked polymer matrix which can comprise moieties originating from the polymerizable compound(s) of the present disclosure as repeating units. In order to obtain cross-linked polymers which can be particularly suitable as orthodontic appliances, the at least one polymerizable species used in the method according to the present disclosure can be selected with regard to several thermomechanical properties of the resulting polymers. In some instances, a curable resin of the present disclosure can comprise one or more species of polymerizable compounds. In some cases, a polymerizable monomer of the present disclosure can also have cross-linking functionalities, in instances where it contains a plurality of reactive functional groups (similar to the polymerizable compounds herein), and thus not only act as a reactive diluent with low vapor pressure, but also as a cross-linking agent during polymerization of a curable resin described herein. In other embodiments, a resin comprises a polymerizable compound as described herein, a polymerizable monomer, and a cross-linking monomer, wherein both monomers are different species (i.e., chemical entities).

Orthodontic Appliances and Uses Thereof

The micelles and/or photopolymer networks according to the present disclosure can be used as components for viscous or highly viscous photocurable resins and can result in polymeric compositions that can have favorable thermomechanical properties as described herein (e.g., stiffness, stress remaining, etc.) for use in orthodontic appliances, for example, for moving one or more teeth of a patient.

As described herein, the present disclosure provides a method of repositioning a patient's teeth, the method comprising: (i) generating a treatment plan for the patient, the plan comprising a plurality of intermediate tooth arrangements for moving teeth along a treatment path from an initial tooth arrangement toward a final tooth arrangement; (ii) producing a dental appliance comprising a polymer composition described herein; and moving on-track, with the dental appliance, at least one of the patient's teeth toward an intermediate tooth arrangement or the final tooth arrangement. Such dental appliance can be produced using processes that include 3D printing, as further described herein. The method of repositioning a patient's teeth can further comprise tracking progression of the patient's teeth along the treatment path after administration of the dental appliance to the patient, the tracking comprising comparing a current arrangement of the patient's teeth to a planned arrangement of the patient's teeth. In such instances, greater than 60% of the patient's teeth can be on track with the treatment plan after 2 weeks of treatment. In some instances, the dental appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth.

As used herein, the terms "rigidity" and "stiffness" can be used interchangeably, as are the corresponding terms "rigid" and "stiff." As used herein a "plurality of teeth" encompasses two or more teeth.

In many embodiments, one or more posterior teeth comprises one or more of a molar, a pre-molar, or a canine, and one or more anterior teeth comprising one or more of a central incisor, a lateral incisor, a cuspid, a first bicuspid, or a second bicuspid.

In some embodiments, the compositions and methods described herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or more known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof, for example. The appliance can be shaped in many ways, such as with thermoforming or direct fabrication as described herein, for example. Alternatively, or in combination, the appliance can be fabricated with machining such as an appliance fabricated from a block of material with computer numeric control machining.

Figure 1A:
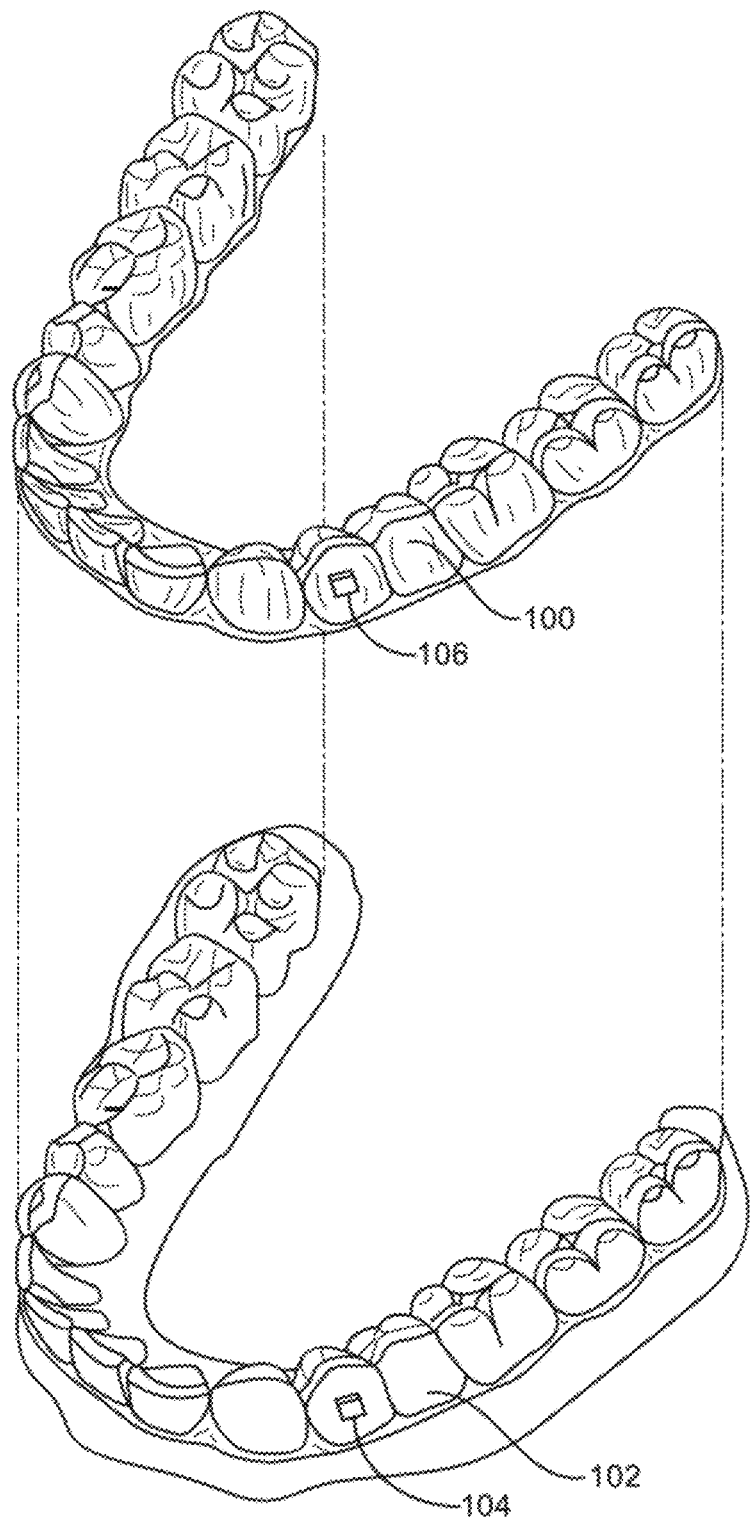
FIG. 1A illustrates a tooth repositioning appliance, in accordance with embodiments.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymer composition. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth) and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
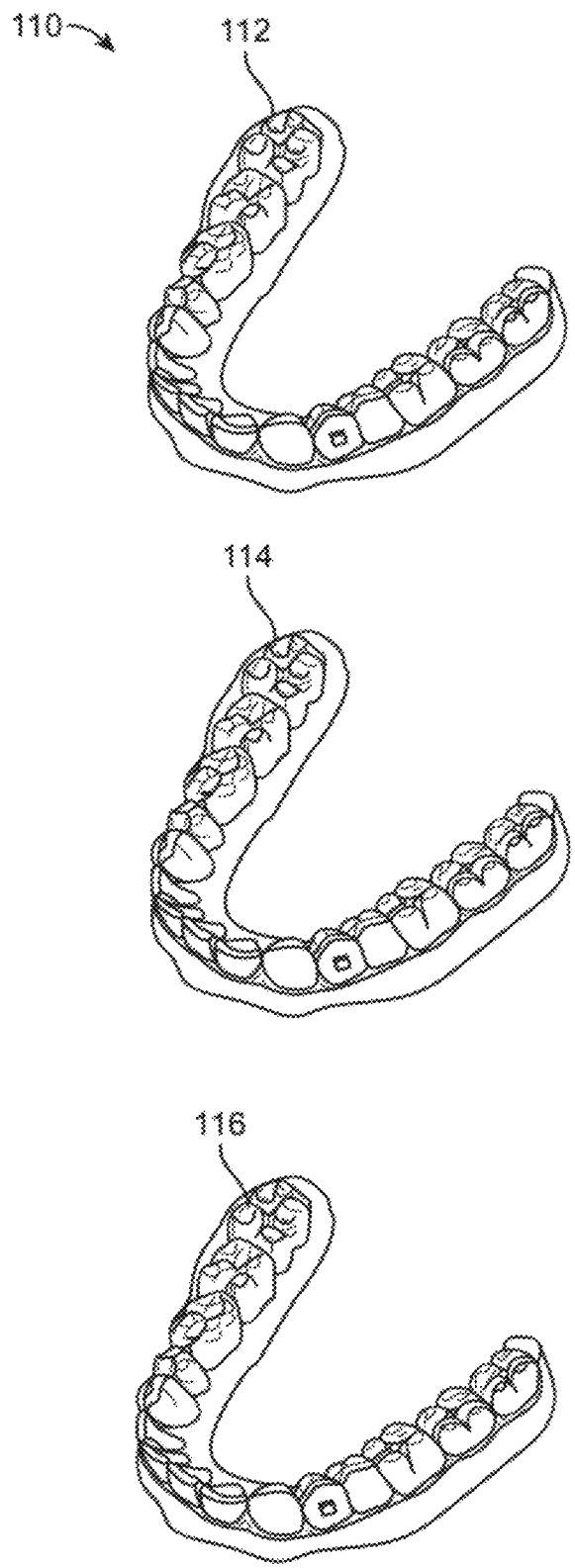
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
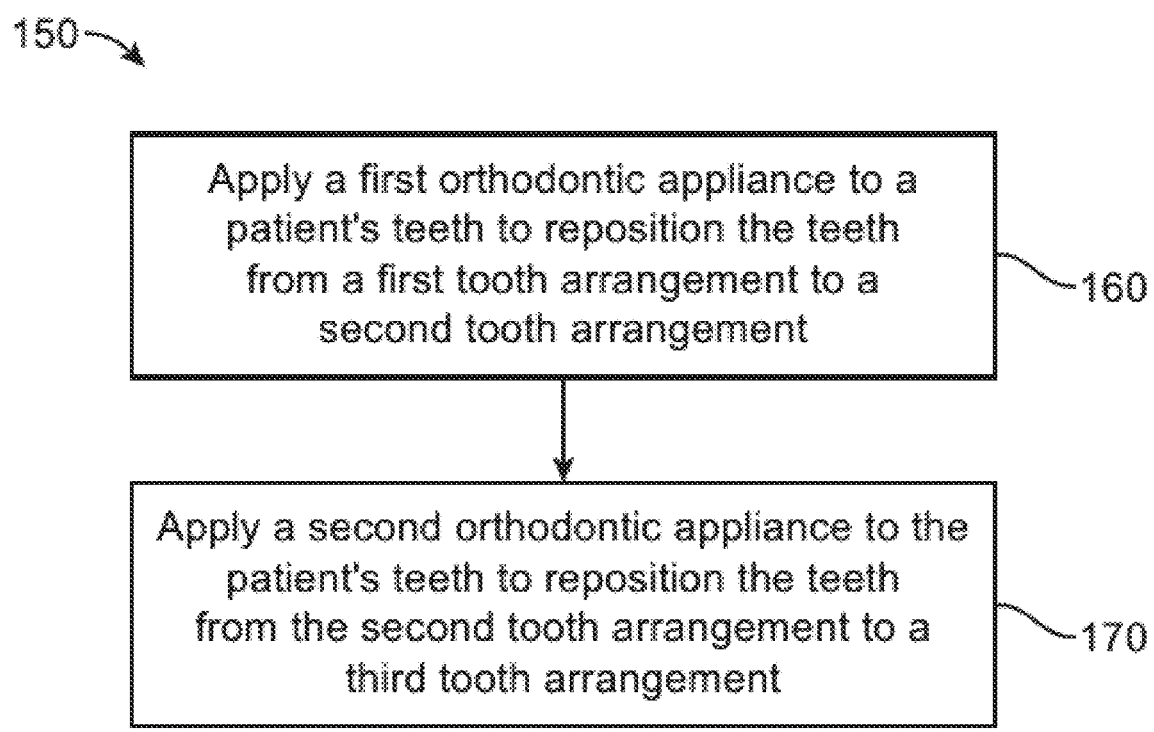
FIG. 1C illustrates a method of orthodontic treatment using a plurality of appliances, in accordance with embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photo-polymerization (e.g., stereolithography), in which an object is constructed layer by layer from a vat of liquid photo-polymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively, or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold to generate an appliance shell.

In some embodiments, the direct fabrication methods provided herein build up the object geometry in a layer-by-layer fashion, with successive layers being formed in discrete build steps. Alternatively, or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photo-polymerizable resin by forming a gradient of partially cured resin between the building surface of the object and a polymerization-inhibited "dead zone." In some embodiments, a semi-permeable membrane is used to control transport of a photo-polymerization inhibitor (e.g., oxygen) into the dead zone to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photo-polymerization, light curing, gas curing, laser curing, cross-linking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every n1 build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively, or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device to ensure that the resultant appliances are fabricated with a high degree of precision. Such precision can be beneficial for ensuring accurate delivery of a desired force system to the teeth to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variability in appliance thickness and/or other properties.

Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
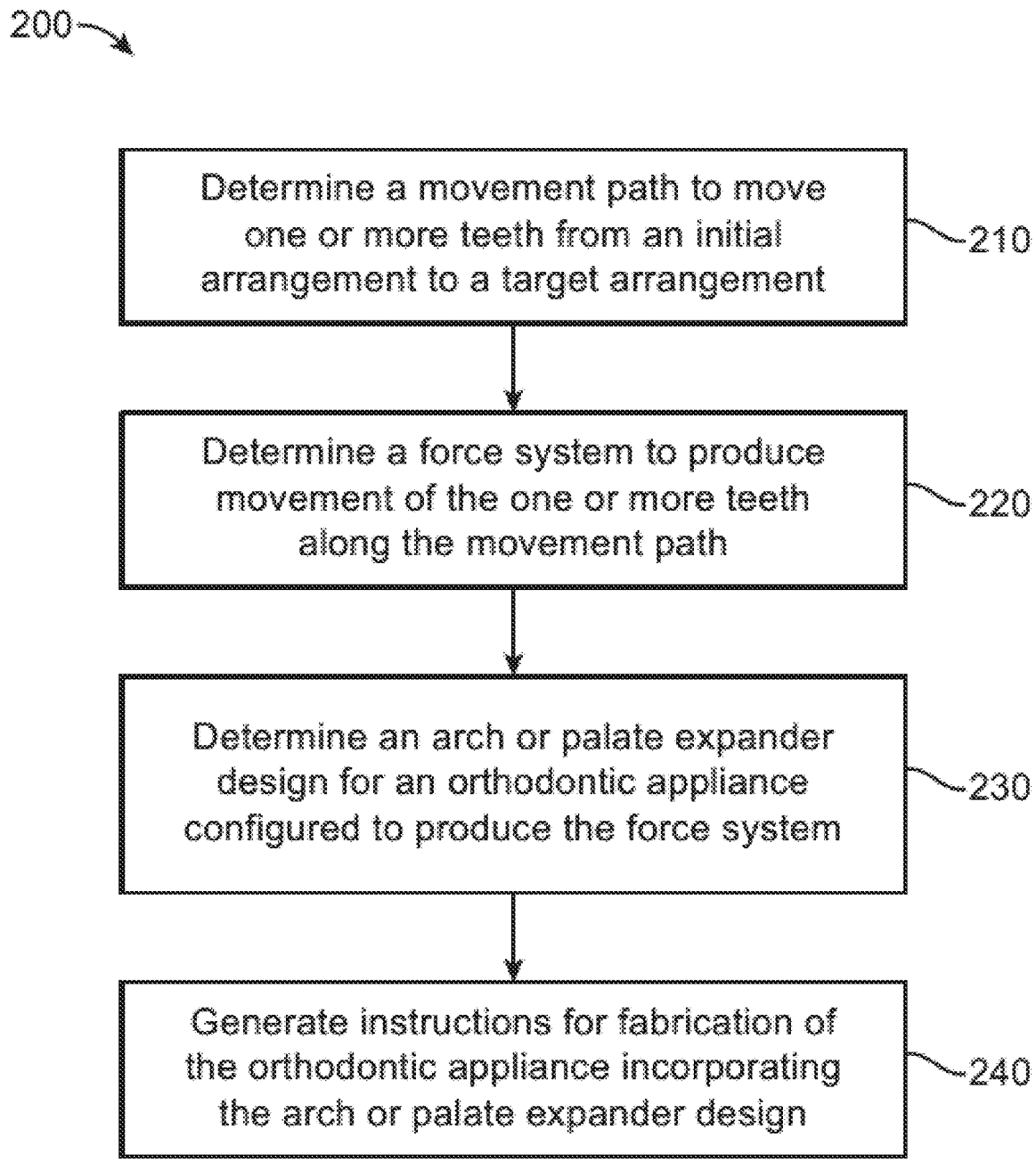
FIG. 2 illustrates a method for designing an orthodontic appliance, in accordance with embodiments.

FIG. 2 illustrates a method 200 for designing an orthodontic appliance to be produced by direct fabrication, in accordance with embodiments. The method 200 can be applied to any embodiment of the orthodontic appliances described herein. Some or all the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully formed suture. Thus, in juvenile patients and others without fully closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from several vendors can be used, including finite element analysis packages from ANSYS, Inc., of Canonsburg, PA, and SIMULIA(Abaqus) software products from Dassault Systemes of Waltham, MA.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., to iteratively determine an appliance design that produces the desired force system.

In step 240, instructions for fabrication of the orthodontic appliance incorporating the arch or palate expander design are generated. The instructions can be configured to control a fabrication system or device to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three-dimensional data of the palate and upper arch; 2) The three-dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
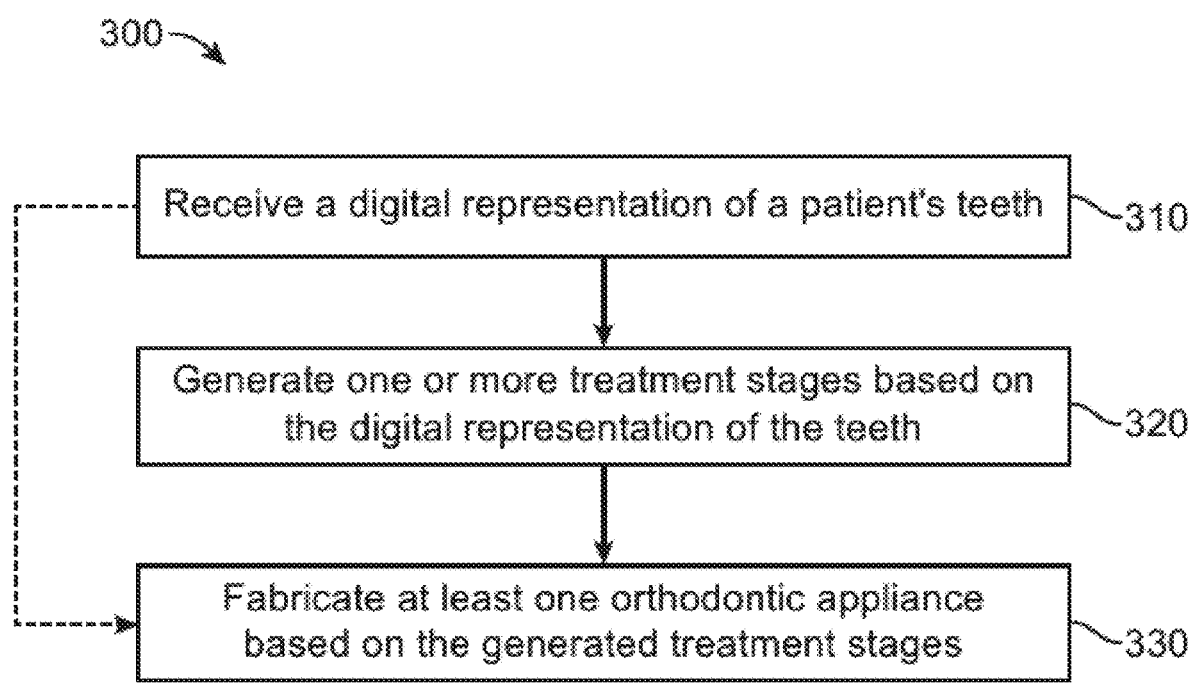
FIG. 3 illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

On-Track Treatment

Figure 4:
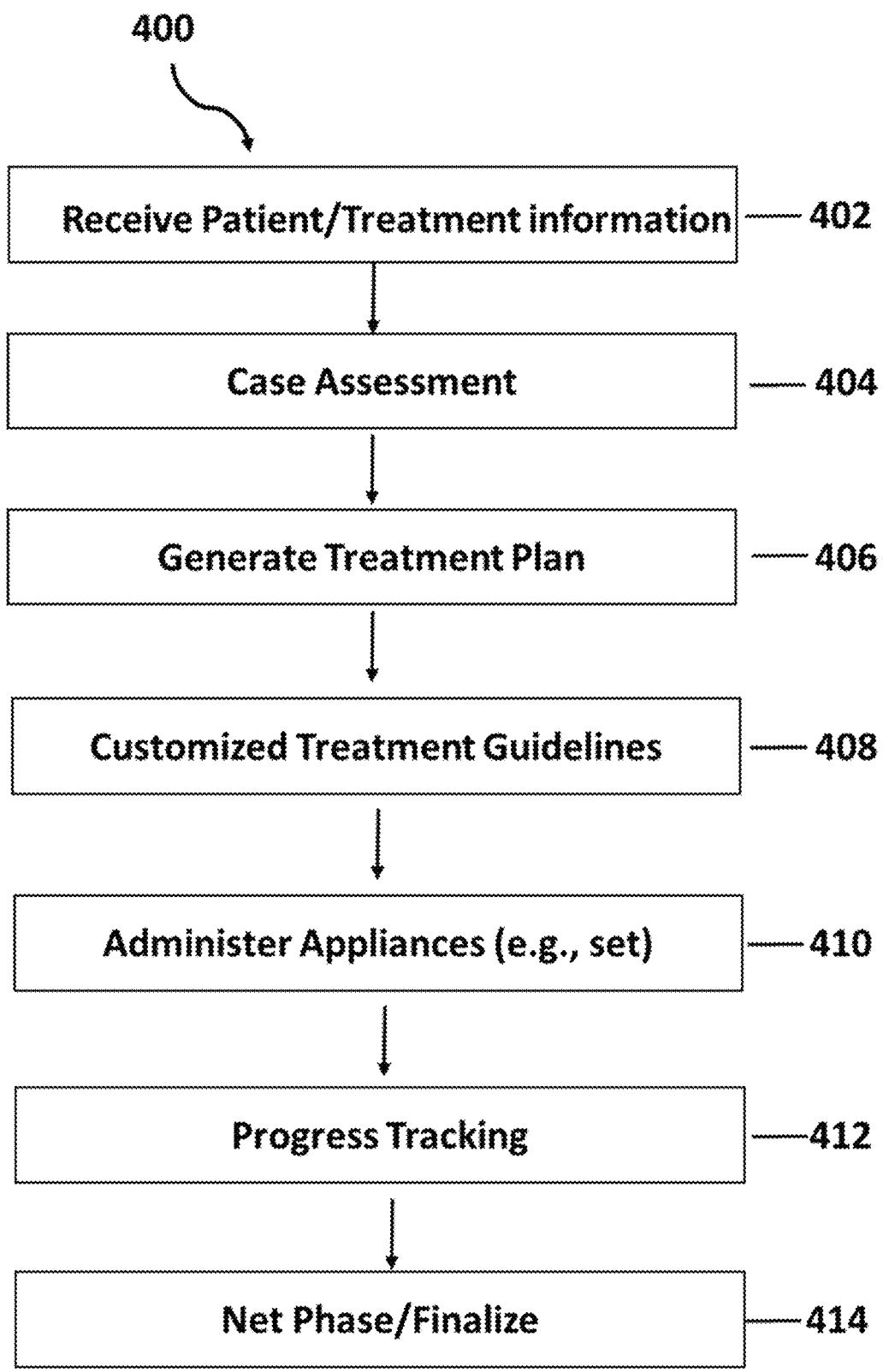
FIG. 4 shows generating and administering treatment according to an embodiment of the present disclosure.
Figure 5:
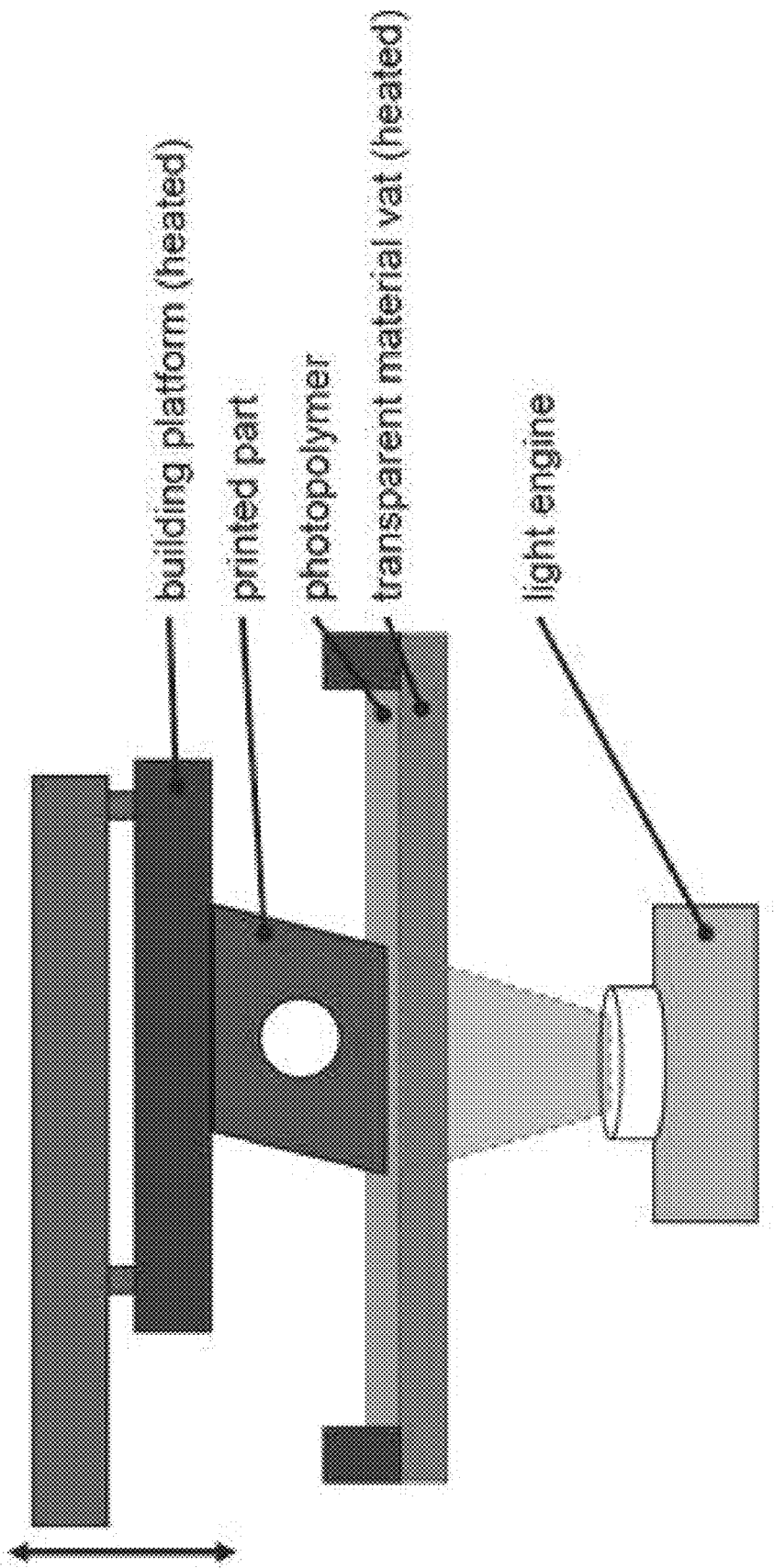
FIG. 5 shows a schematic configuration of a high temperature additive manufacturing device used for curing a curable composition of the present disclosure by using a 3D printing process.

Referring to FIG. 4, a process 400 according to the present disclosure is illustrated. Individual aspects of the process are discussed in further detail below. The process includes receiving information regarding the orthodontic condition of the patient and/or treatment information (402), generating an assessment of the case (404), and generating a treatment plan for repositioning a patient's teeth (406). Briefly, a patient/treatment information includes data comprising an initial arrangement of the patient's teeth, which includes obtaining an impression or scan of the patient's teeth prior to the onset of treatment and can further include identification of one or more treatment goals selected by the practitioner and/or patient. A case assessment can be generated (404) to assess the complexity or difficulty of moving the particular patient's teeth in general or specifically corresponding to identified treatment goals and may further include practitioner experience and/or comfort level in administering the desired orthodontic treatment. In some cases, however, the assessment can include simply identifying treatment options (e.g., appointment planning, progress tracking, etc.) that are of interest to the patient and/or practitioner. The information and/or corresponding treatment plan includes identifying a final or target arrangement of the patient's teeth that is desired, as well as a plurality of planned successive or intermediary tooth arrangements for moving the teeth along a treatment path from the initial arrangement toward the selected final or target arrangement.

The process further includes generating customized treatment guidelines (408). The treatment plan may include multiple phases of treatment, with a customized set of treatment guidelines generated that correspond to a phase of the treatment plan. The guidelines can include detailed information on timing and/or content (e.g., specific tasks) to be completed during a given phase of treatment and can be of sufficient detail to guide a practitioner, including a less experienced practitioner or practitioner relatively new to the orthodontic treatment process, through the phase of treatment. Since the guidelines are designed to specifically correspond to the treatment plan and provide guidelines on activities specifically identified in the treatment information and/or generated treatment plan, the guidelines can be customized. The customized treatment guidelines are then provided to the practitioner so as to help instruct the practitioner as how to deliver a given phase of treatment. As set forth above, appliances can be generated based on the planned arrangements and can be provided to the practitioner and ultimately administered to the patient (410). The appliances can be provided and/or administered in sets or batches of appliances, such as 2, 3, 4, 5, 6, 7, 8, 9, or more appliances, but are not limited to any administrative scheme. Appliances can be provided to the practitioner concurrently with a given set of guidelines, or appliances and guidelines can be provided separately.

After the treatment according to the plan begins and following administration of appliances to the patient, treatment progress tracking, e.g., by teeth matching, is done to assess a current and actual arrangement of the patient's teeth compared to a planned arrangement (412). If the patient's teeth are determined to be "on-track" and progressing according to the treatment plan, then treatment progresses as planned and treatment progresses to the next stage of treatment (414). If the patient's teeth have substantially reached the initially planned final arrangement, then treatment progresses to the final stages of treatment (414). Where the patient's teeth are determined to be tracking according to the treatment plan, but have not yet reached the final arrangement, the next set of appliances can be administered to the patient.

The threshold difference values of a planned position of teeth to actual positions selected as indicating that a patient's teeth have progressed on-track are provided below in TABLE 1. If a patient's teeth have progressed at or within the threshold values, the progress is on-track. If a patient's teeth have progressed beyond the threshold values, the progress is off-track.

TABLE 1

| Type Movement | Difference Actual/Planned |
| --- | --- |
| Rotations | |
| Upper Central Incisors | 9 degrees |
| Upper Lateral Incisors | 11 degrees |
| Lower Incisors | 11 degrees |
| Upper Cuspids | 11 degrees |
| Lower Cuspids | 9.25 degrees |
| Upper Bicuspids | 7.25 degrees |
| Lower First Bicuspid | 7.25 degrees |
| Lower Second Bicuspid | 7.25 degrees |
| Molars | 6 degrees |
| Extrusion | |
| Anterior | 0.75 mm |
| Posterior | 0.75 mm |
| Intrusion | |
| Anterior | 0.75 mm |
| Posterior | 0.75 mm |
| Angulation | |
| Anterior | 5.5 degrees |
| Posterior | 3.7 degrees |
| Inclination | |
| Anterior | 5.5 degrees |
| Posterior | 3.7 degrees |
| Translation | |
| BL Anterior | 0.7 mm |
| BL Posterior Cuspids | 0.9 mm |
| MD Anterior | 0.45 mm |
| MD Cuspids | 0.45 mm |
| MD Posterior | 0.5 mm |

The patient's teeth are determined to be on track by comparison of the teeth in their current positions with teeth in their expected or planned positions, and by confirming the teeth are within the parameter variance disclosed in TABLE 1. If the patient's teeth are determined to be on track, then treatment can progress according to the existing or original treatment plan. For example, a patient determined to be progressing on track can be administered one or more subsequent appliances according to the treatment plan, such as the next set of appliances. Treatment can progress to the final stages and/or can reach a point in the treatment plan where bite matching is repeated for a determination of whether a patient's teeth are progressing as planned or if the teeth are off track.

In some embodiments, as further disclosed herein, this disclosure provides methods of treating a patient using a 3D printed orthodontic appliance. As a non-limiting example, orthodontic appliances comprising crystalline domains, polymer crystals, and/or materials that can form crystalline domains or polymer crystals can be 3D printed and used to reposition a patient's teeth. In certain embodiments, the method of repositioning a patient's teeth (or, in some embodiments, a singular tooth) comprises: generating a treatment plan for the patient, the plan comprising a plurality of intermediate tooth arrangements for moving teeth along a treatment path from an initial arrangement toward a final arrangement; producing a 3D printed orthodontic appliance; and moving on-track, with the orthodontic appliance, at least one of the patient's teeth toward an intermediate arrangement or a final tooth arrangement. In some embodiments, producing the 3D printed orthodontic appliance uses the crystallizable resins disclosed further herein. On-track performance can be determined, e.g., from TABLE 1, above.

In some embodiments, the method further comprises tracking the progression of the patient's teeth along the treatment path after administration of the orthodontic appliance. In certain embodiments, the tracking comprises comparing a current arrangement of the patient's teeth to a planned arrangement of the teeth. As a non-limiting example, following the initial administration of the orthodontic appliance, a period passes (e.g., two weeks), a comparison of the now-current arrangement of the patient's teeth (i.e., at two weeks of treatment) can be compared with the teeth arrangement of the treatment plan. In some embodiments, the progression can also be tracked by comparing the current arrangement of the patient's teeth with the initial configuration of the patient's teeth. The period can be, for example, greater than 3 days, greater than 4 days, greater than 5 days, greater than 6 days, greater than 7 days, greater than 8 days, greater than 9 days, greater than 10 days, greater than 11 days, greater than 12 days, greater than 13 days, greater than 2 weeks, greater than 3 weeks, greater than 4 weeks, or greater than 2 months. In some embodiments, the period can be from at least 3 days to at most 4 weeks, from at least 3 days to at most 3 weeks, from at least 3 days to at most 2 weeks, from at least 4 days to at most 4 weeks, from at least 4 days to at most 3 weeks, or from at least 4 days to at most 2 weeks. In certain embodiments, the period can restart following the administration of a new orthodontic appliance.

In some embodiments, greater than 50%, greater than 55%, greater than 60%, greater than 65%, greater than 70%, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the patient's teeth are on track with the treatment plan after a period of time of using an orthodontic appliance as disclosed further herein. In some embodiments, the period is 3 days, 4 days, 5 days, 6 days, 7 days, 8 days, 9 days, 10 days, 11 days, 12 days, 13 days, 2 weeks, 3 weeks, 4 weeks, or greater than 4 weeks.

As disclosed further herein, orthodontic appliances disclosed herein have advantageous properties, such as increased durability, and an ability to retain resilient forces to a patient's teeth for a prolonged period. In some embodiments of the method disclosed above, the 3D printed orthodontic appliance has a retained repositioning force (i.e., the repositioning force after the orthodontic appliance has been applied to or worn by the patient over a period of time), and the retained repositioning force to at least one of the patient's teeth after the period of time is at least 10%, at least 20%, at least 30%, at least 40%, at least 50%, at least 55%, at least 60%, at least 65%, at least 70%, at least 75%, at least 80%, at least 85%, at least 90%, at least 95%, at least 96%, at least 97%, at least 98%, or at least 99% of the repositioning force initially provided to the at least one of the patient's teeth (i.e., with initial application of the orthodontic appliance). In some embodiments, the period is 1 day, 2 days, 3 days, 4 days, 5 days, 6 days, 7 days, 8 days, 9 days, 10 days, 11 days, 12 days, 13 days, 2 weeks, 3 weeks, 4 weeks, or greater than 4 weeks. In some embodiments, the repositioning force applied to at least one of the patient's teeth is present for a time period of less than 24 hours, from about 24 hours to about 2 months, from about 24 hours to about 1 month, from about 24 hours to about 3 weeks, from about 24 hours to about 14 days, from about 24 hours to about 7 days, from about 24 hours to about 3 days, from about 3 days to about 2 months, from about 3 days to about 1 month, from about 3 days to about 3 weeks, from about 3 days to about 14 days, from about 3 days to about 7 days, from about 7 days to about 2 months, from about 7 days to about 1 month, from about 7 days to about 3 weeks, from about 7 days to about 2 weeks, or greater than 2 months. In some embodiments, the repositioning force applied to at least one of the patient's teeth is present for about 24 hours, for about 3 days, for about 7 days, for about 14 days, for about 2 months, or for more than 2 months.

In some embodiments, the orthodontic appliances disclosed herein can provide on-track movement of at least one of the patient's teeth. On-track movement has been described further herein, e.g., at TABLE 1. In some embodiments, the orthodontic appliances disclosed herein can be used to achieve on-track movement of at least one of the patient's teeth to an intermediate tooth arrangement. In some embodiments, the orthodontic appliances disclosed herein can be used to achieve on-track movement of at least one of the patient's teeth to a final tooth arrangement.

In some embodiments, prior to moving, with the orthodontic appliance, at least one of the patient's teeth toward an intermediate arrangement or a final tooth arrangement, the orthodontic appliance has characteristics which are retained following the use of the orthodontic appliance. In some embodiments, prior to the moving step, the orthodontic appliance comprises a first flexural modulus. In certain embodiments, after the moving step, the orthodontic appliance comprises a second flexural modulus. In some embodiments, the second flexural modulus is at least 99%, at least 98%, at least 97%, at least 96%, at least 95%, at least 94%, at least 93%, at least 92%, at least 91%, at least 90%, at least 85%, at least 80%, at least 75%, at least 70%, at least 65%, at least 60%, at least 50%, or at least 40% of the first flexural modulus. In some embodiments, the second flexural modulus is greater than 50% of the first flexural modulus. In some embodiments, this comparison is performed following a period in which the appliance is applied. In some embodiments, the period is 3 days, 4 days, 5 days, 6 days, 7 days, 8 days, 9 days, 10 days, 11 days, 12 days, 13 days, 2 weeks, 3 weeks, 4 weeks, or greater than 4 weeks.

In some embodiments, prior to the moving step, the orthodontic appliance comprises a first elongation at break. In certain embodiments, after the moving step, the orthodontic appliance comprises a second elongation at break. In some embodiments, the second elongation at break is at least 99%, at least 98%, at least 97%, at least 96%, at least 95%, at least 94%, at least 93%, at least 92%, at least 91%, at least 90%, at least 85%, at least 80%, at least 75%, at least 70%, at least 65%, at least 60%, at least 50%, or at least 40% of the first elongation at break. In some embodiments, the second elongation at break is greater than 50% of the first elongation at break. In some embodiments, this comparison is performed following a period in which the appliance is applied. In some embodiments, the period is 3 days, 4 days, 5 days, 6 days, 7 days, 8 days, 9 days, 10 days, 11 days, 12 days, 13 days, 2 weeks, 3 weeks, 4 weeks, or greater than 4 weeks.

As provided herein, the methods disclosed can use the orthodontic appliances further disclosed herein. The orthodontic appliances can be directly fabricated using, e.g., the photocurable resins disclosed herein.

The appliances formed from the photocurable resins disclosed herein provide improved durability, strength, and flexibility, which in turn improve the rate of on-track progression in treatment plans. In some embodiments, greater than 60%, greater than 70%, greater than 80%, greater than 90%, or greater than 95% of patients treated with the orthodontic appliances disclosed herein (e.g., an aligner) are classified as on-track in each treatment stage. In certain embodiments, greater than 60%, greater than 70%, greater than 80%, greater than 90%, or greater than 95% of patients treated with the orthodontic appliances disclosed herein (e.g., an aligner) have greater than 50%, greater than 55%, greater than 60%, greater than 65%, greater than 70%, greater than 75%, greater than 80%, greater than 85%, greater than 90%, or greater than 95% of their tooth movements classified as on-track.

In some embodiments, cured polymer compositions can have increased resilience to damage, can be tough, and can have decreased water uptake when compared to similar polymer compositions. The cured polymer compositions can be used for devices within the field of orthodontics, as well as outside the field of orthodontics. For example, the cured polymer compositions disclosed herein can be used to make devices for use in aerospace applications, automobile manufacturing, the manufacture of prototypes, and/or devices for use in durable parts production.

Experimental Methods

All chemicals were purchased from commercial sources and were used without further purification, unless otherwise stated.

$^1$H NMR and $^{13}$C NMR spectra were recorded on a BRUKER AC-E-200 FT-NMR spectrometer or a BRUKER Avance DRX-400 FT-NMR spectrometer. The chemical shifts are reported in ppm (s: singlet, d: doublet, t: triplet, q: quartet, m: multiplet). The solvents used were deuterated chloroform (CDCl$_3$, 99.5% deuteration) and deuterated DMSO (d$_6$-DMSO, 99.8% deuteration).

In some embodiments, the stress relaxation of a material or device can be measured by monitoring the time-dependent stress resulting from a steady strain. The extent of stress relaxation can also depend on the temperature, relative humidity, and other applicable conditions (e.g., presence of water). In embodiments, the test conditions for stress relaxation are a temperature of 37±2° C. at 100% relative humidity or a temperature of 37±2° C. in water.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is m$^2$/s. Devices for measuring viscosity include viscometers and rheometers. For example, an MCR 301 rheometer from Anton Paar may be used for rheological measurement in rotation mode (PP-25, 50 s-1, 50-115° C., 3° C./min).

Determining the water content when fully saturated at use temperature can comprise exposing the polymer composition to 100% humidity at the use temperature (e.g., 40° C.) for a period of 24 hours, then determining water content by methods known in the art, such as by weight.

Material properties of the cured polymer composition can be determined, for example, by using the following methods:
  stress relaxation properties can be assessed using an RSA-G2 instrument from TA Instruments, with a 3-point bending, according to ASTM D790; for example, stress relaxation can be measured at 30° C. and submerged in water, and reported as the remaining load after 24 hours, as either the percent (%) of initial load, and/or in Mpa;
  storage modulus can be measured at 37° C. and is reported in Mpa;
  T$_g$ of the cured polymer composition can be assessed using dynamic mechanical analysis (DMA) and is provided herein as the tan δ peak.
  tensile modulus, tensile strength, elongation at yield and elongation at break can be assessed according to ISO 527-2 5B; and tensile strength at yield, elongation at break, tensile strength, and Young's modulus can be assessed according to ASTM D1708.

Additive manufacturing or 3D printing processes for generating a device herein (e.g., an orthodontic appliance) can be conducted using a Hot Lithography apparatus prototype from Cubicure (Vienna, Austria). In such cases, a photo-curable composition (e.g., resin) according to the present disclosure can be filled into the transparent material vat of the apparatus and heated to 90-110° C. The building platform can be heated to 90-110° C., too, and lowered to establish holohedral contact with the upper surface of the curable composition. By irradiating the composition with 375 nm UV radiation using a diode laser from Soliton, which can have an output power of 70 mW, which can be controlled to trace a predefined prototype design, and alternately raising the building platform, the composition can be cured layer by layer by a photopolymerization process according to the disclosure, resulting in a polymer composition according to present disclosure.

To synthesize block co-polymers of the present disclosure, a hydroxyaryl compound (e.g., 2,6-dimethoxyphenol) is functionalized with an acrylate or a methacrylate, providing a handle for controlled radical block co-polymerization with an alkyl acrylate (e.g., n-butyl acrylate). Sequential monomer addition during polymerization yields a multi-block co-polymer (e.g., di-block, tri-block, etc.), depending on the initiator structure (see, e.g., Reaction Schemes 1 and 2).

REACTION SCHEME 1 - SYNTHESIS OF AN AB-DI-BLOCK CO-POLYMER

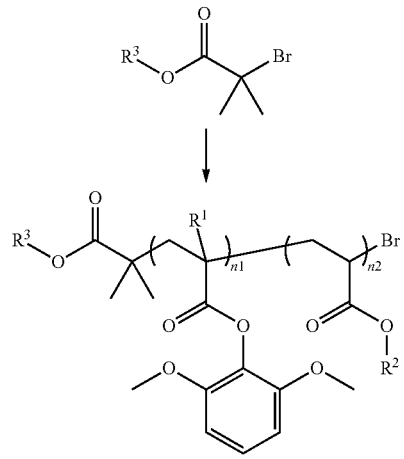

wherein R$^1$, R$^2$, R$^3$, n1, and n2 are as disclosed herein.

REACTION SCHEME 2 - SYNTHESIS OF AN ABA-TRI-BLOCK CO-POLYMER

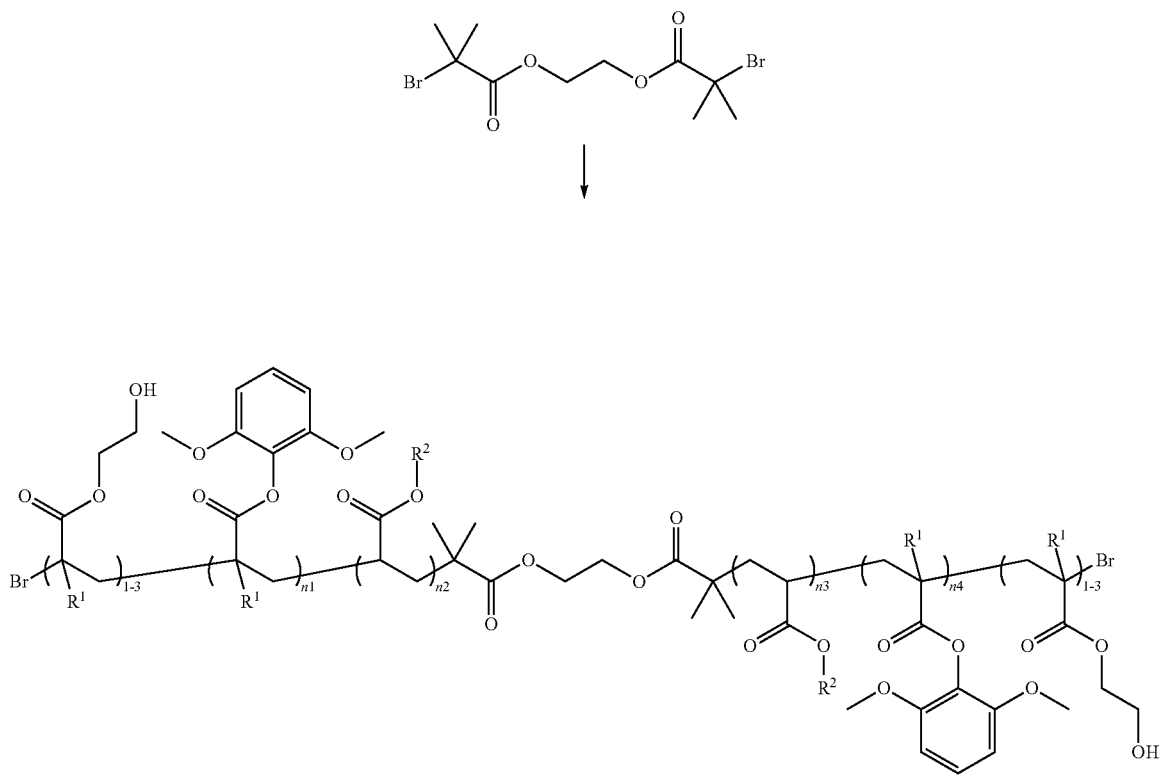

wherein $R^1$, $R^2$, n1, n2, n3, and n4 are as disclosed herein.

If the block co-polymer contains a hydroxyl functional group(s) at the end of a block, either by choosing a hydroxyl-functionalized initiator or by introducing a few equivalents of a hydroxyl-functionalized monomer at the end of the polymerization reaction, they can be modified post-polymerization with one or more methacrylate(s) to yield reactive block co-polymers (see, e.g., Reaction Scheme 3).

REACTION SCHEME 3 - POST FUNCTIONALIZATION OF HYDROXY TERMINATED AB-DI-BLOCK POLYMER WITH A METHACRYLATE END GROUP

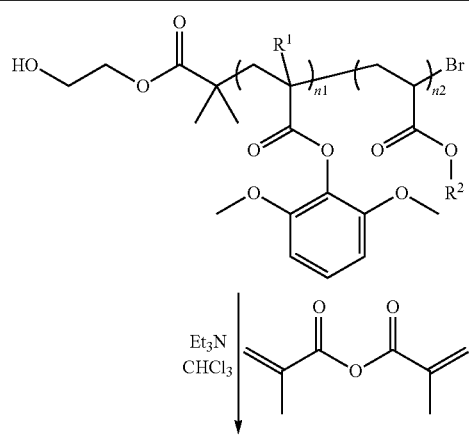

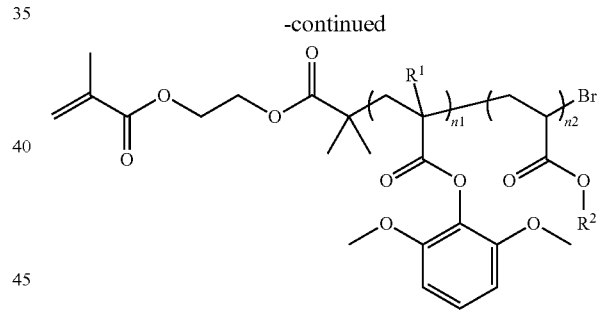

wherein $R^1$, $R^2$, n1, and n2 are as disclosed herein.

In turn, these reactive or functionalized block co-polymers may be covalently bound to the rest of a photopolymer network.

EXAMPLES

The following examples are given for the purpose of illustrating various embodiments of the invention and are not meant to limit the present disclosure in any fashion. The present examples, along with the methods described herein are presently representative of some embodiments, are exemplary, and are not intended as limitations on the scope of the invention. Changes therein and other uses which are encompassed within the spirit of the invention as defined by the scope of the claims will occur to those skilled in the art.

Example 1

Synthesis of 2,6-dimethoxyphenyl acrylate

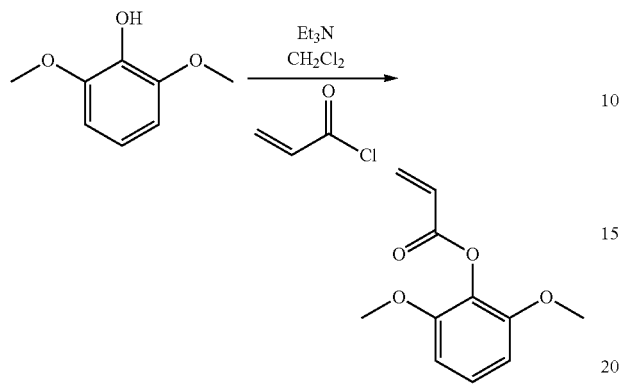

In a 1 L round-bottom flask equipped with a magnetic stir bar was dissolved 2,6-dimethoxyphenol (50 g, 0.324 mol, 1 eq.) in dichloromethane (324 mL). Then, triethylamine (67.8 mL, 0.489 mol, 1.5 eq.) was added to the flask, and the reaction mixture was cooled in an ice-water bath. Acryloyl chloride (31.6 mL, 0.389 mol, 1.2 eq.) was added dropwise. Gas evolution was observed. The reaction mixture was allowed to stir at room temperature overnight. Then, water (300 mL) was added, and the layers separated. The organic layer was washed with water (300 mL) once more before concentrated in vacuo. The crude material was purified by flash silica gel column chromatography eluting with 15% to 25% ethyl acetate in hexanes to yield desired product (60 g, 95% yield) as a clear, colorless liquid.

Example 2

Synthesis of a Poly(N-Butyl Acrylate) Monofunctional Macroinitiator

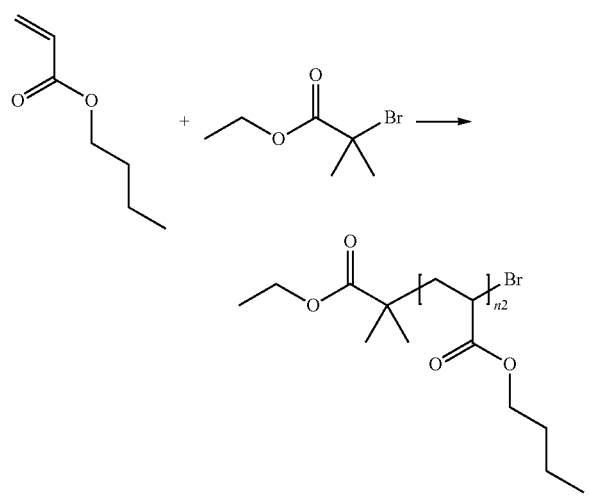

To a 100-mL Schlenk tube equipped with a magnetic stir bar were added n-butyl acrylate (22.1 g, 154 mmol, 100 equiv), ethyl α-bromoisobutyrate (300 mg, 1.54 mmol, 1 equiv), N,N,N',N",N"-pentamethyldiethylenetriamine (321 μL, 1.54 mmol, 1 equiv), and anisole (2 mL). The tube was sealed with a septum and the contents sparged with nitrogen for 30 minutes. Then, under positive nitrogen pressure, copper(I) bromide (221 mg, 1.54 mmol, 1 equiv) was added to the vessel. The reaction mixture was allowed to stir for 5 minutes before it was moved to an oil bath at 70° C. to begin polymerization. The reaction progress was monitored by $^1$H NMR analysis of aliquots taken periodically from the reaction mixture. Finally, after 2 hours, the flask was moved to an ice-water bath and opened to air to stop the polymerization.

Example 3

Synthesis of Poly(N-Butyl Acrylate)-Block-Poly(2,6-Dimethoxyphenyl Acrylate)

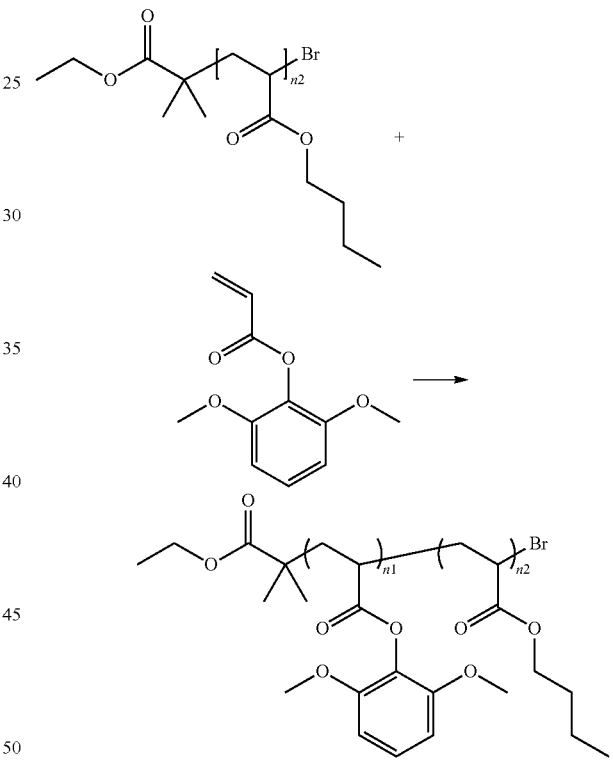

To a 100-mL Schlenk tube equipped with a magnetic stir bar was added poly(n-butyl acrylate) (Example 2, 6.25 g, 0.481 mmol, 1 eq.), 2,6-dimethoxyphenyl acrylate (Example 1, 10 g, 48.1 mmol, 100 eq.), N,N,N',N",N"-pentamethyldiethylenetriamine (50 μL, 0.24 mmol, 0.5 eq.), and anisole (10 mL). The tube was sealed with a septum and the contents sparged with nitrogen for 30 minutes. Then, under positive nitrogen pressure, copper(I) bromide (34.5 mg, 0.240 mmol, 0.5 eq.) was added to the vessel. The reaction mixture was moved to an oil bath at 80° C. to begin polymerization. The reaction progress was monitored by $^1$H NMR analysis of aliquots taken periodically from the reaction mixture. Finally, the reaction flask was moved to an ice-water bath and opened to air to stop the polymerization. The mixture was dissolved in dichloromethane at room temperature, passed through neutral alumina, and precipitated in methanol twice to afford poly(n-butyl acrylate)-block-poly(2,6-dimethoxyphenyl acrylate).

Gel permeation chromatography (GPC) was used to verify the macroinitiator (desired product from Example 2; starting material) was extended to form desired product of poly(n-butyl acrylate)-block-poly(2,6-dimethoxyphenyl acrylate) following chain extension with 2,6-dimethoxyphenyl acrylate.

Example 4

Synthesis of a Poly(N-Butyl Acrylate) Difunctional Macroinitiator

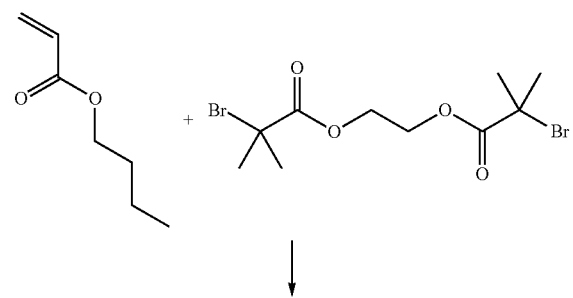

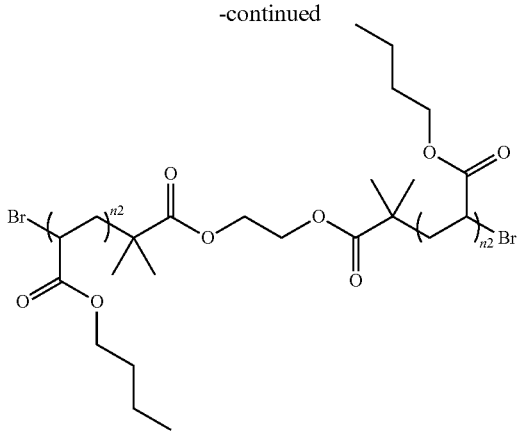

To a 100-mL Schlenk tube equipped with a magnetic stir bar were added n-butyl acrylate (18.7 g, 146 mmol, 70 equiv), ethane-1,2-diyl bis(2-bromo-2-methylpropanoate) (750 mg, 2.08 mmol, 1 equiv), N,N,N',N'',N''-pentamethyldiethylenetriamine (218 uL, 1.04 mmol, 0.5 equiv), and anisole (2 mL). The tube was sealed with a septum and the contents sparged with nitrogen for 30 minutes. Then, under positive nitrogen pressure, copper(I) bromide (149 mg, 1.04 mmol, 0.5 equiv) was added to the vessel. The reaction mixture was allowed to stir for 5 minutes before it was moved to an oil bath at 80° C. to begin polymerization. The reaction progress was monitored by ¹H NMR analysis of aliquots taken periodically from the reaction mixture. Finally, after 19 hours, the flask was moved to an ice-water bath and opened to air to stop the polymerization.

Example 5

Synthesis of Poly(2,6-Dimethoxyphenyl Acrylate)-Block-Poly(N-Butyl Acrylate)-Block-Poly(2,6-Dimethoxyphenyl Acrylate)

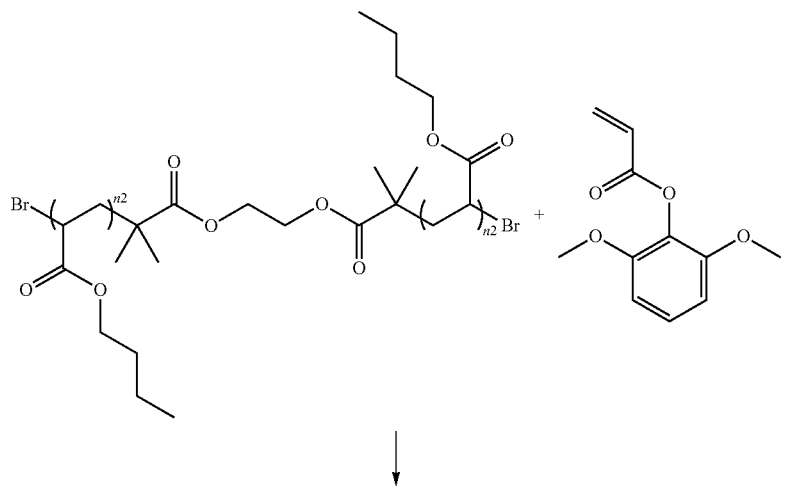

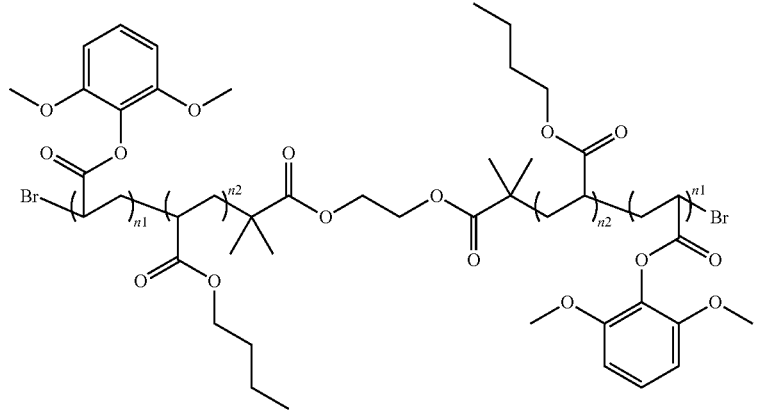

To a 25-mL Schlenk tube equipped with a magnetic stir bar was added poly(n-butyl acrylate) (1.27 g, 0.096 mmol, 1 eq.), 2,6-dimethoxyphenyl acrylate (Example 1, 2.00 g, 9.62 mmol, 100 eq.), N,N,N',N'',N''-pentamethyldiethylenetriamine (10.0 μL, 0.048 mmol, 0.5 eq.), and anisole (2 mL). The tube was sealed with a septum and the contents sparged with nitrogen for 30 minutes. Then, under positive nitrogen pressure, copper(I) bromide (6.90 mg, 0.048 mmol, 0.5 eq.) was added to the vessel. The reaction mixture was moved to an oil bath at 80° C. to begin polymerization. The reaction progress was monitored by $^1$H NMR analysis of aliquots taken periodically from the reaction mixture. Finally, the reaction flask was moved to an ice-water bath and opened to air to stop the polymerization. The mixture was dissolved in dichloromethane at room temperature, passed through neutral alumina, and precipitated in methanol twice to afford poly(2,6-dimethoxyphenyl acrylate)-block-poly(n-butyl acrylate)-block-poly(2,6-dimethoxyphenyl acrylate).

Gel permeation chromatography (GPC) was used to verify the macroinitiator (desired product from Example 4; starting material) was extended to form desired product of poly(2,6-dimethoxyphenyl acrylate)-block-poly(n-butyl acrylate)-block-poly(2,6-dimethoxyphenyl acrylate) following chain extension with 2,6-dimethoxyphenyl acrylate.

Example 6

Synthesis of Poly(2,6-Dimethoxyphenyl Methacrylate)-Block-Poly(N-Butyl Acrylate)-Block-Poly(2,6-Dimethoxyphenyl Methacrylate)

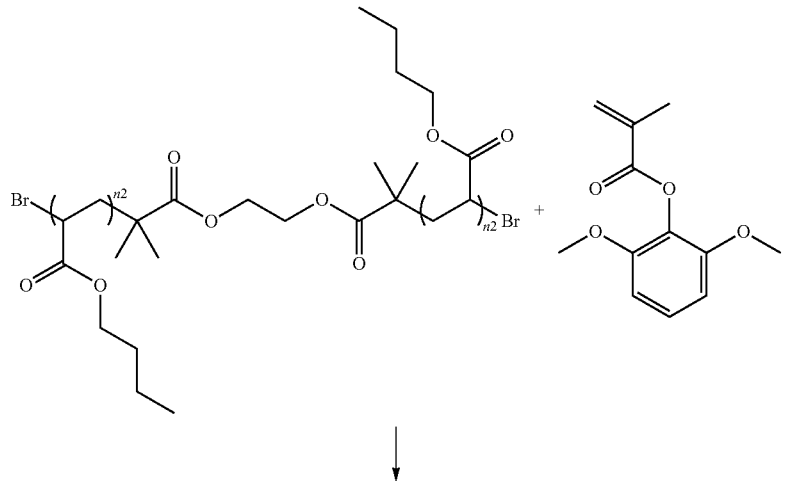

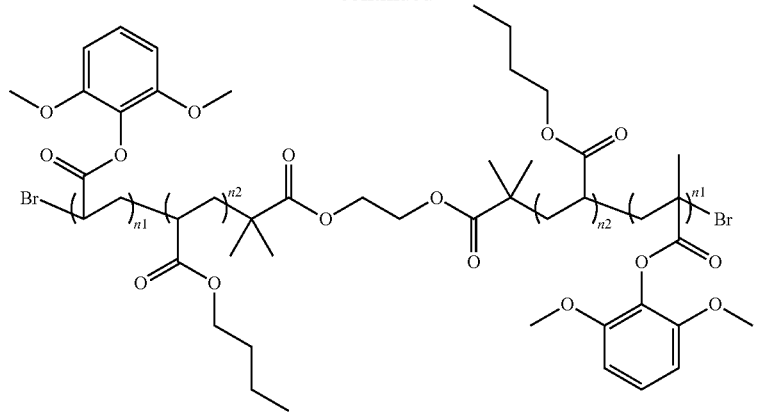

To a 100-mL Schlenk tube equipped with a magnetic stir bar was added poly(n-butyl acrylate) (2.00 g, 0.235 mmol, 1 eq.), 2,6-dimethoxyphenyl methacrylate (2.09 g, 9.41 mmol, 40 eq.), N,N,N',N'',N''-pentamethyldiethylenetriamine (197 µL, 0.941 mmol, 4 eq.), and anisole (4 mL). The tube was sealed with a septum and the contents sparged with nitrogen for 30 minutes. Then, under positive nitrogen pressure, copper(I) chloride (46.6 mg, 0.471 mmol, 2 eq.) was added to the vessel. The reaction mixture was moved to an oil bath at 80° C. to begin polymerization. The reaction progress was monitored by $^1$H NMR analysis of aliquots taken periodically from the reaction mixture. Finally, the reaction flask was moved to an ice-water bath and opened to air to stop the polymerization. The mixture was dissolved in dichloromethane at room temperature, passed through neutral alumina, and precipitated in methanol twice to afford poly(2,6-dimethoxyphenyl methacrylate)-block-poly(n-butyl acrylate)-block-poly(2,6-dimethoxyphenyl acrylate).

Gel permeation chromatography (GPC) was used to verify the macroinitiator (desired product from Example 4; starting material) was extended to form desired product of poly(2,6-dimethoxyphenyl methacrylate)-block-poly(n-butyl acrylate)-block-poly(2,6-dimethoxyphenyl acrylate) following chain extension with 2,6-dimethoxyphenyl methacrylate.

Example 7

Analysis of Polymer Compositions

A DSC thermogram for poly(2,6-dimethoxyphenyl acrylate) was obtained. A glass transition temperature ($T_g$) near 127° C. was observed when plotting temperature as a function of (normalized) heat flow (W/g).

A DSC thermogram for poly(n-butyl acrylate)-block-poly(2,6-dimethoxyphenyl acrylate) was also obtained. A glass transition temperature ($T_g$) near −49° C. was observed for the poly(n-butyl acrylate) block and a $T_g$ near 134° C. was observed for the poly(2,6-dimethoxyphenyl acrylate) block was observed when plotting temperature as a function of (normalized) heat flow (W/g).

Example 8

Polymer Materials Prepared with 5 wt % Self-Assembling Block Copolymer

| Property | Unit | Control Base formula | Sample 1 Base formula + 5 wt % Example 3 | Sample 2 Base formula + 5 wt % Example 5 | Sample 3 Base formula + 5 wt % Example 6 (18 kDa) | Sample 4 Base formula + 5 wt % Example 6 (36 kDa) |
|---|---|---|---|---|---|---|
| Young's modulus | MPa | 1342 | 1154 | 1302 | 1240 | 1108 |
| Elongation at Break | % | 53 | 12 | 35 | 47 | 73 |
| Stress at Yield | MPa | 40.9 | 36.3 | 37.4 | 39.8 | 36.3 |
| 24-Hr flexural modulus | MPa | 136 | — | 137 | 114 | 94 |
| 24-Hr flexural modulus (annealed) | MPa | 208 | — | 174 | 191 | 165 |

In the Table above (left to right), the addition of 5 wt % of di- or tri-block copolymer containing poly(2,6-dimethoxyphenyl acrylate) to the base formula resulted in a drop in elongation at break. Replacement of triblock poly(2,6-dimethoxyphenyl acrylate)-block-poly(n-butyl acrylate)-block-poly(2,6-dimethoxyphenyl acrylate) with poly(2,6-dimethoxyphenyl methacrylate-block-poly(n-butyl acrylate)-block-poly(2,6-dimethoxyphenyl methacrylate) of a sufficiently high molecular weight led to a higher elongation at break with slight lowering of the tensile and final flexural moduli.

Figure 7:
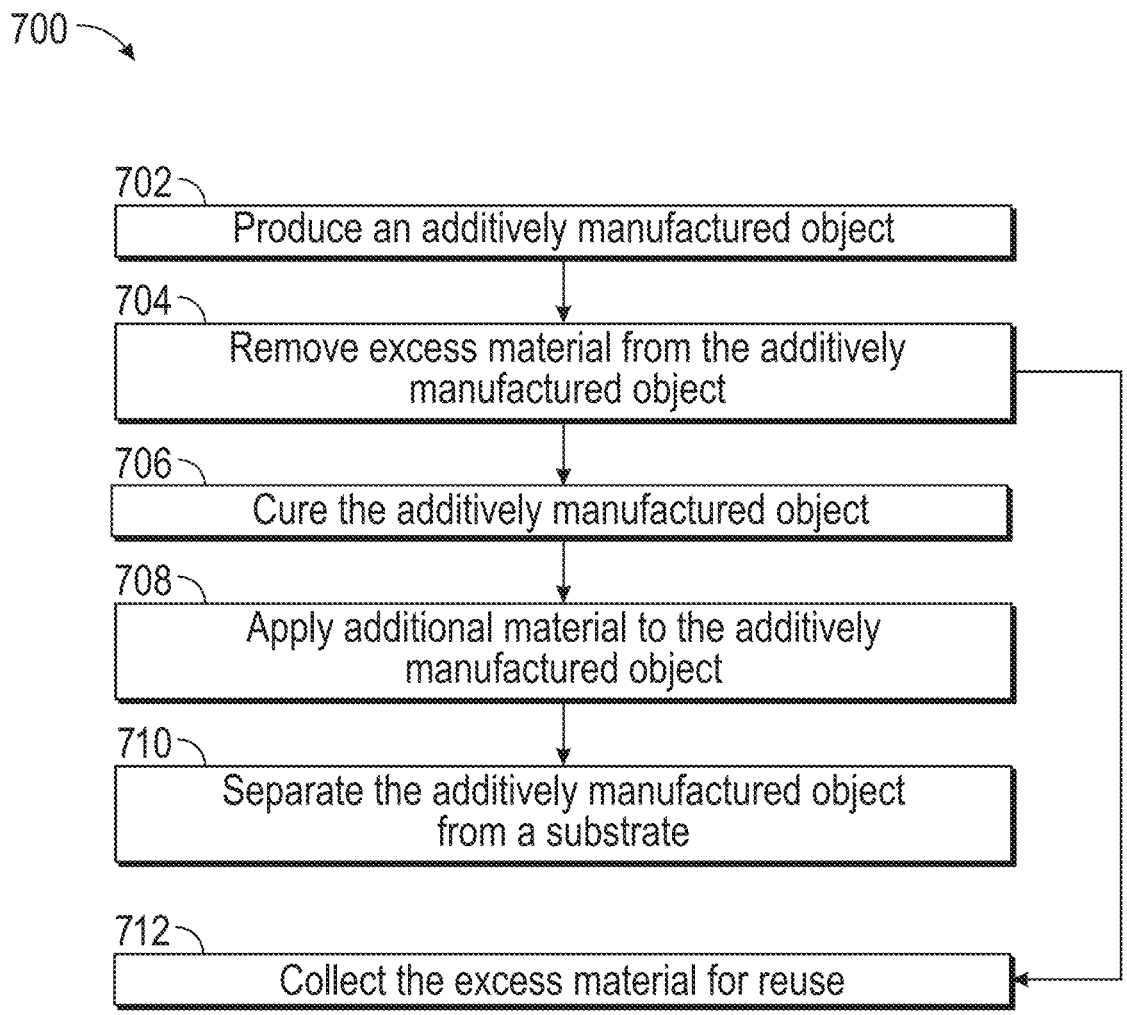
FIG. 7 is a flow diagram providing a general overview of a method for fabricating and post-processing an additively manufactured object, in accordance with embodiments of the present disclosure.

FIG. 7 is a flow diagram providing a general overview of a method 700 for fabricating and post-processing an additively manufactured object, in accordance with embodiments of the present technology. The method 700 can be used to produce many different types of additively manufactured objects, such as orthodontic appliances (e.g., aligners, palatal expanders, attachments, attachment templates, retainers), restorative objects (e.g., crowns, veneers, implants), and/or other dental appliances (e.g., oral sleep apnea appliances, mouth guards). Additional examples of orthodontic appliances and associated methods that are applicable to the present technology are described below.

The method 700 begins at block 702 with producing an additively manufactured object. The additively manufactured object can be produced using any suitable additive manufacturing technique known to those of skill in the art. Additive manufacturing (also referred to herein as "3D printing") includes a variety of technologies which fabricate 3D objects directly from digital models through an additive process. In some embodiments, additive manufacturing includes depositing a precursor material (e.g., a photopolymerizable resin) onto a build platform. The precursor material can be cured, polymerized, melted, sintered, fused, and/or otherwise solidified to form a portion of the object and/or combine the portion with previously formed portions of the object. In some embodiments, the additive manufacturing techniques provided herein build up the object geometry in a layer-by-layer fashion, with successive layers being formed in discrete build steps. Alternatively, or in combination, the additive manufacturing techniques described herein can allow for continuous build-up of an object geometry.

Examples of additive manufacturing techniques suitable for use with the methods described herein include, but are not limited to, the following: (1) vat photopolymerization, in which an object is constructed from a vat of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer-by-layer, and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding.

For example, the additively manufactured object can be fabricated using a vat photopolymerization process in which light is used to selectively cure a vat or reservoir of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the vat, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 300 C, 40° C., 500 C, 60° C., 700 C, 80° C., 900 C, 100° C., 110° C., or 120° C. In some embodiments, the material is heated to a temperature within a range from 50° C. to 120° C., from 90° C. to 120° C., from 100° C. to 120° C., from 105° C. to 115° C., or from 108° C. to 110° C. The heating can lower the viscosity of the photopolymerizable material before and/or during curing. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In a further example, the additively manufactured object can be fabricated using a selective laser sintering process involving using a laser beam to selectively melt and fuse a layer of powdered material according to a desired cross-sectional shape to build up the object geometry. As another example, the additively manufactured object can be fabricated using a fused deposition modeling process involving melting and selectively depositing a thin filament of thermoplastic polymer in a layer-by-layer manner to form an object. In yet another example, the additively manufactured object can be fabricated using a material jetting process involving jetting or extruding one or more materials onto a build surface to form successive layers of the object geometry.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone to form the polymerization gradient. Representative examples of continuous liquid interphase production processes that may be incorporated in the methods herein are described in U.S. Patent Publication Nos. 2015/

0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path to form the object. Such methods are described in U.S. Patent Publication No. 2014/0061974, the disclosure of which is incorporated herein by reference in its entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting overlapping light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after cured (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources to fabricate an object from a plurality of different materials. Examples of such methods are described in U.S. Pat. Nos. 6,749,414 and 11,318,667, the disclosures of which are incorporated herein by reference in their entirety. Alternatively, or in combination, the additively manufactured object can be formed from multiple materials in a plurality of sequential manufacturing steps. For instance, a first portion of the object can be formed from a first material in accordance with any of the methods herein, then a second portion of the object can be formed from a second material in accordance with methods herein, and so on, until the entirety of the object has been formed.

After the additively manufactured object is fabricated, the object can undergo one or more additional process steps, also referred to herein as "post-processing." As described in detail below with respect to blocks 704-712, post-processing can include removing excess material from the object, applying additional material(s) to the object, performing additional curing, separating the object from any supports or other structures that are not intended to be present in the final product, and/or collecting the removed excess material for reuse.

For example, at block 704, the method 700 continues with removing excess material from the additively manufactured object. The excess material can include uncured material (e.g., unpolymerized liquid resin) and/or other unwanted material (e.g., debris) that remains on the additively manufactured object after fabrication. For example, certain materials used in additive manufacturing (e.g., highly viscous polymeric resins used in high temperature lithography) may adhere to the surface of the additively manufactured object. Additionally, excess material may accumulate on or within certain object features, such as cavities, crevices, indentations, apertures, etc. Accordingly, the additively manufactured object may need to be cleaned before further processing and use.

The excess material can be removed in many ways. In some embodiments, for example, the excess material is removed by rotating the additively manufactured object to centrifugally separate the excess material from the surfaces of the object. The rotation can be performed using a suitable device or system (e.g., a centrifuge) including components for supporting and applying rotational force to the additively manufactured object. Alternatively or in combination, the excess material can be removed by spraying or otherwise applying fluids (e.g., water, solvents) to the object, partially or fully immersing the object in a fluid, blowing a gas (e.g., air) on the object, applying a vacuum to the object, applying other types of mechanical forces to the object (e.g., vibration, agitation, tumbling, brushing), and/or other cleaning techniques known to those of skill in the art.

At block 706, the method 700 can optionally including curing the additively manufactured object. This additional curing step (also known as "post-curing") can be used in situations where the additively manufactured object is still in a partially cured "green" state after fabrication. For example, the curing energy used to fabricate the additively manufactured object in block 702 may only partially polymerize the resin forming the object. Accordingly, the post-curing step may be needed to fully cure (e.g., fully polymerize) the additively manufactured object to its final, usable state. Post-curing can provide various benefits, such as improving the mechanical properties (e.g., stiffness, strength) and/or temperature stability of the additively manufactured object. Post-curing can be performed by heating the object, applying radiation (e.g., ultraviolet (UV), visible, microwave) to the object, or suitable combinations thereof. Post-curing can be performed by a specialized device (e.g., an oven or curing station) or can be performed by the same device used to rotate the additively manufactured object in block 604. In other embodiments, however, the post-curing process of block 606 is optional and can be omitted.

At block 708, the method 700 can optionally include applying an additional material to the additively manufactured object. For example, the additional material can be a coating, such as a polymeric coating. The coating can be applied to one or more surfaces of the object for various purposes, including, but not limited to: providing a smooth surface finish, which can be beneficial for aesthetics and/or to improve user comfort if the object is intended to be in contact with the user's body (e.g., an orthodontic appliance worn on the teeth); coloring and/or applying other aesthetic features to the object; improving scratch resistance and/or other mechanical properties; providing antimicrobial properties; and incorporating therapeutic agents into the object for controlled release.

At block 710, the method 700 can include separating the additively manufactured object from a substrate. In some embodiments, the substrate is a build platform which mechanically supports the object during fabrication and the post-processing steps described herein. The additively manufactured object can be connected to the substrate via a sacrificial region of cured material. Accordingly, the additively manufactured object can be detached from the substrate by applying pressure to fracture the sacrificial region. Once separated, the additively manufactured object can then be prepared for packaging, shipment, and use.

At block 712, the method 700 can optionally include collecting the excess material removed from the additively manufactured object in block 704. The excess material can include uncured material that is still suitable for reuse in subsequent additive manufacturing processes (e.g., the fabrication process of block 702). Accordingly, block 712 can include collecting the excess material (e.g., via containers, absorbent elements, piping, etc.) and, optionally, separating reusable excess material from other unwanted components that may be present (e.g., water, solvents, debris) via filtration, distillation, centrifugation, and/or other suitable techniques.

The method 700 can be modified in many ways. For example, although the above steps of the method 700 are described with respect to a single additively manufactured object, the method 700 can be used to concurrently fabricate and post-process any suitable number of additively manufactured objects, such as tens, hundreds, or thousands of additively manufactured objects. As another example, the ordering of the steps shown in FIG. 7 can be varied, e.g., the material application process of block 708 can be performed before the curing process of block 706. Some of the steps of the method 700 can be omitted, such as any of blocks 706, 708, and/or 712. The method 700 can also include additional steps not shown in FIG. 7.

Figure 8:
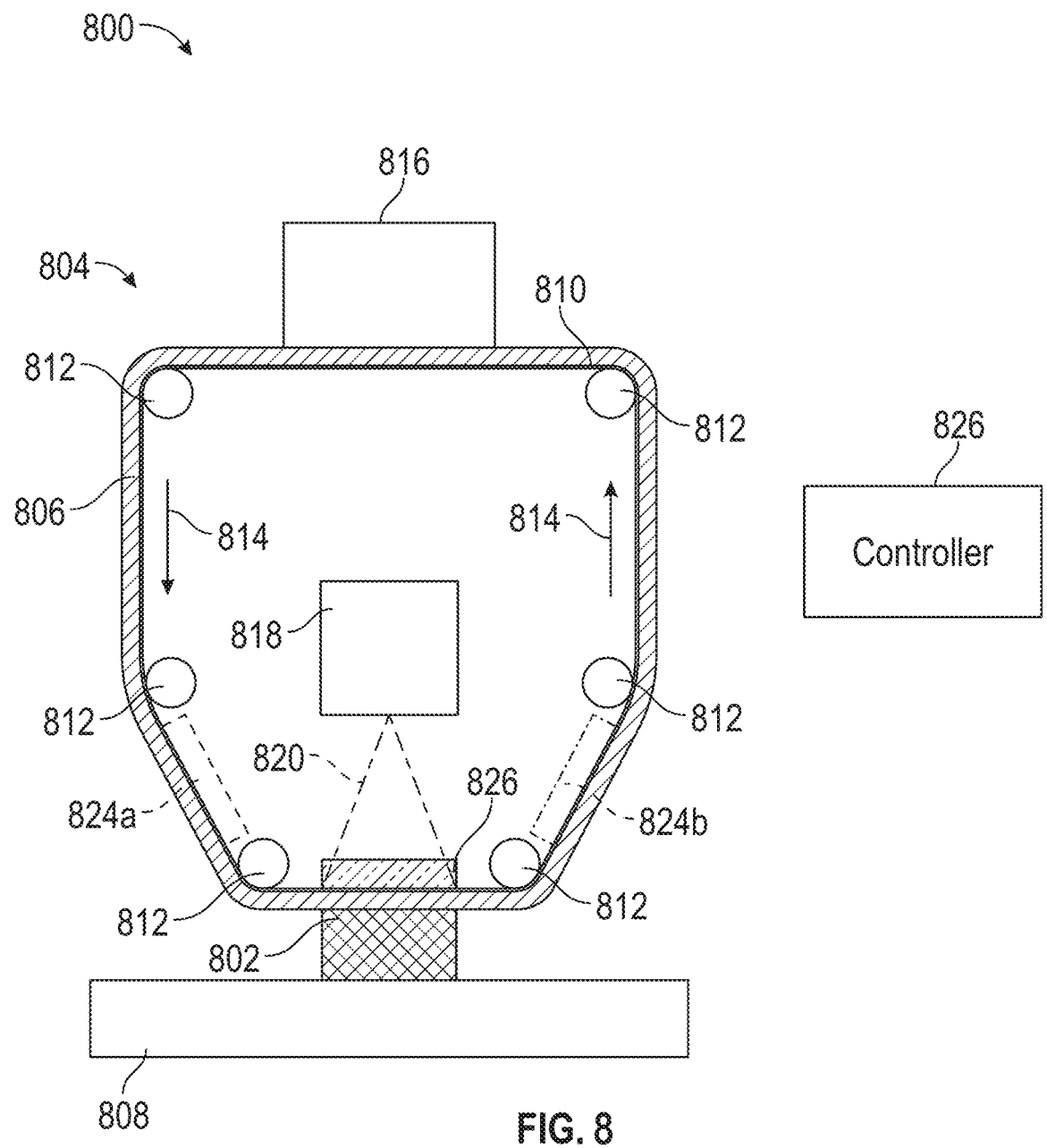
FIG. 8 illustrates a representation example of an additive manufacturing device.

FIG. 8 illustrates a representative example of an additive manufacturing device 800 ("device 800") configured in accordance with embodiments of the present technology. The device 800 can be used to fabricate any embodiment of the additively manufactured objects described herein. For example, the device 800 can be used to produce an additively manufactured object in accordance with block 702 of the method 700 of FIG. 7.

As shown in FIG. 8, the device 800 is used to fabricate an additively manufactured object 802 ("object 802"). The device 800 includes a printer assembly 804 configured to deposit resin 806 on a build platform 808 (e.g., a tray, plate, film, sheet, or other planar substrate) to form the object 802. The printer assembly 804 includes a carrier film 810 configured to deliver the resin 806 to the build platform 808. The carrier film 810 can be a flexible loop of material having an outer surface and an inner surface. The outer surface of the carrier film 810 can adhere to and carry a thin layer of the resin 806. The inner surface of the carrier film 810 can contact one or more rollers 812 that rotate to move the carrier film 810 in a continuous loop trajectory, e.g., as indicated by arrows 814.

The printer assembly 804 can also include a resin source 816 (shown schematically) configured to apply the resin 806 to the carrier film 810. In the illustrated embodiment, the resin source 816 is located at the upper portion of the printer assembly 804 near an upper horizontal segment of the carrier film 810. In other embodiments, however, the resin source 816 can be positioned at a different location in the printer assembly 804. The resin source 816 can include nozzles, ports, reservoirs, etc., that deposit the resin 806 onto the outer surface of the carrier film 810. The resin source 816 can also include one or more blades (e.g., doctor blades, recoater blades) that smooth the deposited resin 806 into a relatively thin, uniform layer. In some embodiments, the resin 806 is formed into a layer having a thickness within a range from 200 microns to 300 microns.

The resin 806 can be carried by the carrier film 810 toward the build platform 808. In the illustrated embodiment, the build platform 808 is located below the printer assembly 804 near a lower horizontal segment of the carrier film 810. In other embodiments, however, the build platform 808 can be positioned at a different location relative to the printer assembly 804. The printer assembly 804 includes a light source 818 (e.g., a projector or light engine) that outputs light 820 (e.g., UV light) having a wavelength configured to cure the resin partially or fully 806. The carrier film 810 can be optically transparent so that the light 820 from the light source 818 passes through the carrier film 810 and onto the portion of the resin 806 above the build platform 808, thus forming a layer of cured resin 806 onto the build platform 808 and/or a previously formed portion of the object 802. The light 820 can be patterned or scanned in a suitable pattern corresponding to the desired cross-section geometry for the object 802. Optionally, a transparent plate 822 can be disposed between the light source 818 and the carrier film 810 to guide the carrier film 810 into a specific position (e.g., height) relative to the build platform 808.

Once the object cross-section has been formed, the build platform 808 can be lowered by a predetermined amount to separate the cured resin from the carrier film 810. The remaining, uncured resin 806 can be carried by the carrier film 810 away from the build platform 808 and back toward the resin source 816. The resin source 816 can deposit additional resin 806 onto the carrier film 810 and/or smooth the resin 806 to re-form a uniform layer of resin 806 on the carrier film 810. The resin 806 can then be recirculated back to the build platform 808 to fabricate an additional layer of the object 802. This process can be repeated to iteratively build up individual object layers on the build platform 808 until the object 802 is complete. The object 802 and build platform 808 can then be removed from the device 800 for post-processing.

In some embodiments, the device 800 is used in a high temperature lithography process utilizing a highly viscous resin. Accordingly, the printer assembly 804 can include one or more heat sources (heating plates, infrared lamps, etc.) for heating the resin 806 to lower the viscosity to a range suitable for additive manufacturing. For example, the printer assembly 804 can include a first heat source 824 a positioned against the segment of the carrier film 810 before the build platform 808, and a second heat source 824*b* positioned against the segment of the carrier film 810 after the build platform 808. Alternatively, or in combination, the printer assembly 804 can include heat sources at other locations.

The device 800 also includes a controller 826 (shown schematically) that is operably coupled to the printer assembly 804 and build platform 808 to control the operation thereof. The controller 826 can be or include a computing device including one or more processors and memory storing instructions for performing the additive manufacturing operations described herein. For example, the controller 826 can receive a digital 3D model of the object 802 to be fabricated, determine a plurality of object cross-sections to build up the object 802 from the resin 806, and can transmit instructions to the light source 818 to output light 820 to form the object cross-sections. As another example, the controller 826 can also determine and control other operational parameters, such as the positioning of the build platform 808 (e.g., height) relative to the carrier film 810, the movement speed and direction of the carrier film 810, the amount of resin 806 deposited by the resin 806, the thickness of the resin layer on the carrier film 810, and/or the amount of heating applied to the resin 806.

Although FIG. 8 illustrates a representative example of an additive manufacturing device, this is not intended to be limiting, and the embodiments described herein can be used in combination with other types of additive manufacturing devices (e.g., vat-based systems) and/or other types of additive manufacturing processes (e.g., material jetting, binder jetting, FDM, powder bed fusion, sheet lamination, directed energy deposition).

Figure 9:
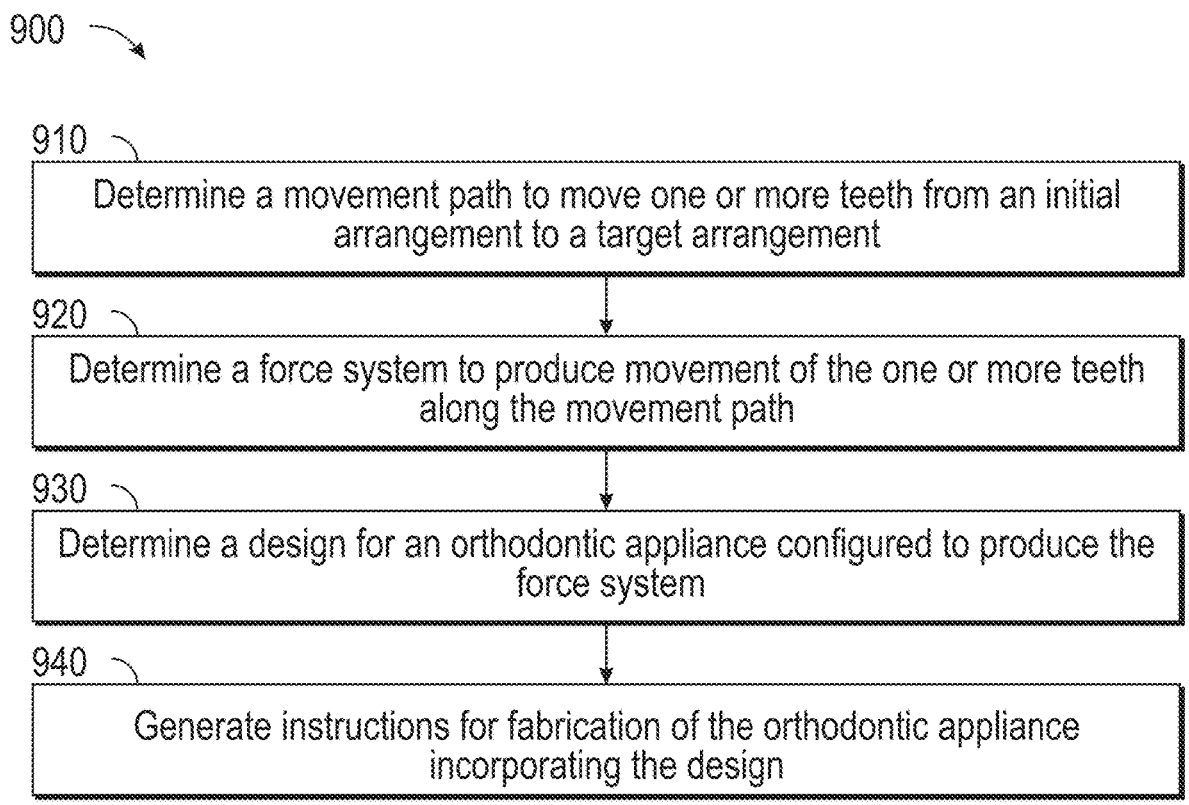
FIG. 9 depicts a method for designing an orthodontic appliance in accordance with embodiments of the present disclosure.

FIG. 9 illustrates a method 900 for designing an orthodontic appliance, in accordance with embodiments of the present technology. The method 900 can be applied to any embodiment of the orthodontic appliances described herein. Some or all the steps of the method 900 can be performed by any suitable data processing system or device, e.g., one or more processors configured with suitable instructions.

In block 910, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 920, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully formed suture. Thus, in juvenile patients and others without fully closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 930, a design for an orthodontic appliance configured to produce the force system is determined. The design can include the appliance geometry, material composition, and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from several vendors can be used, including finite element analysis packages from ANSYS, Inc., of Canonsburg, Pa., and SIMULIA (Abaqus) software products from Dassault Systemes of Waltham, Mass.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 940, instructions for fabrication of the orthodontic appliance incorporating the design are generated. The instructions can be configured to control a fabrication system or device to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 900 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 900 may be performed with any suitable fabrication system or device, such as the embodiments described herein. Some of the steps may be optional, and the order of the steps can be varied as desired.

Figure 10:
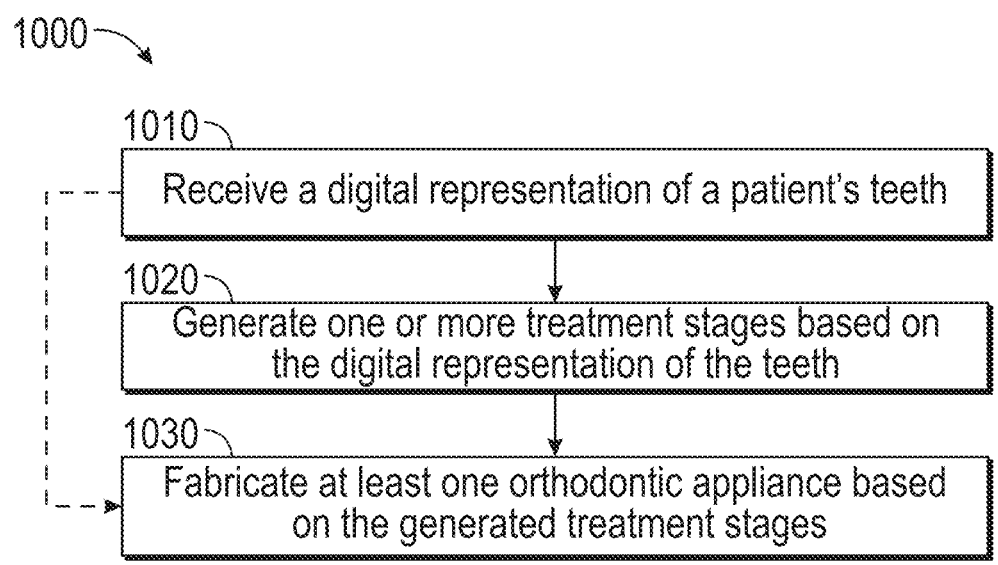
FIG. 10 illustrates a method for digitally planning an orthodontic treatment and/or design or fabrication of an appliance, in accordance with embodiments of the present disclosure.

FIG. 10 illustrates a method 1000 for digitally planning an orthodontic treatment and/or design or fabrication of an appliance, in accordance with embodiments. The method 1000 can be applied to any of the treatment procedures described herein and can be performed by any suitable data processing system.

In block 1010, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1020, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1030, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 10, design and/or fabrication of an orthodontic appliance, and perhaps a particular orthodontic treatment, may include use of a representation of the patient's teeth (e.g., including receiving a digital representation of the patient's teeth (block 1010)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537,406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment fabrication templates, e.g., appliances used to position prefabricated attachments on a person's teeth in accordance with one or more aspects of a treatment plan. Examples of attachment fabrication templates can be found at least in: U.S. application Ser. No. 17/249,218, entitled, "Flexible 3D Printed Orthodontic Device," filed Feb. 24, 2021; U.S. application Ser. No. 16/366,686, entitled, "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103,330, entitled, "Dental Attachment Placement Structure," filed Jun. 14, 2017; U.S. application Ser. No. 14/963,527, entitled, "Dental Attachment Placement Structure," filed Dec. 9, 2015; U.S. application Ser. No. 14/939,246, entitled, "Dental Attachment Placement Structure," filed Nov. 12, 2015; U.S. application Ser. No. 14/939,252, entitled, "Dental Attachment Formation Structures," filed Nov. 12, 2015; and U.S. Pat. No. 9,700,385, entitled, "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled, "Releasable Palatal Expanders," filed Apr. 10, 2019; U.S. application Ser. No. 16/022,552, entitled, "Devices, Systems, and Methods for Dental Arch Expansion," filed Jun. 28, 2018; U.S. Pat. No. 11,045,283, entitled, "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled, "Methods and Apparatuses for Customizing a Rapid Palatal Expander," filed Dec. 4, 2017; and U.S. Pat. No. 7,192,273, entitled, "System and Method for Palatal Expansion," filed Aug. 7, 2003; all of which are incorporated by reference herein in their entirety.

In some embodiments, the polymer, polymer composition, or other materials of the disclosure can be used to produce many different types of additively manufactured objects, such as orthodontic appliances (e.g., aligners, palatal expanders, attachments, attachment templates, retainers), restorative objects (e.g., crowns, veneers, implants), and/or other dental appliances (e.g., oral sleep apnea appliances, mouth guards).

In some embodiments, an orthodontic appliance is a dental aligner or a series of dental aligners, a dental expander, an incremental palatal expander of a series of incremental palatal expanders, a dental spacer, a retainer, a mouthguard, or a sports guard.

One embodiment provides a three-dimensionally printed article (e.g., an orthodontic appliance) comprising polymer composition as disclosed herein or a polymeric film as disclosed herein. In some embodiments, the orthodontic appliance comprising a plurality of additively formed layers, wherein one or more additively formed layers of the plurality of additively formed layers comprises the polymer composition as disclosed herein or the polymeric film as disclosed herein.

The invention claimed is:

1. An orthodontic appliance comprising a polymer composition, wherein the polymer composition is formed from a photocurable resin comprising:
   i) a block co-polymer having at least a first block and a second block, wherein:
      a) the first block is a poly(aryl acrylate) block or a poly(aryl methacrylate) block comprising the following substructure:

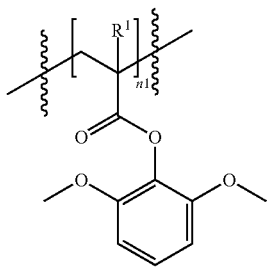

wherein:
   each occurrence of $R^1$ is independently hydrogen or $CH_3$;
   n1 is an integer ranging from 10-300; and
      b) the second block is a poly(alkyl acrylate) block comprising the following substructure:

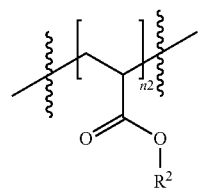

wherein:
   each occurrence of $R^2$ is independently $C_1$-$C_6$ alkyl; and
   n2 is an integer ranging from 10-300;
   ii) aryl acrylate monomers, aryl methacrylate monomers, or combinations thereof, and
   iii) a macroinitiator compound having the following structure:

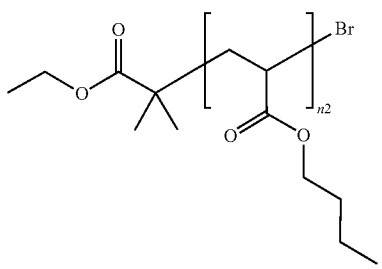

wherein:
n2 is an integer ranging from 10-500.

2. The orthodontic appliance of claim 1, comprising a micelle dispersed and covalently bound to a photopolymer network, the micelle comprising a plurality of the block co-polymers.

3. The orthodontic appliance of claim 2, wherein one or more of the block co-polymers are di-block co-polymers comprising the following substructure:
wherein:

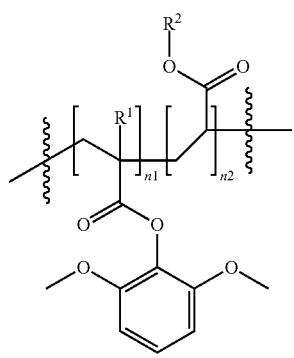

each occurrence of $R^1$ is independently hydrogen or $CH_3$;
each occurrence of $R^2$ is independently $C_1$-$C_6$ alkyl; and
n1 and n2 are each independently an integer ranging from 10-300.

4. The orthodontic appliance of claim 2, wherein at least one of the block co-polymers are tri-block co-polymers comprising the following substructure:

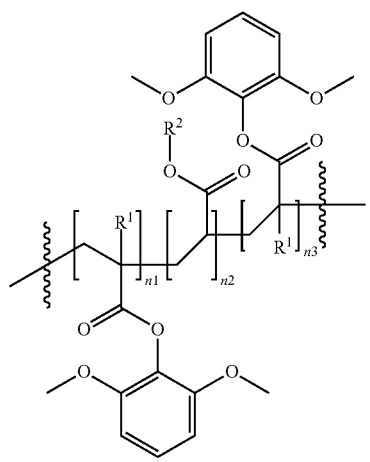

wherein:
each occurrence of $R^1$ is independently hydrogen or $CH_3$;
each occurrence of $R^2$ is independently $C_1$-$C_6$ alkyl; and
n1, n2, and n3 are each independently an integer ranging from 10-300.

5. The orthodontic appliance of claim 4, wherein n1, n2, and n3 are each independently an integer ranging from 10-100.

6. The orthodontic appliance of claim 2, wherein at least one of the block co-polymers has the following structure:

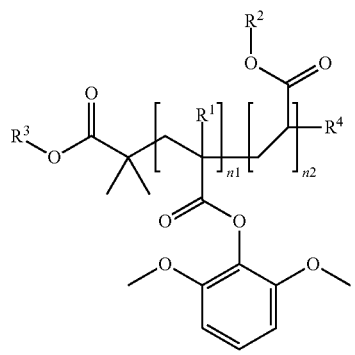

wherein:
each occurrence of $R^1$ is independently hydrogen or $CH_3$;
each occurrence of $R^2$ is independently $C_1$-$C_6$ alkyl;
$R^3$ is $C_1$-$C_6$ alkyl, $C_1$-$C_6$ hydroxyalkyl, or $R^3$ has the following structure:

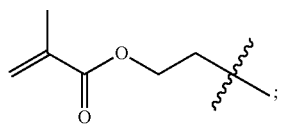 [SMILES: *CCOC(=O)C(=C)C]

$R^4$ is halo; and
n1 and n2 are each an integer ranging from 10-300.

7. The orthodontic appliance of claim 6, wherein $R^3$ is ethyl or —$CH_2CH_2OH$.

8. The orthodontic appliance of claim 7, wherein $R^3$ has the following structure:

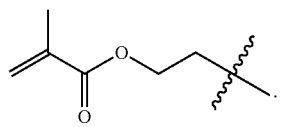 [SMILES: *CCOC(=O)C(=C)C]

9. The orthodontic appliance of claim 6, wherein $R^4$ is bromo.

10. The orthodontic appliance of claim 9, wherein $R^3$ and $R^4$ are both bromo.

11. The orthodontic appliance of claim 2, wherein at least one of the block co-polymers has the following structure:

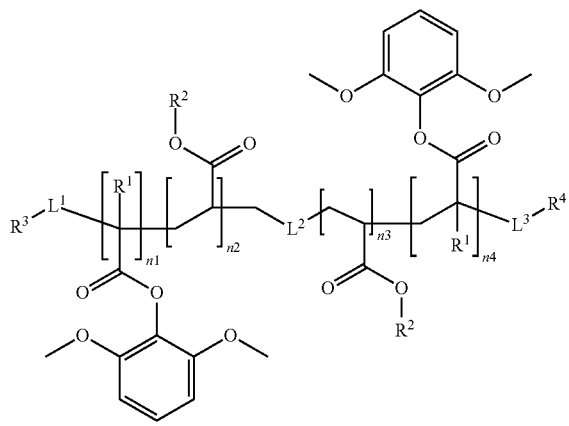

wherein:
  each occurrence of $R^1$ is independently hydrogen or $CH_3$;
  each occurrence of $R^2$ is independently $C_1$-$C_6$ alkyl;
  $R^3$ and $R^4$ are each independently halo;
  $L^1$ and $L^3$ each independently have the following structure:

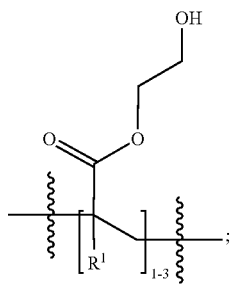

$L^2$ has the following structure:

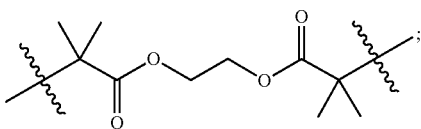 [SMILES: *C(C)(C)C(=O)OCCOC(=O)C(*)(C)C]

and n1, n2, n3, and n4 are each independently an integer ranging from 10-300.

12. The orthodontic appliance of claim 11, wherein each occurrence of $R^2$ is n-butyl.

13. The orthodontic appliance of claim 2, wherein the photopolymer network comprises a poly(acrylate) polymer, a poly(methacrylate) polymer, a block co-polymer comprising at least one poly(acrylate) block and at least one poly(methacrylate) block, or combinations thereof.

14. The orthodontic appliance of claim 13, wherein the photopolymer network comprises greater than 50 wt % or 90 wt % of the poly(acrylate) polymer based on the total weight of the polymer composition.

15. The orthodontic appliance of claim 13, wherein the poly(acrylate) polymer comprises poly(2,6-dimethoxyphenyl acrylate).

16. The orthodontic appliance of claim 13, wherein the poly(acrylate) polymer is greater than 20 wt % or 40 wt % poly(2,6-dimethoxyphenyl acrylate) based on the total weight of the poly(acrylate) polymer.

17. The orthodontic appliance of claim 13, wherein the photopolymer network comprises greater than 50 wt % or 90 wt % of the poly(methacrylate) polymer based on the total weight of the polymer composition.

18. The orthodontic appliance of claim 13, wherein the poly(methacrylate) polymer comprises poly(2,6-dimethoxyphenyl methacrylate).

19. The orthodontic appliance of claim 13, wherein the poly(methacrylate) polymer is greater than 20 wt % or 40 wt % poly(2,6-dimethoxyphenyl methacrylate) based on the total weight of the poly(methacrylate) polymer.

20. The orthodontic appliance of claim 2, wherein the concentration of the micelle is less than 10 wt % relative to the total weight of the polymer composition.

21. The orthodontic appliance of claim 1, wherein each occurrence of $R^2$ is independently methyl, ethyl, propyl, iso-propyl, 2-methyl propyl, n-butyl, sec-butyl, or tert-butyl.

22. The orthodontic appliance of claim 1, wherein the orthodontic appliance is a dental aligner or a series of dental aligners, a dental expander, an incremental palatal expander of a series of incremental palatal expanders, a dental spacer, a retainer, a mouthguard, or a sports guard.

* * * * *